(12) United States Patent
Ostermeier et al.

(10) Patent No.: US 7,557,581 B2
(45) Date of Patent: Jul. 7, 2009

(54) METHOD FOR IMAGING SUBTERRANEAN FORMATIONS

(75) Inventors: Richard Martin Ostermeier, Houston, TX (US); Teruhiko Hagiwara, Houston, TX (US); Erik Jan Banning, Houston, TX (US)

(73) Assignee: Shell Oil Company, Houston, TX (US)

( * ) Notice: Subject to any disclaimer, the term of this patent is extended or adjusted under 35 U.S.C. 154(b) by 384 days.

(21) Appl. No.: 11/121,780

(22) Filed: May 4, 2005

(65) Prior Publication Data
US 2006/0038571 A1 Feb. 23, 2006

Related U.S. Application Data

(63) Continuation-in-part of application No. 10/897,585, filed on Jul. 23, 2004, which is a continuation-in-part of application No. 10/701,735, filed on Nov. 5, 2003.

(60) Provisional application No. 60/639,941, filed on Dec. 29, 2004.

(51) Int. Cl.
*G01V 3/00* (2006.01)
*G01V 3/38* (2006.01)
(52) U.S. Cl. .................................. 324/338; 702/11
(58) Field of Classification Search ......... 324/324–329, 324/332–346; 702/6, 7, 9, 11, 13; 166/250.16, 166/254.1, 66; 175/50, 58
See application file for complete search history.

(56) References Cited

U.S. PATENT DOCUMENTS

| | | | |
|---|---|---|---|
| 3,090,910 A | 5/1963 | Moran | 324/6 |
| 3,993,944 A | 11/1976 | Meador et al. | 324/6 |
| 4,372,398 A | 2/1983 | Kuckes | 175/45 |
| 4,849,699 A | 7/1989 | Gill et al. | 324/339 |
| 4,933,640 A | 6/1990 | Kuckes | 324/339 |
| 5,241,273 A | 8/1993 | Luling | 324/338 |
| 5,299,128 A * | 3/1994 | Antoine et al. | 702/10 |

(Continued)

FOREIGN PATENT DOCUMENTS

GB 2301902 12/1996

(Continued)

OTHER PUBLICATIONS

TH2427 PCT/US2004/036803, International Preliminary Examining Authority, filing date Apr. 11, 2004, Authorized Officer, G. Adam.

(Continued)

*Primary Examiner*—Reena Aurora

(57) ABSTRACT

A method of imaging a subterranean formation traversed by a wellbore using a tool comprising a transmitter for transmitting electromagnetic signals through the formation and a receiver for detecting response signals. The tool is brought to a first position inside the wellbore, and the transmitter is energized to propagate an electromagnetic signal into the formation. A response signal that has propagated through the formation is detected. A derived quantity for the formation based on the detected response signal for the formation is calculated, and plotted against time. The tool may be moved to at least one other position within the wellbore where the procedure may be repeated to create an image of the formation within the subterranean formation based on the plots.

11 Claims, 37 Drawing Sheets

U.S. PATENT DOCUMENTS

| | | | | |
|---|---|---|---|---|
| 5,678,643 | A | 10/1997 | Robbins et al. | 175/45 |
| 5,757,191 | A | 5/1998 | Gianzero | 324/339 |
| 5,955,884 | A | 9/1999 | Payton et al. | 324/339 |
| 5,966,013 | A | 10/1999 | Hagiwara | 324/339 |
| 6,044,325 | A | 3/2000 | Chakravarthy et al. | 702/7 |
| 6,181,138 | B1 | 1/2001 | Hagiwara et al. | 324/338 |
| 2003/0038634 | A1 | 2/2003 | Strack | 324/323 |
| 2003/0184299 | A1 | 10/2003 | Strack | 324/323 |
| 2004/0036803 | A1 | 2/2004 | Koch | 348/552 |
| 2004/0140091 | A1 | 7/2004 | Gupta | 166/254.1 |
| 2005/0015709 | A1 | 1/2005 | Lavoie et al. | 715/500 |
| 2005/0015716 | A1 | 1/2005 | Lavoie et al. | 715/511 |
| 2005/0092487 | A1 | 5/2005 | Banning et al. | 166/254.1 |
| 2005/0093546 | A1 | 5/2005 | Banning et al. | 324/338 |

FOREIGN PATENT DOCUMENTS

| | | |
|---|---|---|
| WO | 03/019237 A1 | 3/2003 |
| WO | 2005/047034 A | 5/2005 |

OTHER PUBLICATIONS

TH2363 PCT/US2005/015716, International Searching Authority, filing date Apr. 5, 2005, Authorized Officer, Luis-Miguel Paredes Sanchez.

TH2363 PCT/US2005/015716, Written Opinion, filing date Apr. 5, 2005, Authorized Officer, B. Lorne.

TH2735 PCT/US2005/015709, International Searching Authority, filing date Apr. 5, 2005, Authorized Officer, Luis-Miguel Paredes Sanchez.

TH2735 PCT/US2005/015709, Written Opinion, filing date Apr. 5, 2005, Authorized Officer, T. Hausser.

Office Action mailed May 29, 2007 in U.S. Appl. No. 10/897,585.

Office Action mailed Jun. 12, 2007 in U.S. Appl. No. 10/270,707.

TH2917 International Search Report dated Mar. 4, 2006, International Application PCT/US2005/046048. TH2917 Written Opinion dated Apr. 18, 2006, International Application PCT/US2005/046048.

TH2427 Office Action dated Jul. 13, 2006, U.S. Appl. No. 10/701,735.

TH2427 Office Action date Nov. 30, 2005, U.S. Appl. No. 10/701,735.

Jean Seydoux, et al. "A Deep Resistivity Logging-While-Drilling Device for Proactive Geosteering", The Leading Edge, Jun. 2004, pp. 581-586.

Gerald L. Stolarczyk et al., "Electromagnetic Seam Wave Mapping of Roof Rock Conditions Across a Longwall Panel", 18th International Conference on Ground Control in Mining, Aug. 3-5, 1999. pp. 1-5.

Electromagnetic Methods in Applied Geophysics—Theory vol. 1, Society of Exploration Geophysicists, pp. 203-237.

Moran, J. H. and Kunz, K.S., "Basic Theory of Induction Logging and Application to Study of Two-Coil Sondes", Dec. 1962, pp. 829-858, *Geophyics*, vol. XXVII, No. 6, Part I (Presented at the 28th Annual SEG Meeting, Oct. 14, 1958, San Antonio, Texas).

\* cited by examiner

METHOD FOR IMAGING SUBTERRANEAN FORMATIONS

CROSS-REFERENCE TO RELATED APPLICATIONS

The present application is a continuation-in-part application of U.S. application Ser. No. 10/897,585, filed on Jul. 23, 2004, which is a continuation-in-part application of U.S. application Ser. No. 10/701,735 filed on Nov. 5, 2003, each of which are incorporated herein by reference. In addition, applicants claim priority based on U.S. provisional application Ser. No. 60/639,941, filed on Dec. 29, 2004.

FIELD OF THE INVENTION

In one aspect the present invention relates to a method for imaging a subterranean formation traversed by a wellbore. In another aspect, the present invention relates to a method for determining at least first and second distances from a device to at least a first layer and a second layer in a formation.

In an embodiment, the invention relates to a method for locating an anomaly and in particular to finding the location of a resistive or conductive anomaly in a formation surrounding a borehole in drilling applications. In another aspect the invention relates to a method to permit rapid identification and imaging of a formation anomaly.

BACKGROUND OF THE INVENTION

In logging while drilling (LWD) geo-steering applications, it is advantageous to detect the presence of a formation anomaly ahead of or around a bit or bottom hole assembly. There are many instances where "Look-Ahead" capability is desired in LWD logging environments. Look-ahead logging is to detect an anomaly at a distance ahead of the drill bit. Some look-ahead examples include predicting an over-pressured zone in advance, or detecting a fault in front of the drill bit in horizontal wells, or profiling a massive salt structure ahead of the drill bit. While currently available techniques are capable of detecting the presence of an anomaly, they are not capable of determining the location of the anomaly with sufficient depth or speed, they are not capable of detecting an anomaly at a sufficient distance ahead of a bit or bottom hole assembly.

In formation evaluation, the depth of investigation of most logging tools, wire line or LWD has been limited to a few feet from the borehole. One such tool is disclosed in U.S. Pat. No. 5,678,643 to Robbins, et al. U.S. Pat. No. 5,678,643 to Robbins, et al. discloses an LWD tool for locating an anomaly. The tool transmits acoustic signals into a wellbore and receives returning acoustic signals including reflections and refractions. Receivers detect the returning acoustic signals and the time between transmission and receipt can be measured. Distances and directions to detected anomalies are determined by a microprocessor that processes the time delay information from the receivers. As set forth above, the depth of investigation facilitated by the tool is limited.

Another technique that provides limited depth of investigation is disclosed in U.S. Pat. No. 6,181,138 to Hagiwara. This technique for locating an anomaly utilizes tilted coil induction tools and frequency domain excitation techniques. In order to achieve a depth of investigation with such a tool, a longer tool size would be required. However, longer tools generally result in poor spatial resolution.

In order to increase depth capabilities, transient electromagnetic (EM) methods have been proposed. One such method for increasing the depth of investigation is proposed in U.S. Pat. No. 5,955,884 to Payton, et al. The tool disclosed in this patent utilizes electric and electromagnetic transmitters to apply electromagnetic energy to a formation at selected frequencies and waveforms that maximize radial depth of penetration into the target formation. In this transient EM method, the current is generally terminated at a transmitter antenna and temporal change of voltage induced in a receiver antenna is monitored. This technique has allowed detection of an anomaly at distances as deep as ten to one hundred meters. However, while Payton discloses a transient EM method enabling detection of an anomaly, it does not provide a technique for detecting anomalies ahead of a drill bit.

Other references, such as PCT application WO/03/019237 also disclose the use of directional resistivity measurements in logging applications. This reference uses the measurements for generating an image of an earth formation after measuring the acoustic velocity of the formation and combining the results. This reference does not disclose a specific method for determining distance and direction to an anomaly.

When logging measurements are used for well placement, detection or identification of anomalies can be critical. Such anomalies may include for example, a fault, a bypassed reservoir, a salt dome, or an adjacent bed or oil-water contact. It would be beneficial to determine both the distance and the direction of the anomaly from the drilling site.

Tri-axial induction logging devices, including wire-line and LWD devices are capable of providing directional resistivity measurements. However, no method has been proposed for utilizing these directional resistivity measurements to identify the direction to an anomaly.

Moreover, there is no rapid method for rapidly presenting the distance information in a discernible form to permit a driller to accurately steer a LWD BHA to a desired location. Present methods typically utilize inversion modeling to estimate distances to formation features. This inversion process is one in which data is used to build a model of the formation that is consistent with the data. The time and computing resources required to perform inversion can be considerable, which may result in a delay of identification of formation features, such as reservoirs.

Accordingly, a new solution is needed for determining the distance from a tool to an anomaly. Particularly such a solution is needed for looking ahead of a drill bit. Furthermore, a real time solution having an increased depth of analysis is needed so that the measurements can be immediately useful to equipment operators. Lastly, a means of rapidly identifying or imaging the formation features or boundaries is needed for geosteering applications

SUMMARY OF THE INVENTION

In a first aspect of the invention, there is provided a method for imaging a subterranean formation traversed by a wellbore. The method may be implemented using a tool comprising a transmitter for transmitting electromagnetic signals through the formation and a receiver for detecting response signals. The method comprises steps wherein the tool is brought to a first position inside the wellbore;

the transmitter is energized to propagate an electromagnetic signal into the formation;

a response signal that has propagated through the formation is detected;

a derived quantity is calculated for the formation based on the detected response signal for the formation;

the derived quantity for the formation is plotted against time.

Then the tool is moved to at least one other position within the wellbore, whereafter the steps set out above are repeated. Optionally, this can be done again. Then an image of the formation within the subterranean formation is created based on the plots of the derived quantity.

Optionally tool is then again moved to at least one more other position within the wellbore and the whole procedure can be repeated again.

In another aspect of the invention there is provided a method there is provided a method for determining a distance to an anomaly in a formation relative to a device in a wellbore. The method may be implemented using a device including at least one transmitter and at least one receiver. The method includes calculating at least one of an apparent conductivity and an apparent resistivity based on a detected response, which may include a voltage response. The at least one of apparent conductivity and apparent resistivity is monitored over time, and the distance to the anomaly is determined based on an observed change of the one of apparent conductivity and apparent resistivity.

The formation may comprise at least three layers whereby the tool is located in one of these layers. The distances from the tool to at least the other two layers can be determined using the method of the invention.

In this method, at least first and second distances from a device to at least a first and a second layer in a formation can be determined, whereby at least one of the first and second layers comprises a resistivity or conductivity anomaly.

The first and second distances to the anomaly may be determined based on observed multiple changes of the one of apparent conductivity and apparent resistivity, which may each include a deflection point.

In a particular embodiment of the invention, a voltage response is measured over time, and the response is utilized to calculate the apparent conductivity or the apparent resistivity over a selected time span. A time at which the apparent conductivity deviates from a constant value is determined, and this time may by utilized to ascertain the first distance that can correspond to the distance that the anomaly is away from the device in the wellbore.

A subsequent deviation at a later time can be utilized to ascertain the second distance with may correspond to the distance that the second layer is away from the device in the wellbore. The difference between the first and second distances may be indicative of the thickness of the first layer which may contain an anomaly.

In a particular embodiment of the invention, the distance to the anomaly, and the thickness thereof, is determined when the at least one of apparent conductivity and apparent resistivity reaches an asymptotic value.

The device may comprise a logging tool and/or it may be provided in a measurement-while-drilling section or a logging-while-drilling section of a drill string trailing a drill bit.

In another aspect, the monitored one of apparent conductivity and apparent resistivity is plotted against time, after which and device is subsequently moved to another position in the wellbore. An electromagnetic signal is then again transmitted using the transmitter;

one of apparent conductivity and apparent resistivity based on a receiver-detected response is again calculated;

the one of apparent conductivity and apparent resistivity is again monitored over time; and again plotted against time.

Thereafter, an image of the formation within the subterranean formation can be created based on the plots.

The again monitored one of apparent conductivity and apparent resistivity can be plotted in the same plot as the plot wherein the one of apparent conductivity and apparent resistivity was originally plotted. The creating of the image of the formation can include identifying two or more inflection points on each plotted calculated one of apparent conductivity and apparent resistivity curve and fitting a curve to the two or more inflection points.

BRIEF DESCRIPTION OF THE DRAWINGS

The present invention is described in detail below with reference to the attached drawing figures, wherein:

FIG. 59 schematically shows a model of a coaxial tool in a conductive local layer (1 ohm-m) in the vicinity of a highly resistive layer (100 ohm-m) with a separating layer having an intermediate resistance (10 ohm-m) of varying thickness in between;

FIG. 62 on the right side shows an image log derived from the left side;

FIG. 63 on the left hand side shows apparent dip response in both t and z coordinates for z-locations corresponding to those depicted in the right hand side.

DETAILED DESCRIPTION OF THE INVENTION

Embodiments of the invention relate to a system and method for determining distance and direction to an anomaly in a formation within a wellbore. Both frequency domain excitation and time domain excitation have been used to excite electromagnetic fields for use in anomaly detection. In frequency domain excitation, a device transmits a continuous wave of a fixed or mixed frequency and measures responses at the same band of frequencies. In time domain excitation, a device transmits a square wave signal, triangular wave signal, pulsed signal or pseudo-random binary sequence as a source and measures the broadband earth response. Sudden changes in transmitter current cause signals to appear at a receiver caused by induction currents in the formation. The signals that appear at the receiver are called transient responses because the receiver signals start at a first value and then decay or increase with time to a constant level. The technique disclosed herein implements the time domain excitation technique.

As set forth below, embodiments of the invention propose a general method to determine a direction to a resistive or conductive anomaly using transient EM responses. As will be explained in detail, the direction to the anomaly is specified by a dip angle and an azimuth angle. Embodiments of the invention propose to define an apparent dip ($\theta_{app}(t)$) and an apparent azimuth ($\phi_{app}(t)$) by combinations of tri-axial transient measurements. An apparent direction ($\{\theta_{app}(t), \phi_{app}(t)\}$) approaches a true direction ($\{\theta, \phi\}$) as a time (t) increases. The $\theta_{app}(t)$ and $\phi_{app}(t)$ both initially read zero when an apparent conductivity $\sigma_{coaxial}(t)$ and $\sigma_{coplanar}(t)$ from coaxial and coplanar measurements both read the conductivity around the tool. The apparent conductivity will be further explained below and can also be used to determine the location of an anomaly in a wellbore.

Figure 1:
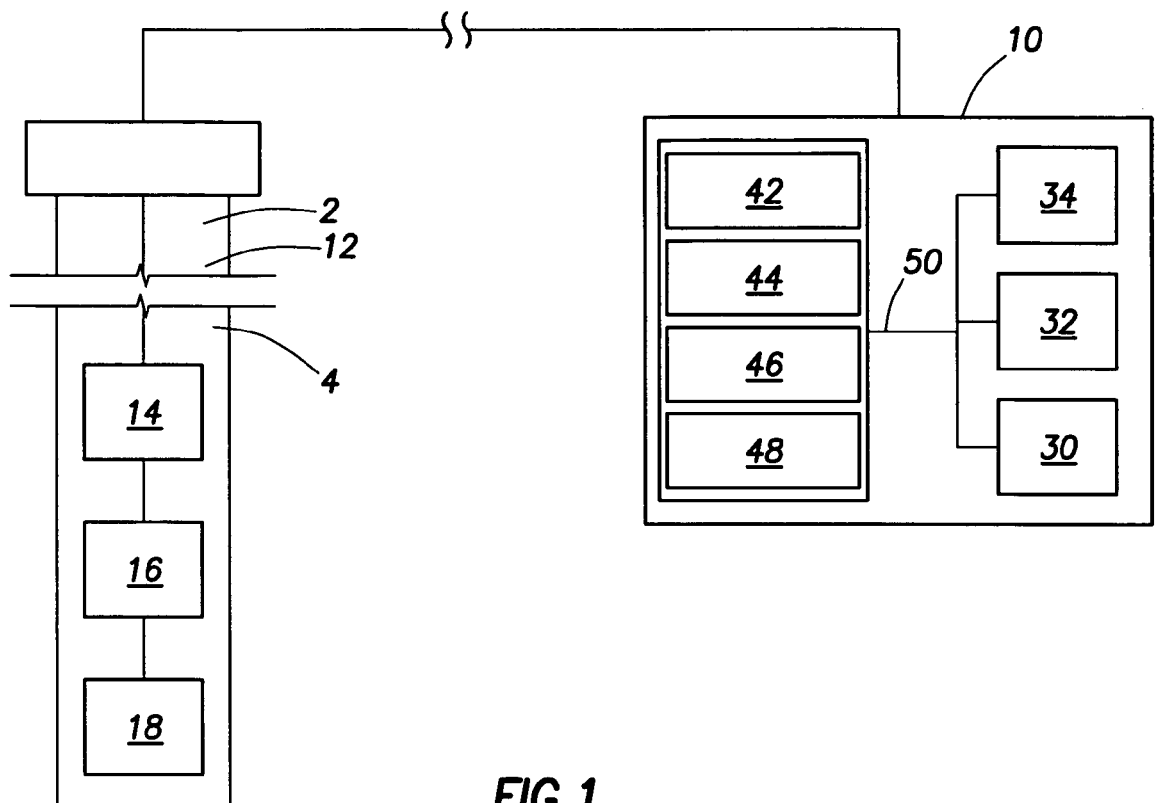
FIG. 1 is a block diagram showing a system in accordance with embodiment of the invention.

FIG. 1 illustrates a system that may be used to implement the embodiments of the method of the invention. A surface computing unit 10 may be connected with an electromagnetic measurement tool 2 disposed in a wellbore 4 and supported by a cable 12. The cable 12 may be constructed of any known type of cable for transmitting electrical signals between the tool 2 and the surface computing unit 10. One or more transmitters 16 and one are more receivers 18 may be provided for transmitting and receiving signals. A data acquisition unit 14 may be provided to transmit data to and from the transmitters 16 and receivers 18 to the surface computing unit 10.

Each transmitter 16 and each receiver 18 may be tri-axial and thereby contain components for sending and receiving signals along each of three axes. Accordingly, each transmitter module may contain at least one single or multi-axis antenna and may be a 3-orthogonal component transmitter. Each receiver may include at least one single or multi-axis electromagnetic receiving component and may be a 3-orthogonal component receiver.

The data acquisition unit 14 may include a controller for controlling the operation of the tool 2. The data acquisition unit 14 preferably collects data from each transmitter 16 and receiver 18 and provides the data to the surface computing unit 10.

The surface computing unit 10 may include computer components including a processing unit 30, an operator interface 32, and a tool interface 34. The surface computing unit 10 may also include a memory 40 including relevant coordinate system transformation data and assumptions 42, a direction calculation module 44, an apparent direction calculation module 46, and a distance calculation module 48. The surface computing unit 10 may further include a bus 50 that couples various system components including the system memory 40 to the processing unit 30. The computing system environment 10 is only one example of a suitable computing environment and is not intended to suggest any limitation as to the scope of use or functionality of the invention. Furthermore, although the computing system 10 is described as a computing unit located on a surface, it may optionally be located below the surface, incorporated in the tool, positioned at a remote location, or positioned at any other convenient location.

The memory 40 preferably stores the modules 44, 46, and 48, which may be described as program modules containing computer-executable instructions, executed by the surface computing unit 10. The program module 44 contains the computer executable instruction necessary to calculate a direction to an anomaly within a wellbore. The program module 46 includes the computer executable instructions necessary to calculate an apparent direction as will be further explained below. The program module 48 contains the computer executable instructions necessary to calculate a distance to an anomaly. The stored data 46 includes data pertaining to the tool coordinate system and the anomaly coordinate system and other data required for use by the program modules 44, 46, and 48. These program modules 44, 46, and 48, as well as the stored data 42, will be further described below in conjunction with embodiments of the method of the invention.

Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Although the computing system 10 is shown as having a generalized memory 40, the computing system 10 would typically includes a variety of computer readable media. By way of example, and not limitation, computer readable media may comprise computer storage media and communication media. The computing system memory 40 may include computer storage media in the form of volatile and/or nonvolatile memory such as a read only memory (ROM) and random access memory (RAM). A basic input/output system (BIOS), containing the basic routines that help to transfer information between elements within computer 10, such as during start-up, is typically stored in ROM. The RAM typically contains data and/or program modules that are immediately accessible to and/or presently being operated on by processing unit 30. By way of example, and not limitation, the computing system 10 includes an operating system, application programs, other program modules, and program data.

The components shown in the memory 40 may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media discussed above and illustrated in FIG. 1, provide storage of computer readable instructions, data structures, program modules and other data for the computing system 10.

A user may enter commands and information into the computing system 10 through input devices such as a keyboard and pointing device, commonly referred to as a mouse, trackball or touch pad. Input devices may include a microphone, joystick, satellite dish, scanner, or the like. These and other input devices are often connected to the processing unit 30 through the operator interface 32 that is coupled to the system bus 50, but may be connected by other interface and bus structures, such as a parallel port or a universal serial bus (USB). A monitor or other type of display device may be connected to the system bus 50 via an interface, such as a video interface. In addition to the monitor, computers may also include other peripheral output devices such as speakers and printer, which may be connected through an output peripheral interface.

Although many other internal components of the computing system 10 are not shown, those of ordinary skill in the art will appreciate that such components and the interconnection are well known. Accordingly, additional details concerning the internal construction of the computer 10 need not be disclosed in connection with the present invention.

Figure 2:
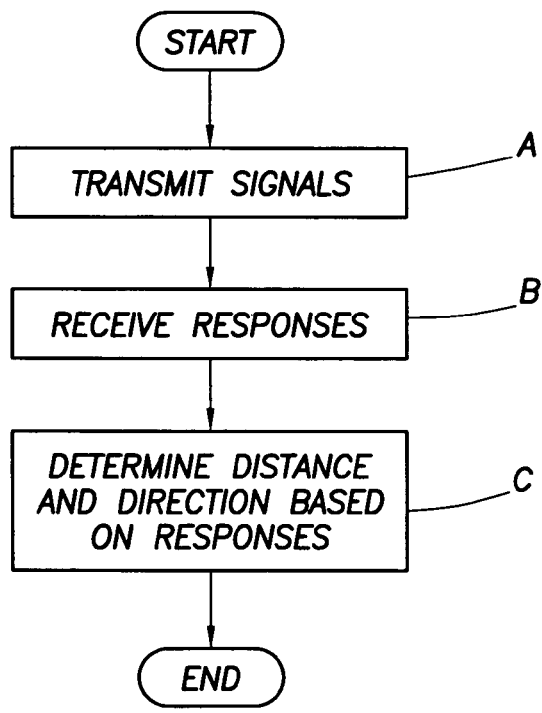
FIG. 2 is a flow chart illustrating a method in accordance with an embodiment of the invention.

FIG. 2 is a flow chart illustrating the procedures involved in a method of the invention. Generally, in procedure A, the transmitters 16 transmit electromagnetic signals. In procedure B, the receivers 18 receive transient responses. In procedure C, the system processes the transient responses to determine a distance and direction to the anomaly.

FIGS. 3-6 illustrate the technique for implementing procedure C for determining distance and direction to the anomaly.

Tri-axial Transient EM Responses

Figure 3:
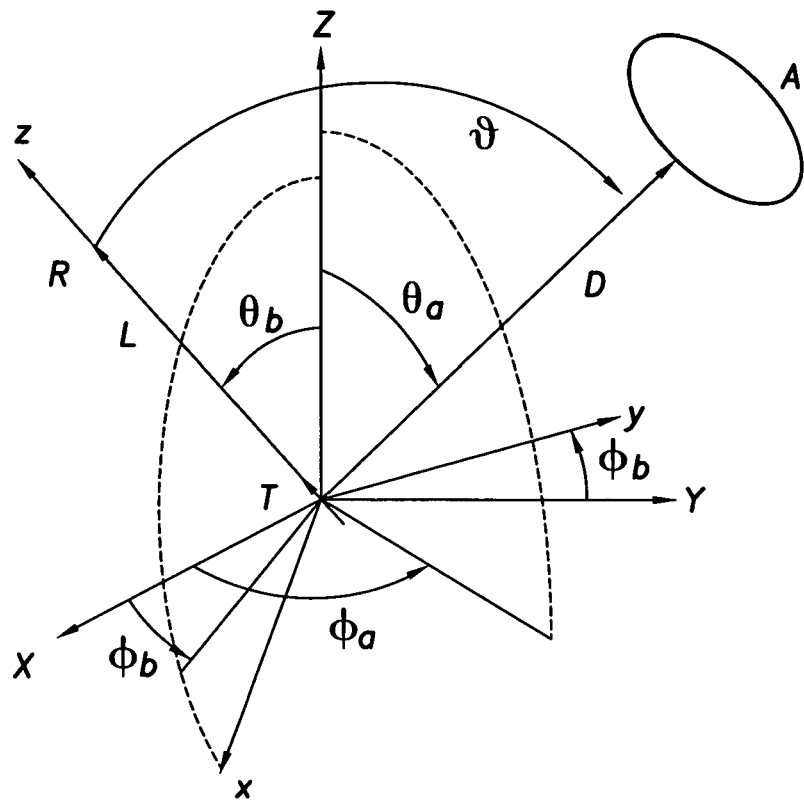
FIG. 3 is a graph illustrating directional angles between tool coordinates and anomaly coordinates.

FIG. 3 illustrates directional angles between tool coordinates and anomaly coordinates. A transmitter coil T is located at an origin that serves as the origin for each coordinate system. A receiver R is placed at a distance L from the transmitter. An earth coordinate system, includes a Z-axis in a vertical direction and an X-axis and a Y-axis in the East and the North directions, respectively. The deviated borehole is specified in the earth coordinates by a deviation angle $\theta_b$ and its azimuth angle $\phi_b$. A resistivity anomaly A is located at a distance D from the transmitter in the direction specified by a dip angle ($\theta_a$) and its azimuth ($\phi_a$).

Figure 4A:
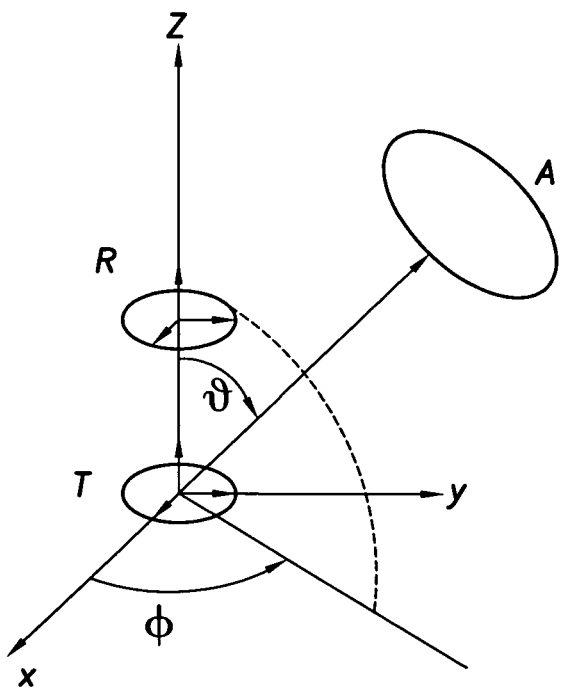
FIG. 4A is a graph showing a resistivity anomaly in a tool coordinate system.

In order to practice embodiments of the method, FIG. 4A shows the definition of a tool/borehole coordinate system having x, y, and z axes. The z-axis defines the direction from the transmitter T to the receiver R. The tool coordinates in FIG. 4A are specified by rotating the earth coordinates (X, Y, Z) in FIG. 3 by the azimuth angle ($\phi_b$) around the Z-axis and then rotating by $\theta_b$ around the y-axis to arrive at the tool coordinates (x, y, z). The direction of the anomaly is specified by the dip angle ($\Theta$) and the azimuth angle ($\phi$) where:

$$\cos\vartheta = (\hat{b}_z \cdot \hat{a}) = \cos\theta_a\cos\theta_b + \sin\theta_a\sin\theta_b\cos(\varphi_a - \varphi_b) \quad (1)$$

$$\tan\phi = \frac{\sin\theta_b\sin(\varphi_a - \varphi_b)}{\cos\theta_a\sin\theta_b\cos(\varphi_a - \varphi_b) - \sin\theta_a\cos\theta_b} \quad (2)$$

Figure 4B:
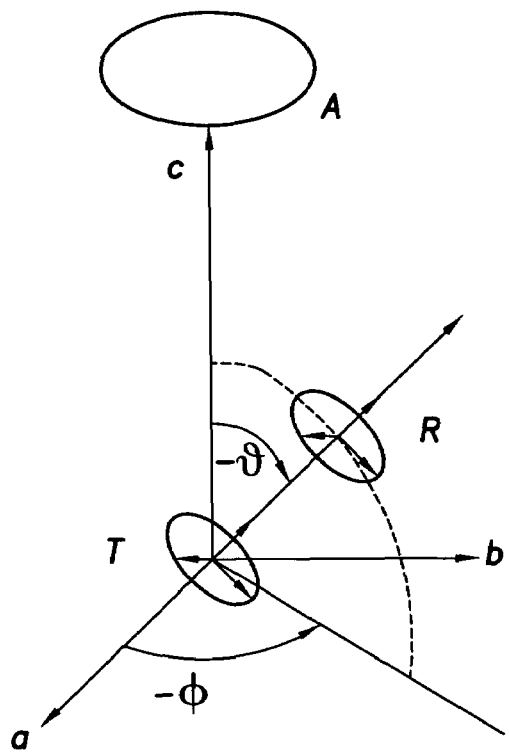
FIG. 4B is a graph showing a resistivity anomaly in an anomaly coordinate system.

Similarly, FIG. 4B shows the definition of an anomaly coordinate system having a, b, and c axes. The c-axis defines the direction from the transmitter T to the center of the anomaly A. The anomaly coordinates in FIG. 4B are specified by rotating the earth coordinates (X, Y, Z) in FIG. 3 by the azimuth angle ($\phi_a$) around the Z-axis and subsequently rotating by $\theta_a$ around the b-axis to arrive at the anomaly coordinates (a, b, c). In this coordinate system, the direction of the borehole is specified in a reverse order by the azimuth angle ($\phi$) and the dip angle ($\Theta$).

Transient Responses in Two Coordinate Systems

The method is additionally based on the relationship between the transient responses in two coordinate systems. The magnetic field transient responses at the receivers [$R_x$, $R_y$, $R_z$] which are oriented in the [x, y, z] axis direction of the tool coordinates, respectively, are noted as $$\begin{bmatrix} V_{xx} & V_{xy} & V_{xz} \\ V_{yx} & V_{yy} & V_{yz} \\ V_{zx} & V_{zy} & V_{zz} \end{bmatrix} = \begin{bmatrix} R_x \\ R_y \\ R_z \end{bmatrix} [M_x \ M_y \ M_z] \quad (3)$$

from a magnetic dipole source in each axis direction, [$M_x$, $M_y$, $M_z$].

When the resistivity anomaly is distant from the tool, the formation near the tool is seen as a homogeneous formation. For simplicity, the method may assume that the formation is isotropic. Only three non-zero transient responses exist in a homogeneous isotropic formation. These include the coaxial response and two coplanar responses. Coaxial response $V_{zz}$(t) is the response when both the transmitter and the receiver are oriented in the common tool axis direction. Coplanar responses, $V_{xx}$(t) and $V_{yy}$(t), are the responses when both the transmitter T and the receiver R are aligned parallel to each other but their orientation is perpendicular to the tool axis. All of the cross-component responses are identically zero in a homogeneous isotropic formation. Cross-component responses are either from a longitudinally oriented receiver with a transverse transmitter, or vise versa. Another cross-component response is also zero between a mutually orthogonal transverse receiver and transverse transmitter.

The effect of the resistivity anomaly is seen in the transient responses as time increases. In addition to the coaxial and the coplanar responses, the cross-component responses $V_{ij}$(t) (i≠j; i, j=x, y, z) become non-zero.

The magnetic field transient responses may also be examined in the anomaly coordinate system. The magnetic field transient responses at the receivers [$R_a$, $R_b$, $R_c$] that are oriented in the [a, b, c] axis direction of the anomaly coordinates, respectively, may be noted as $$\begin{bmatrix} V_{aa} & V_{ab} & V_{ac} \\ V_{ba} & V_{bb} & V_{bc} \\ V_{ca} & V_{cb} & V_{cc} \end{bmatrix} = \begin{bmatrix} R_a \\ R_b \\ R_c \end{bmatrix} [M_a \ M_b \ M_c] \quad (4)$$

from a magnetic dipole source in each axis direction, [$M_a$, $M_b$, $M_c$].

When the anomaly is large and distant compared to the transmitter-receiver spacing, the effect of spacing can be ignored and the transient responses can be approximated with those of the receivers near the transmitter. Then, the method assumes that axial symmetry exists with respect to the c-axis that is the direction from the transmitter to the center of the anomaly. In such an axially symmetric configuration, the cross-component responses in the anomaly coordinates are identically zero in time-domain measurements.

$$\begin{bmatrix} V_{aa} & V_{ab} & V_{ac} \\ V_{ba} & V_{bb} & V_{bc} \\ V_{ca} & V_{cb} & V_{cc} \end{bmatrix} = \begin{bmatrix} V_{aa} & 0 & 0 \\ 0 & V_{aa} & 0 \\ 0 & 0 & V_{cc} \end{bmatrix} \quad (5)$$

The magnetic field transient responses in the tool coordinates are related to those in the anomaly coordinates by a simple coordinate transformation $P(\Theta, \phi)$ specified by the dip angle ($\Theta$) and azimuth angle ($\phi$).

$$\begin{bmatrix} V_{xx} & V_{xy} & V_{xz} \\ V_{yx} & V_{yy} & V_{yz} \\ V_{zx} & V_{zy} & V_{zz} \end{bmatrix} = P(\vartheta, \phi)^{tr} \begin{bmatrix} V_{aa} & V_{ab} & V_{ac} \\ V_{ba} & V_{bb} & V_{bc} \\ V_{ca} & V_{cb} & V_{cc} \end{bmatrix} P(\vartheta, \phi) \quad (6)$$

$$P(\vartheta, \phi) = \begin{bmatrix} \cos\vartheta\cos\phi & \cos\vartheta\sin\phi & -\sin\vartheta \\ -\sin\phi & \cos\phi & 0 \\ \sin\vartheta\cos\phi & \sin\vartheta\sin\phi & \cos\vartheta \end{bmatrix} \quad (7)$$

Determination of Target Direction

The assumptions set forth above contribute to determination of target direction, which is defined as the direction of the anomaly from the origin. When axial symmetry in the anomaly coordinates is assumed, the transient response measurements in the tool coordinates are constrained and the two directional angles may be determined by combinations of tri-axial responses.

$$\begin{bmatrix} V_{xx} & V_{xy} & V_{xz} \\ V_{yx} & V_{yy} & V_{yz} \\ V_{zx} & V_{zy} & V_{zz} \end{bmatrix} = P(\vartheta, \phi)^{tr} \begin{bmatrix} V_{aa} & 0 & 0 \\ 0 & V_{aa} & 0 \\ 0 & 0 & V_{cc} \end{bmatrix} P(\vartheta, \phi) \quad (8)$$

In terms of each tri-axial response $V_{xx} = (V_{aa} \cos^2\Theta + V_{cc} \sin^2\Theta)\cos^2\phi + V_{aa} \sin^2\phi$ $V_{yy} = (V_{aa} \cos^2\Theta + V_{cc} \sin^2\Theta)\sin^2\phi + V_{aa} \cos^2\phi$ $V_{zz} = V_{aa} \sin^2\Theta + V_{cc} \cos^2\Theta \quad (9)$ $V_{xy} = V_{yx} = -(V_{aa} - V_{cc})\sin^2\Theta \cos\phi \sin\phi$ $V_{zx} = V_{xz} = -(V_{aa} - V_{cc})\cos\Theta \sin\Theta \cos\phi$ $V_{yz} = V_{zy} = -(V_{aa} - V_{cc})\cos\Theta \sin\Theta \sin\phi \quad (10)$ The following relations can be noted:

$V_{xx} + V_{yy} + V_{zz} = 2V_{aa} + V_{cc}$ $V_{xx} - V_{yy} = (V_{cc} - V_{aa})\sin^2\Theta (\cos^2\phi - \sin^2\phi)$ $V_{yy} - V_{zz} = (V_{cc} - V_{aa})(\cos^2\Theta - \sin^2\Theta \sin^2\phi)$ $V_{zz} - V_{xx} = (V_{cc} - V_{aa})(\cos^2\Theta - \sin^2\Theta \cos^2\phi) \quad (11)$ Several distinct cases can be noted. In the first of these cases, when none of the cross-components is zero, $V_{xy} \neq 0$ nor $V_{yz} \neq 0$ nor $V_{zx} \neq 0$, then the azimuth angle $\phi$ is not zero nor $\pi/2$ (90°), and can be determined by, $$\phi = \frac{1}{2}\tan^{-1}\frac{V_{xy} + V_{yx}}{V_{xx} - V_{yy}} \quad (12)$$

-continued $$\phi = \tan^{-1}\frac{V_{yz}}{V_{xz}} = \tan^{-1}\frac{V_{zy}}{V_{zx}}$$

By noting the relation, $$\frac{V_{xy}}{V_{xz}} = \tan\vartheta\sin\phi \text{ and } \frac{V_{xy}}{V_{yz}} = \tan\vartheta\cos\phi \quad (13)$$

the dip (deviation) angle $\Theta$ is determined by, $$\tan\vartheta = \sqrt{\left(\frac{V_{xy}}{V_{xz}}\right)^2 + \left(\frac{V_{xy}}{V_{yz}}\right)^2} \quad (14)$$

In the second case, when $V_{xy}=0$ and $V_{yz}=0$, then $\Theta=0$ or $\phi=0$ or $\pi$ (180°) or $\phi=\pm\pi/2$ (90°) and $\Theta=\pm\pi/2$ (90°), as the coaxial and the coplanar responses should differ from each other ($V_{aa} \neq V_{cc}$).

If $\phi=0$, then the dip angle $\Theta$ is determined by, $$\vartheta = -\frac{1}{2}\tan^{-1}\frac{V_{xz} + V_{zx}}{V_{xx} - V_{zz}} \quad (15)$$

If $\phi=\pi$ (180°), then the dip angle $\Theta$ is determined by, $$\vartheta = +\frac{1}{2}\tan^{-1}\frac{V_{xz} + V_{zx}}{V_{xx} - V_{zz}} \quad (16)$$

Also, with regard to the second case, If $\Theta=0$, then $V_{xx}=V_{yy}$ and $V_{zx}=0$. If $\phi=\pm\pi/2$ (90°) and $\Theta=\pm\pi/2$ (90°), then $V_{zz}=V_{xx}$ and $V_{zx}=0$. These instances are further discussed below with relation to the fifth case.

In the third case, when $V_{xy}=0$ and $V_{xz}=0$, then $\phi=\pm\pi/2$ (90°) or $\Theta=0$ or $\phi=0$ and $\Theta=\pm\pi/2$ (90°).

If $\phi=\pi/2$, then the dip angle $\Theta$ is determined by, $$\vartheta = -\frac{1}{2}\tan^{-1}\frac{V_{yz} + V_{zy}}{V_{yy} - V_{zz}} \quad (17)$$

If $\phi=-\pi/2$, then the dip angle $\Theta$ is determined by, $$\vartheta = +\frac{1}{2}\tan^{-1}\frac{V_{yz} + V_{zy}}{V_{yy} - V_{zz}} \quad (18)$$

Also with regard to the third case, If $\Theta=0$, then $V_{xx}=V_{yy}$ and $V_{yz}=0$. If $\phi=0$ and $\Theta=\pm\pi/2$ (90°), $V_{yy}=V_{zz}$ and $V_{yz}=0$. These situations are further discussed below with relation to the fifth case.

In the fourth case, $V_{xz}=0$ and $V_{yz}=0$, then $\Theta=0$ or $\pi$(180°) or $\pm\pi/2$ (90°).

If $\Theta=\pm\pi/2$, then the azimuth angle $\phi$ is determined by, $$\phi = -\frac{1}{2}\tan^{-1}\frac{V_{xy}+V_{yx}}{V_{xx}-V_{yy}} \tag{19}$$

Also with regard to the fourth case, if $\Theta=0$ or $\pi(180°)$, then $V_{xx}=V_{yy}$ and $V_{yz}=0$. This situation is also shown below with relation to the fifth case.

In the fifth case, all cross components vanish, $V_{xz}=V_{yz}=V_{xy}=0$ then $\Theta=0$, or $\Theta=\pm\pi/2$ (90°) and $\phi=0$ or $\pm\pi/2$ (90°).

If $V_{xx}=V_{yy}$ then $\Theta=0$ or $\pi(180°)$.
If $V_{yy}=V_{zz}$ then $\Theta=\pm\pi/2$ (90°) and $\phi=0$.
If $V_{zz}=V_{xx}$ then $\Theta=\pm\pi/2$ (90°) and $\phi=\pm\pi/2$ (90°).

Tool rotation around the tool/borehole axis

Figure 5:
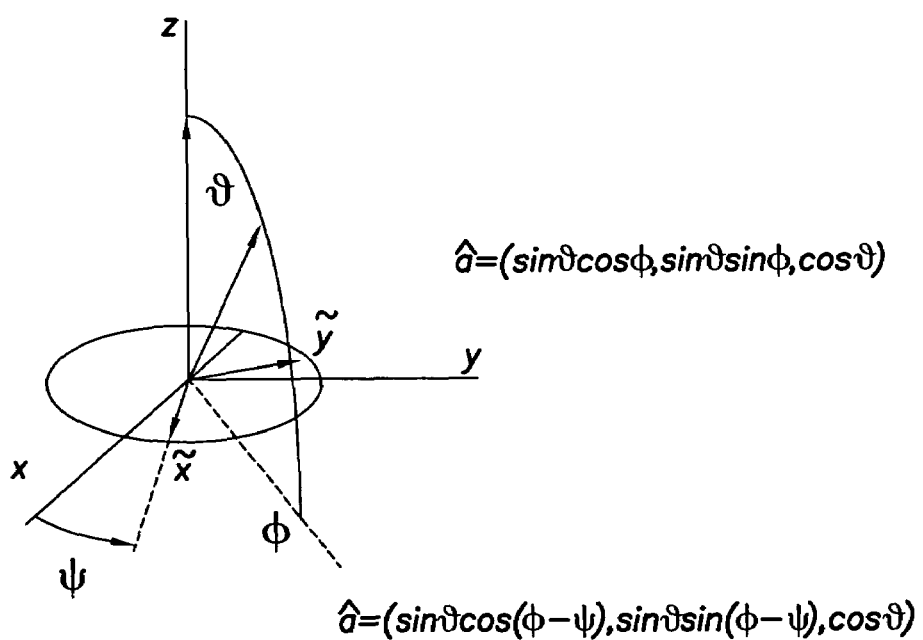
FIG. 5 is a graph illustrating tool rotation within a borehole.

In the above analysis, all the transient responses $V_{ij}(t)$ (i, j=x, y, z) are specified by the x-, y-, and z-axis directions of the tool coordinates. However, the tool rotates inside the borehole and the azimuth orientation of the transmitter and the receiver no longer coincides with the x- or y-axis direction as shown in FIG. 5. If the measured responses are $V_{\tilde{i}\tilde{j}}(\tilde{i},\tilde{j}=\tilde{x},\tilde{y},z)$ where $\tilde{x}$ and $\tilde{y}$ axis are the direction of antennas fixed to the rotating tool, and $\psi$ is the tool's rotation angle, then $$\begin{bmatrix} V_{\tilde{x}\tilde{x}} & V_{\tilde{x}\tilde{y}} & V_{\tilde{x}z} \\ V_{\tilde{y}\tilde{x}} & V_{\tilde{y}\tilde{y}} & V_{\tilde{y}z} \\ V_{z\tilde{x}} & V_{z\tilde{y}} & V_{zz} \end{bmatrix} = R(\psi)^{tr}\begin{bmatrix} V_{xx} & V_{xy} & V_{xz} \\ V_{yx} & V_{yy} & V_{yz} \\ V_{zx} & V_{zy} & V_{zz} \end{bmatrix}R(\psi) \tag{20}$$

$$R(\psi) = \begin{bmatrix} \cos\psi & -\sin\psi & 0 \\ \sin\psi & \cos\psi & 0 \\ 0 & 0 & 1 \end{bmatrix} \tag{21}$$

Then, $$V_{\tilde{x}\tilde{x}} = (V_{aa}\cos^2\vartheta + V_{cc}\sin^2\vartheta)\cos^2(\phi-\psi) + V_{aa}\sin^2(\phi-\psi)$$
$$V_{\tilde{y}\tilde{y}} = (V_{aa}\cos^2\vartheta + V_{cc}\sin^2\vartheta)\sin^2(\phi-\psi) + V_{aa}\cos^2(\phi-\psi) \tag{22}$$
$$V_{zz} = V_{aa}\sin^2\vartheta + V_{cc}\cos^2\vartheta$$

$$V_{\tilde{x}\tilde{y}} = V_{\tilde{y}\tilde{x}} = -(V_{aa}-V_{cc})\sin^2\vartheta\cos(\phi-\psi)\sin(\phi-\psi)$$
$$V_{z\tilde{x}} = V_{\tilde{x}z} = -(V_{aa}-V_{cc})\cos\vartheta\sin\vartheta\cos(\phi-\psi) \tag{23}$$
$$V_{\tilde{y}z} = V_{z\tilde{y}} = -(V_{aa}-V_{cc})\cos\vartheta\sin\vartheta\sin(\phi-\psi)$$

The following relations apply:

$V_{xx}+V_{yy}+V_{zz}=2V_{aa}+V_{cc}$ $V_{xx}-V_{yy}=(V_{cc}-V_{aa})\sin^2\Theta\{{}^2(\phi-\psi)-\sin^2(\phi-\psi)\}$ $V_{yy}-V_{zz}=-(V_{cc}-V_{aa})\{\cos^2\Theta-\sin^2\Theta\sin^2(\phi-\psi)\}$ $V_{zz}-V_{xx}=(V_{cc}-V_{aa})\{\cos^2\Theta-\sin^2\Theta\cos^2(\phi-\psi)\} \tag{24}$ Consequently, $$\phi-\psi = \frac{1}{2}\tan^{-1}\frac{V_{\tilde{x}\tilde{y}}+V_{\tilde{y}\tilde{x}}}{V_{\tilde{x}\tilde{x}}-V_{\tilde{y}\tilde{y}}} \tag{25}$$

$$\phi-\psi = \tan^{-1}\frac{V_{\tilde{y}z}}{V_{\tilde{x}z}} = \tan^{-1}\frac{V_{z\tilde{y}}}{V_{z\tilde{x}}}$$

The azimuth angle $\phi$ is measured from the tri-axial responses if the tool rotation angle $\psi$ is known. To the contrary, the dip (deviation) angle $\Theta$ is determined by $$\tan\vartheta = \sqrt{\left(\frac{V_{\tilde{x}\tilde{y}}}{V_{\tilde{x}z}}\right)^2 + \left(\frac{V_{\tilde{x}\tilde{y}}}{V_{\tilde{y}z}}\right)^2} \tag{26}$$

without knowing the tool orientation $\psi$.

Apparent dip angle and azimuth angle and the distance to the anomaly

The dip and the azimuth angle described above indicate the direction of a resistivity anomaly determined by a combination of tri-axial transient responses at a time (t) when the angles have deviated from a zero value. When t is small or close to zero, the effect of such anomaly is not apparent in the transient responses as all the cross-component responses are vanishing. To identify the anomaly and estimate not only its direction but also the distance, it is useful to define the apparent azimuth angle $\phi_{app}(t)$ by, $$\phi_{app}(t) = \frac{1}{2}\tan^{-1}\frac{V_{xy}(t)+V_{yx}(t)}{V_{xx}(t)-V_{yy}(t)} \tag{27}$$

$$\phi_{app}(t) = \tan^{-1}\frac{V_{yz}(t)}{V_{xz}(t)} = \tan^{-1}\frac{V_{zy}(t)}{V_{zx}(t)}$$

and the effective dip angle $\Theta_{app}(t)$ by $$\tan\vartheta_{app}(t) = \sqrt{\left(\frac{V_{xy}(t)}{V_{xz}(t)}\right)^2 + \left(\frac{V_{xy}(t)}{V_{yz}(t)}\right)^2} \tag{28}$$

for the time interval when $\phi_{app}(t)\neq 0$ nor $\pi/2$ (90°). For simplicity, the case examined below is one in which none of the cross-component measurements is identically zero: $V_{xy}(t)\neq 0$ $V_{yz}(t)\neq 0$, and $V_{zx}(t)\neq 0$.

For the time interval when $\phi_{app}(t)=0$, $\Theta_{app}(t)$ is defined by, $$\vartheta_{app}(t) = -\frac{1}{2}\tan^{-1}\frac{V_{xz}(t)+V_{zx}(t)}{V_{xx}(t)-V_{zz}(t)} \tag{29}$$

For the time interval when $\phi_{app}(t)=\pi/2$ (90°), $\Theta_{app}(t)$ is defined by, $$\vartheta_{app}(t) = -\frac{1}{2}\tan^{-1}\frac{V_{yz}(t)+V_{zy}(t)}{V_{yy}(t)-V_{zz}(t)} \tag{30}$$

When t is small and the transient responses do not see the effect of a resistivity anomaly at distance, the effective angles are identically zero, $\phi_{app}(t)=\Theta_{app}(t)=0$. As t increases, when the transient responses see the effect of the anomaly, $\phi_{app}(t)$ and $\Theta_{app}(t)$ begin to show the true azimuth and the true dip angles. The distance to the anomaly may be indicated at the time when $\phi_{app}(t)$ and $\Theta_{app}(t)$ start deviating from the initial zero values. As shown below in a modeling example, the presence of an anomaly is detected much earlier in time in the effective angles than in the apparent conductivity ($\sigma_{app}(t)$). Even if the resistivity of the anomaly may not be known until $\sigma_{app}(t)$ is affected by the anomaly, its presence and the direction can be measured by the apparent angles. With limitation in time measurement, the distant anomaly may not be seen in the change of $\sigma_{app}(t)$ but is visible in $\phi_{app}(t)$ and $\Theta_{app}(t)$.

MODELING EXAMPLE

Figure 6:
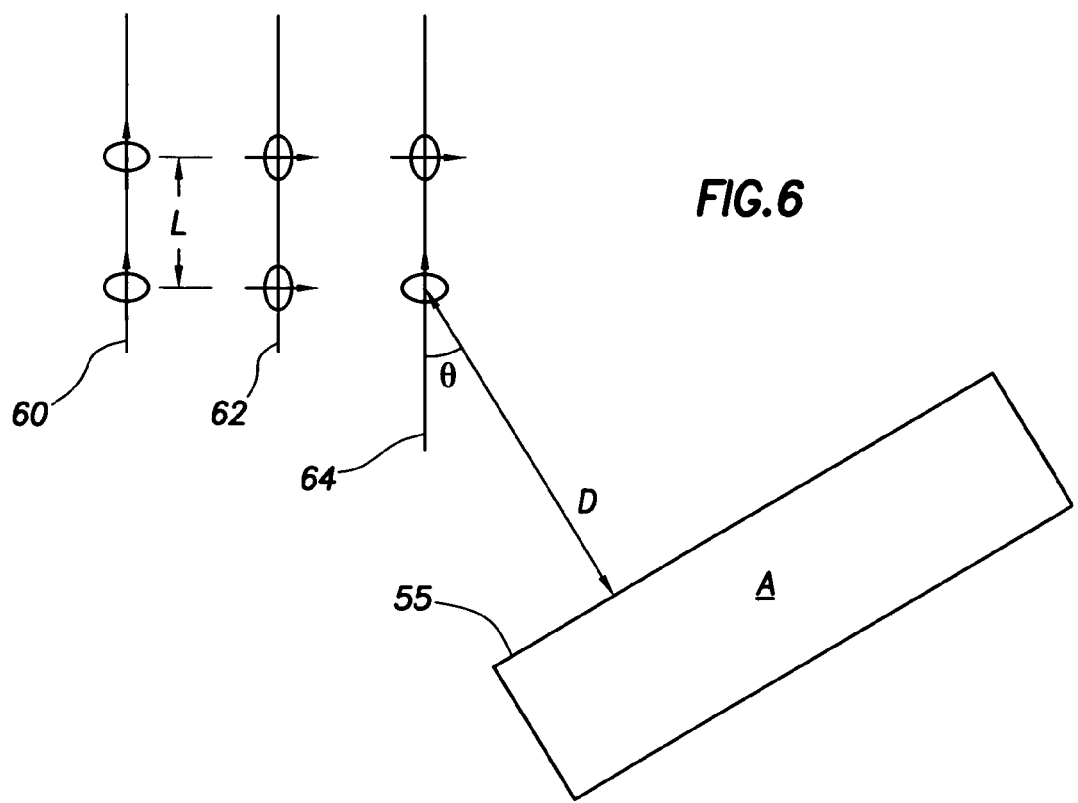
FIG. 6 is a graph showing directional components.

FIG. 6 depicts a simplified modeling example wherein a resistivity anomaly A is a massive salt dome, and the salt interface 55 may be regarded as a plane interface. For further simplification, it can be assumed that the azimuth of the salt face is known. Accordingly, the remaining unknowns are the distance D to the salt face from the tool, the isotropic or anisotropic formation resistivity, and the approach angle (or dip angle) $\theta$ as shown in FIG. 6. FIG. 6 also indicates coaxial (60) coplanar (62), and cross-component (64) measurement arrangements.

Figure 7:
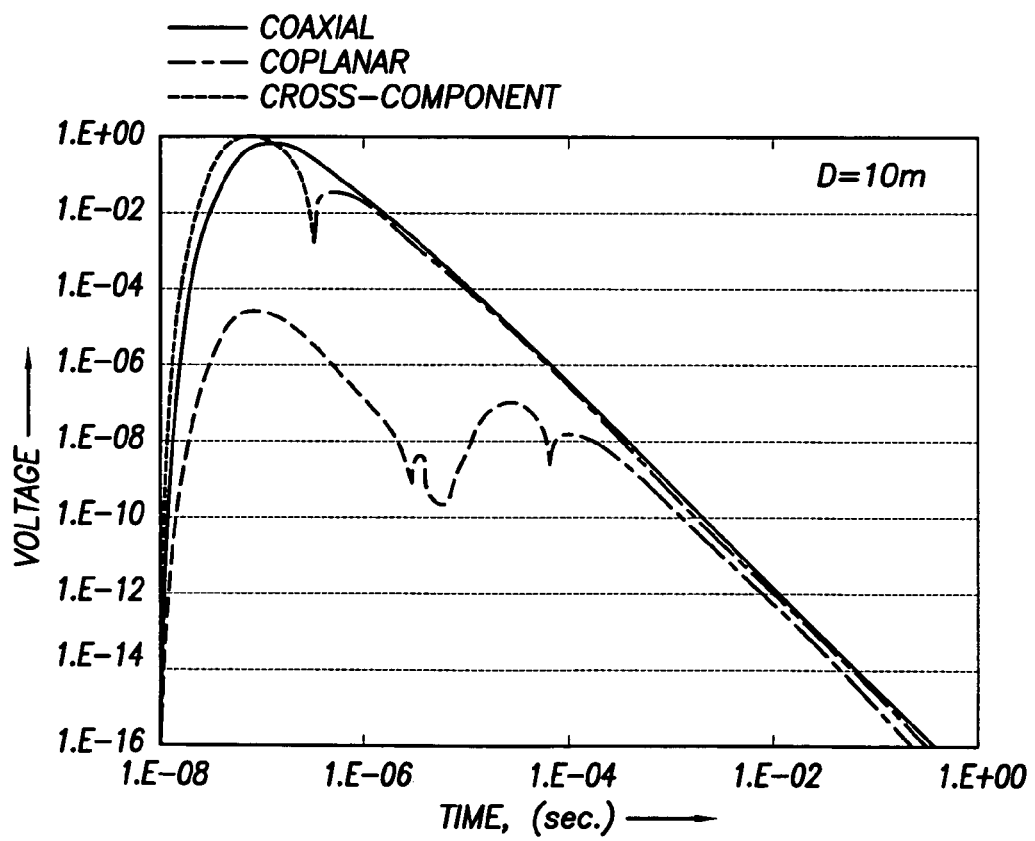
FIG. 7 is a graph showing the voltage response from coaxial $V_{zz}(t)$, coplanar $V_{xx}(t)$, and the cross-component $V_{zx}(t)$ measurements for L=1 m, for θ=30°, and at salt distance D=10 m.
Figure 8:
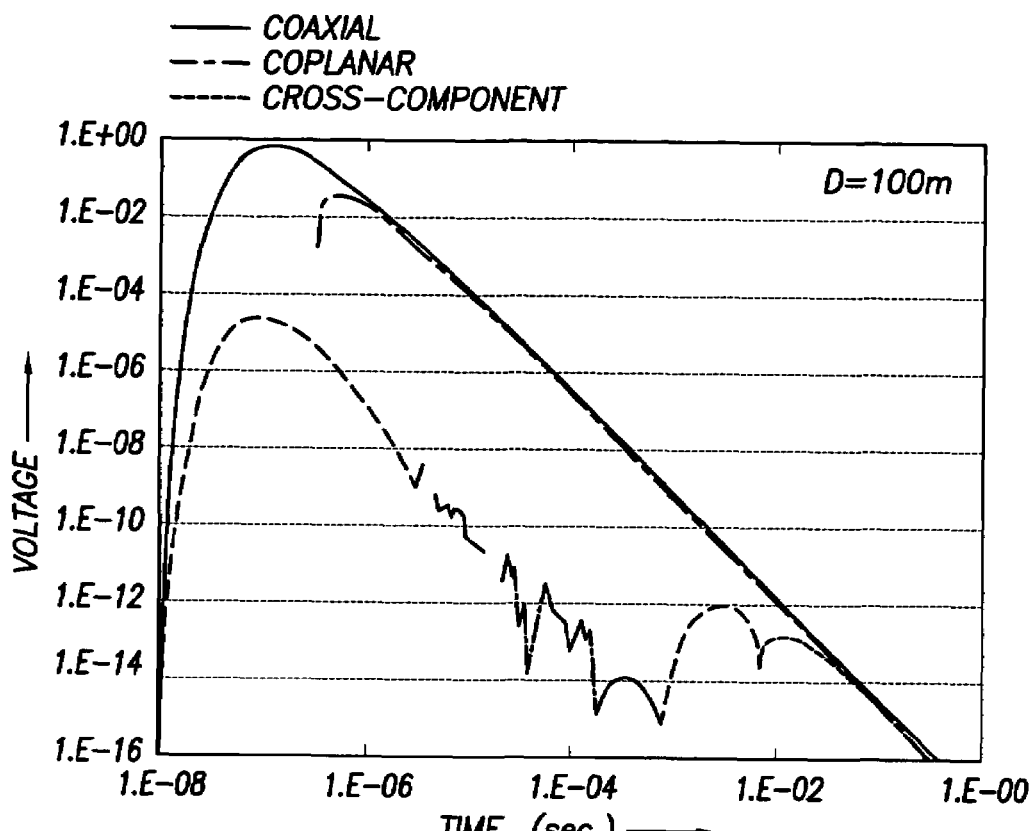
FIG. 8 is a graph showing the voltage response from coaxial $V_{zz}(t)$, coplanar $V_{xx}(t)$, and the cross-component $V_{zx}(t)$ measurements for L=1 m, for θ=30°, and at salt distance D=100 m.

FIG. 7 and FIG. 8 below show the voltage from the coaxial $V_{zz}(t)$, coplanar $V_{xx}(t)$, and the cross-component $V_{zx}(t)$ measurements for L=1 m, for $\theta=30°$, and at salt distance D=10 m and D=100 m respectively. The apparent dip $\theta_{app}(t)$ is defined by, $$\theta_{app}(t) = -\frac{1}{2}\tan^{-1}\frac{V_{zx}(t) + V_{xz}(t)}{V_{zz}(t) - V_{xx}(t)}. \qquad (31)$$

Figure 9:
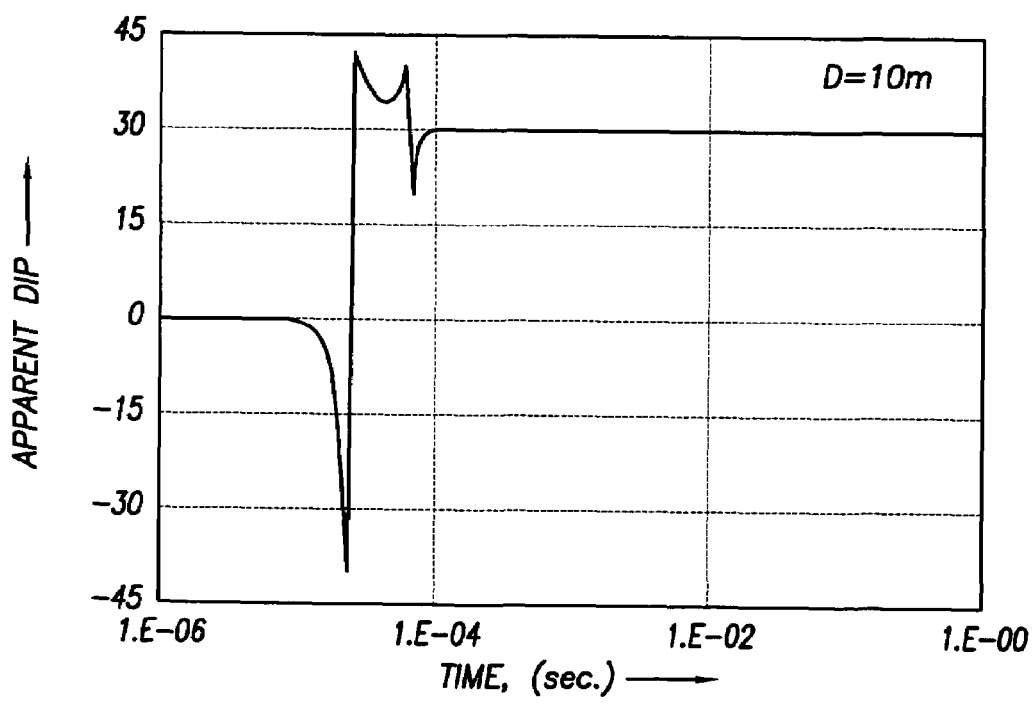
FIG. 9 is a graph showing apparent dip ($\theta_{app}(t)$) for an arrangement as in FIG. 7.

FIG. 9 shows the apparent dip ($\theta_{app}(t)$) for the L=1 m tool assembly when the salt face is D=10 m away and at the approach angle of $\theta=30°$.

Figure 10:
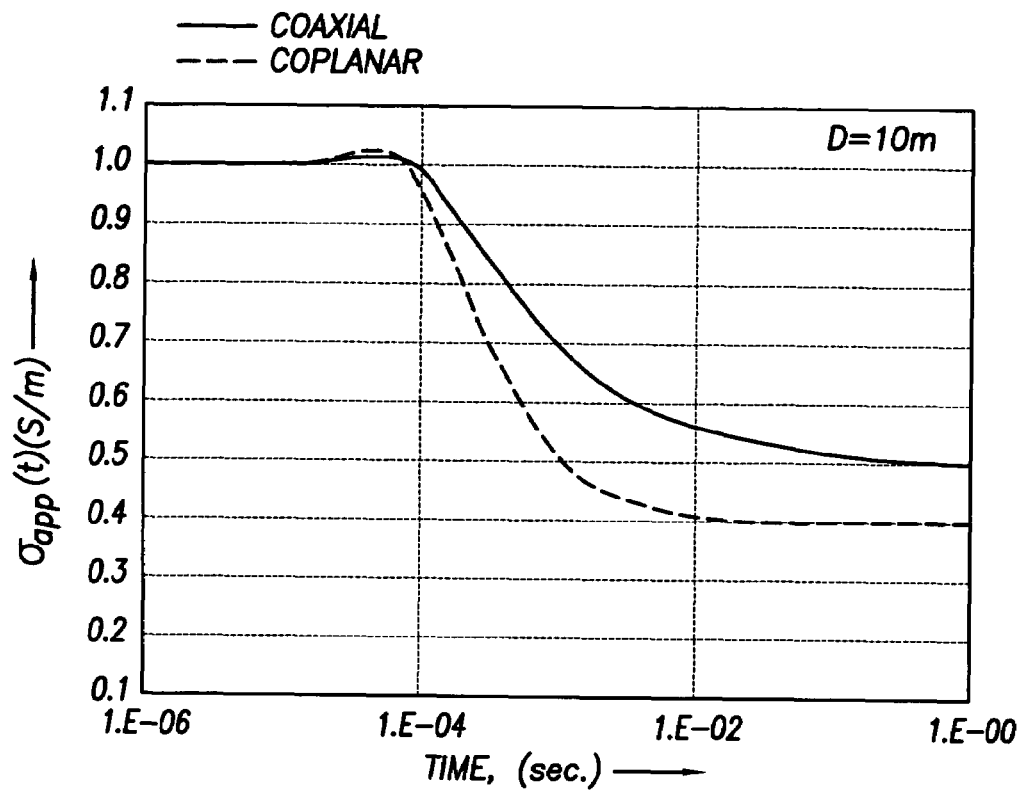
FIG. 10 is a graph showing apparent conductivity ($\sigma_{app}(t)$) calculated from both the coaxial ($V_{zz}(t)$) and the coplanar ($V_{xx}(t)$) responses for the same conditions as in FIG. 9.

In addition, the apparent conductivity ($\sigma_{app}(t)$) from both the coaxial ($V_{zz}(t)$) and the coplanar ($V_{xx}(t)$) responses is shown in FIG. 10, wherein the approach angle ($\theta$) and salt face distance (D) are the same as in FIG. 9.

Figure 11:
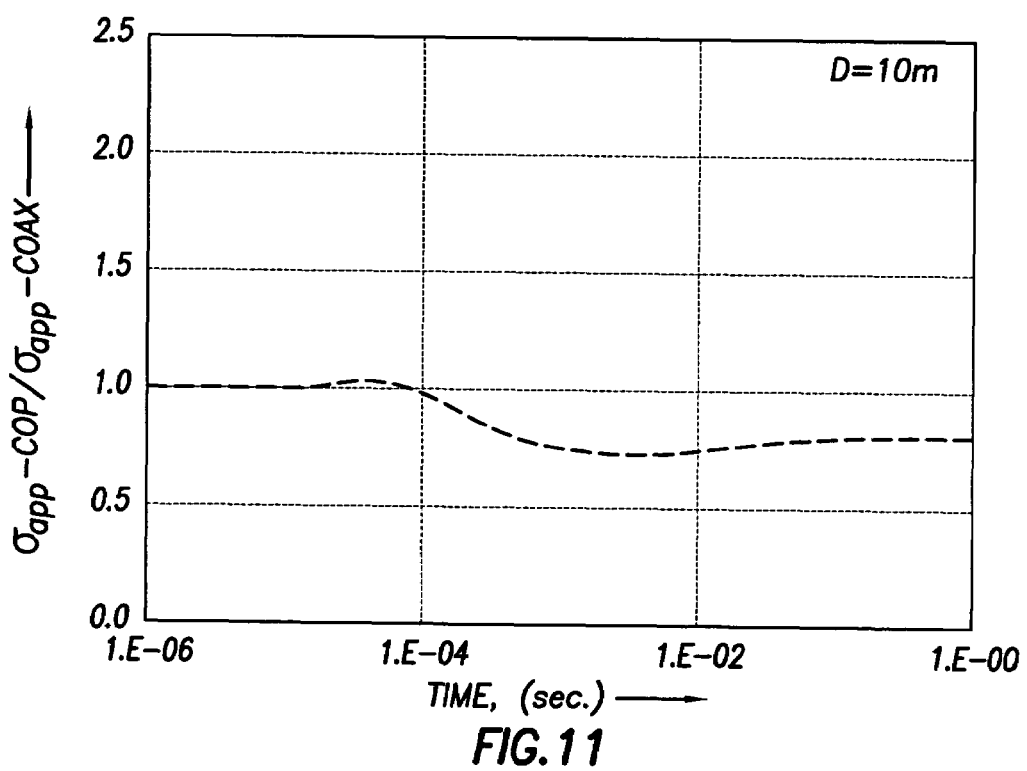
FIG. 11 is a graph showing the ratio $\sigma_{app\text{-}coplanar}(t)/\sigma_{app\text{-}coaxial}(t)$ for the same approach angle (θ) and salt face distance (D) as in FIG. 3.

Also plotted is the ratio, $\sigma_{app\text{-}coplanar}(t)/\sigma_{app\text{-}coaxial}(t)$, that is available without cross-component $V_{zx}(t)$ measurements as shown in FIG. 11, wherein the approach angle ($\theta$) and salt face distance (D) are the same as in FIG. 3.

Note that the direction to the salt face is immediately identified in the apparent dip $\theta_{app}(t)$ plot of FIG. 9 as early as $10^{-4}$ second when the presence of the resistivity anomaly is barely detected in the apparent conductivity ($\sigma_{app}(t)$) plot of FIG. 10. It takes almost $10^{-3}$ second for the apparent conductivity to approach an asymptotic $\sigma$app(later t) value and for the apparent conductivity ratio to read $\theta=30°$.

Figure 12:
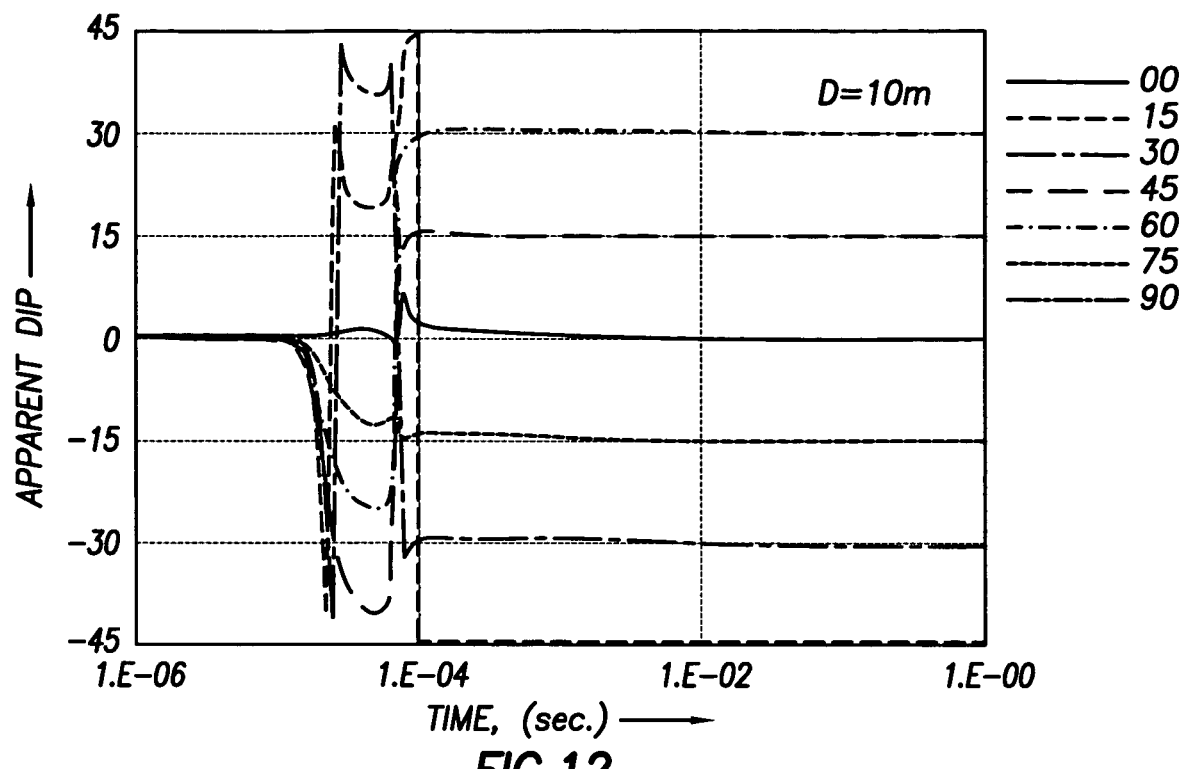
FIG. 12 is a graph showing apparent dip $\theta_{app}(t)$ for the L=1 m tool assembly when the salt face is D=10 m away, for various angles between the tool axis and the target.

FIG. 12 shows the apparent dip $\theta$app(t) for the L=1 m tool assembly when the salt face is D=10 m away, but at different angles between the tool axis and the target. The approach angle ($\theta$) may be identified at any angle.

Figure 13:
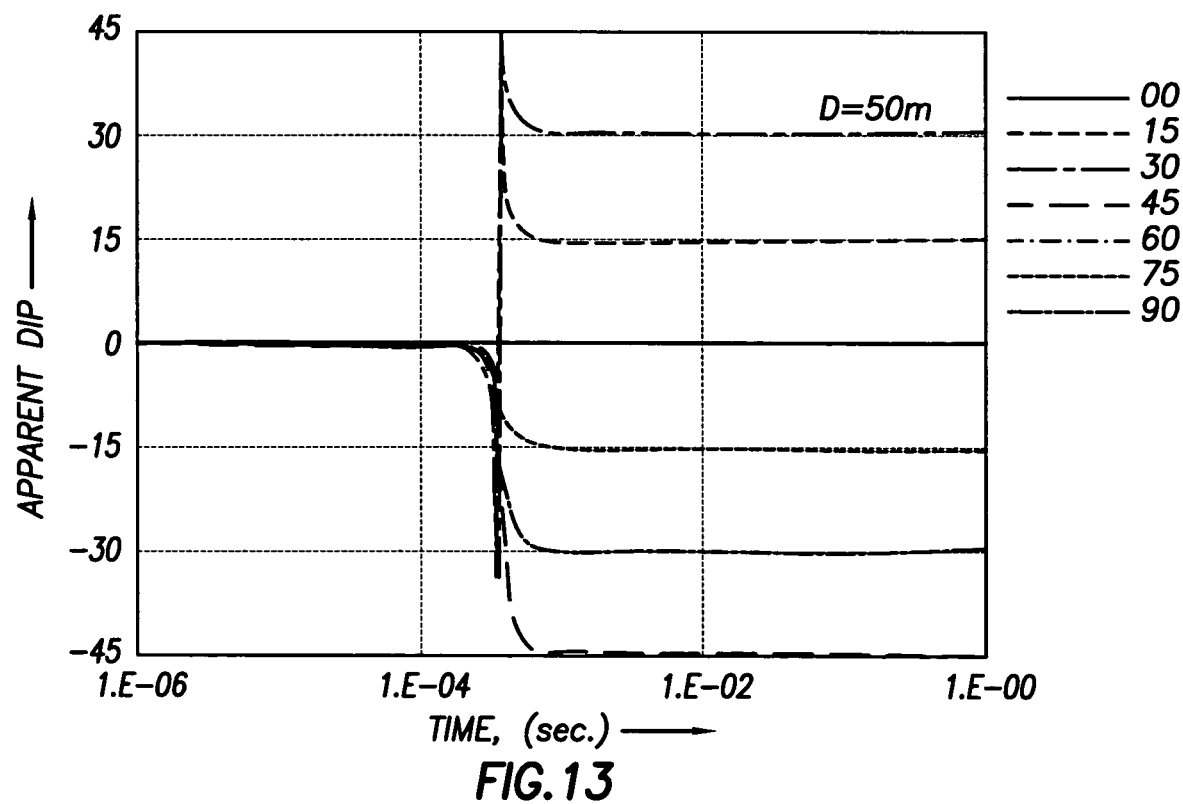
FIG. 13 is a graph similar to FIG. 12 whereby the salt face is D=50 m away from the tool.
Figure 14:
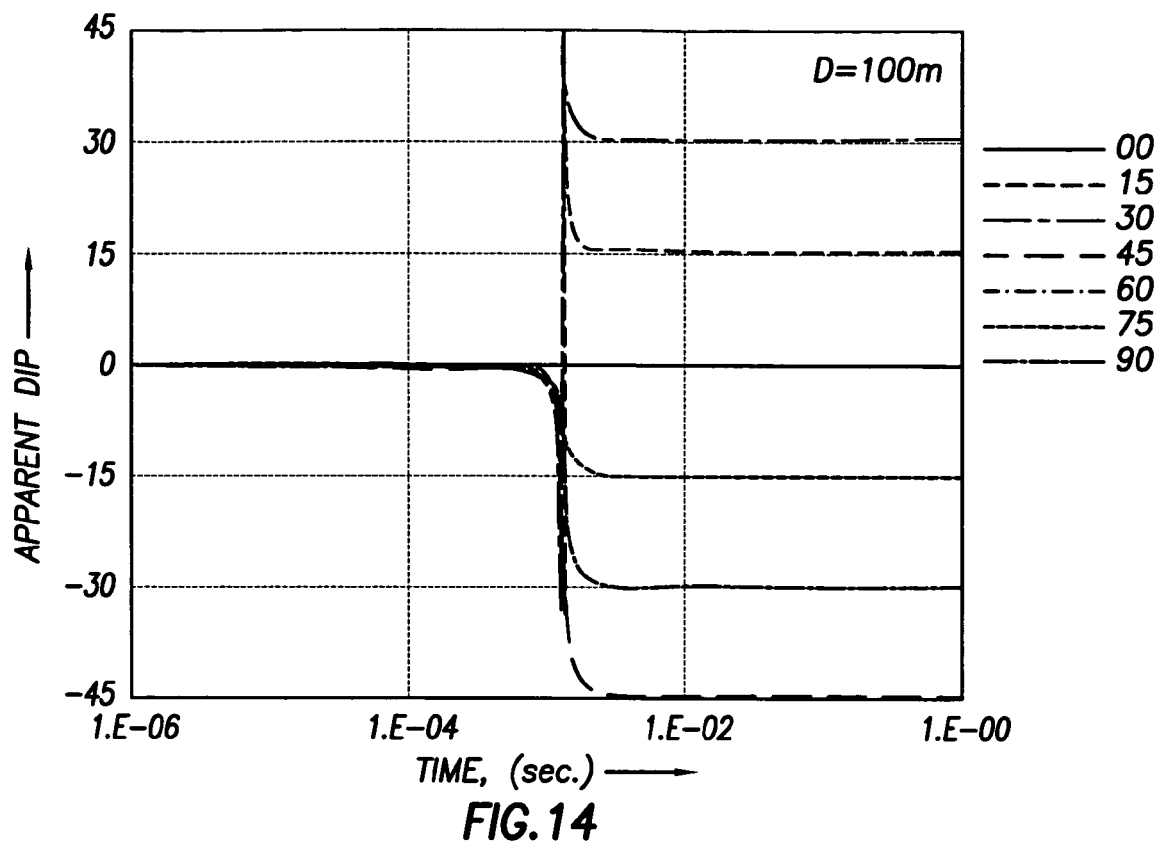
FIG. 14 is a graph similar to FIG. 12 whereby the salt face is D=100 m away from the tool.

FIG. 12 and FIGS. 13 and 14 compare the apparent dip $\theta_{app}(t)$ for different salt face distances (D) and different angles between the tool axis and the target.

The distance to the salt face can be also determined by the transition time at which $\theta_{app}(t)$ takes an asymptotic value. Even if the salt face distance (D) is 100 m, it can be identified and its direction can be measured by the apparent dip $\theta_{app}(t)$.

In summary, the method considers the coordinate transformation of transient EM responses between tool-fixed coordinates and anomaly-fixed coordinates. When the anomaly is large and far away compared to the transmitter-receiver spacing, one may ignore the effect of spacing and approximate the transient EM responses with those of the receivers near the transmitter. Then, one may assume axial symmetry exists with respect to the c-axis that defines the direction from the transmitter to the anomaly. In such an axially symmetric configuration, the cross-component responses in the anomaly-fixed coordinates are identically zero. With this assumption, a general method is provided for determining the direction to the resistivity anomaly using tri-axial transient EM responses.

The method defines the apparent dip $\theta_{app}(t)$ and the apparent azimuth $\phi_{app}(t)$ by combinations of tri-axial transient measurements. The apparent direction $\{\theta_{app}(t), \phi_{app}(t)\}$ reads the true direction $\{\theta, \phi\}$ at later time. The $\theta_{app}(t)$ and $\phi_{app}(t)$ both read zero when t is small and the effect of the anomaly is not sensed in the transient responses or the apparent conductivity. The conductivities ($\sigma_{coaxial}(t)$ and $\sigma_{coplanar}(t)$) from the coaxial and coplanar measurements both indicate the conductivity of the near formation around the tool.

Deviation of the apparent direction ($\{\theta_{app}(t), \phi_{app}(t)\}$) from zero identifies the anomaly. The distance to the anomaly is measured by the time when the apparent direction ($\{\sigma_{app}(t), \phi_{app}(t)\}$) approaches the true direction ($\{\theta, \phi\}$). The distance can be also measured from the change in the apparent conductivity. However, the anomaly is identified and measured much earlier in time in the apparent direction than in the apparent conductivity.

Apparent Conductivity

As set forth above, apparent conductivity can be used as an alternative technique to apparent angles in order to determine the location of an anomaly in a wellbore. The time-dependent apparent conductivity can be defined at each point of a time series at each logging depth. The apparent conductivity at a logging depth z is defined as the conductivity of a homogeneous formation that would generate the same tool response measured at the selected position.

In transient EM logging, transient data are collected at a logging depth or tool location z as a time series of induced voltages in a receiver loop. Accordingly, time dependent apparent conductivity ($\sigma(z; t)$) may be defined at each point of the time series at each logging depth, for a proper range of time intervals depending on the formation conductivity and the tool specifications.

Apparent Conductivity for a Coaxial Tool

The induced voltage of a coaxial tool with transmitter-receiver spacing L in the homogeneous formation of conductivity ($\sigma$) is given by, $$V_{zZ}(t) = C\frac{(\mu_0\sigma)^{3/2}}{8t^{5/2}}e^{-u^2} \text{ where } u^2 = \frac{\mu_0\sigma}{4}\frac{L^2}{t} \qquad (32)$$

and C is a constant.

Figure 15:
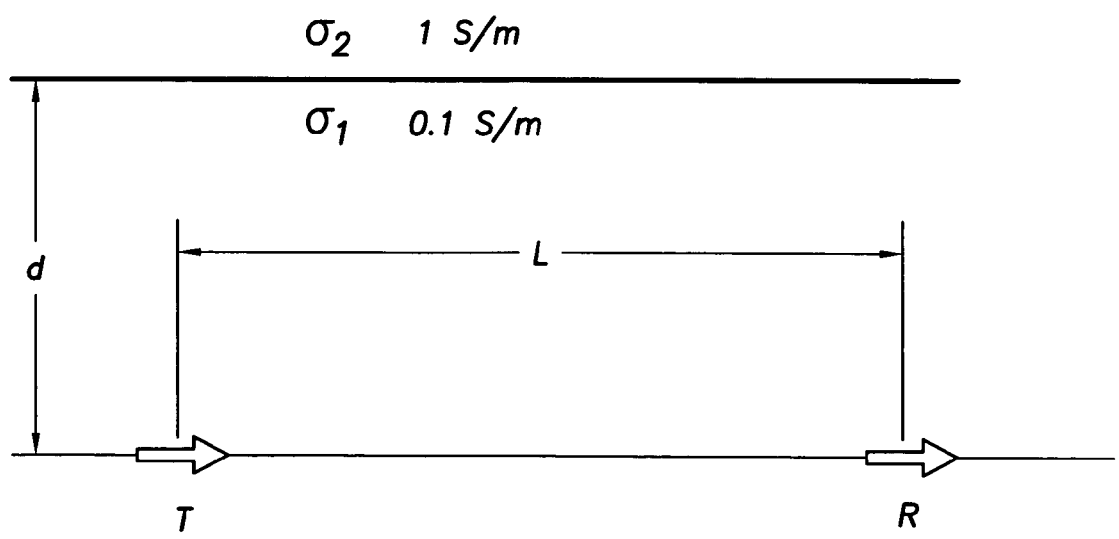
FIG. 15 is a schematic showing apparent conductivity with a coaxial tool.

FIG. 15 illustrates a coaxial tool in which both a transmitter coil (T) and a receiver coil (R) are wound around the common tool axis. The symbols $\sigma_1$ and $\sigma_2$ may represent the conductivities of two formation layers. This tool is used to illustrate the voltage response for different values of t and L in FIGS. 17-18 below, where $\sigma_1=\sigma_2$.

Figure 16:
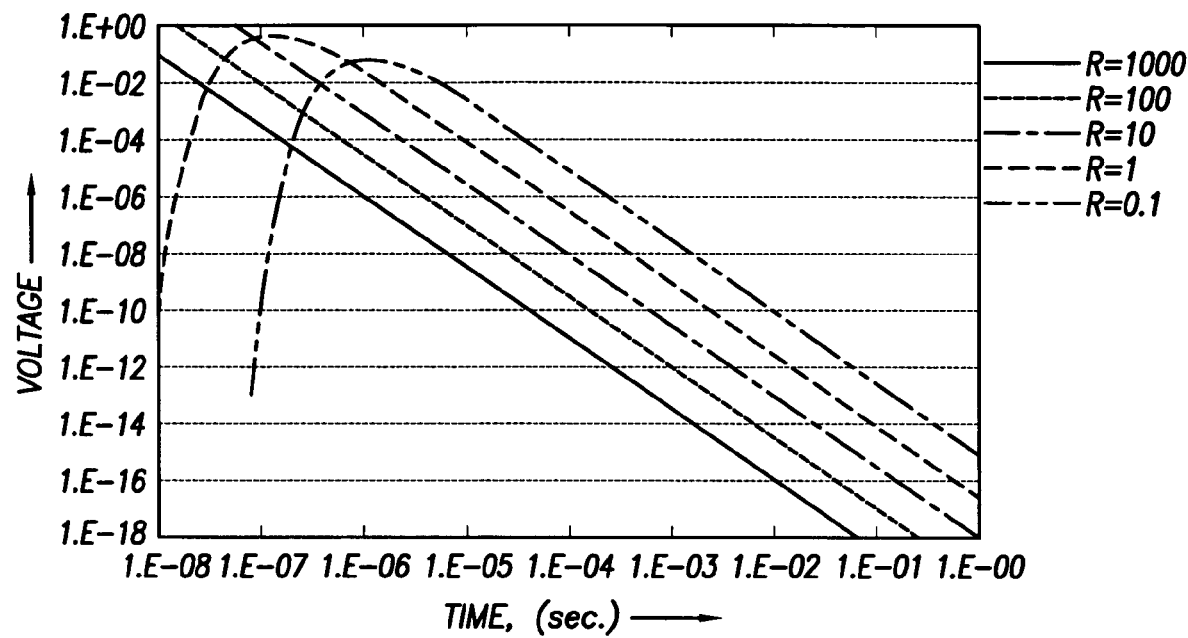
FIG. 16 is a graph showing voltage response of the coaxial tool of FIG. 15 in a homogeneous formation for various formation resistivities.

FIG. 16 shows the voltage response of the coaxial tool with L=01 m in a homogeneous formation for various formation resistivities (R) from 1000 ohm-m to 0.1 ohm-m. The voltage is positive at all times t for t>0. The slope of the voltage is nearly constant $$\frac{\partial \ln V_{zZ}(t)}{\partial \ln t} \approx -\frac{5}{2}$$

in the time interval between $10^{-8}$ second and 1 second (and later) for any formation resistivity larger than 10 ohm-m. The slope changes sign at an earlier time around $10^{-6}$ second when the resistivity is low as 0.1 ohm-m.

Figure 17:
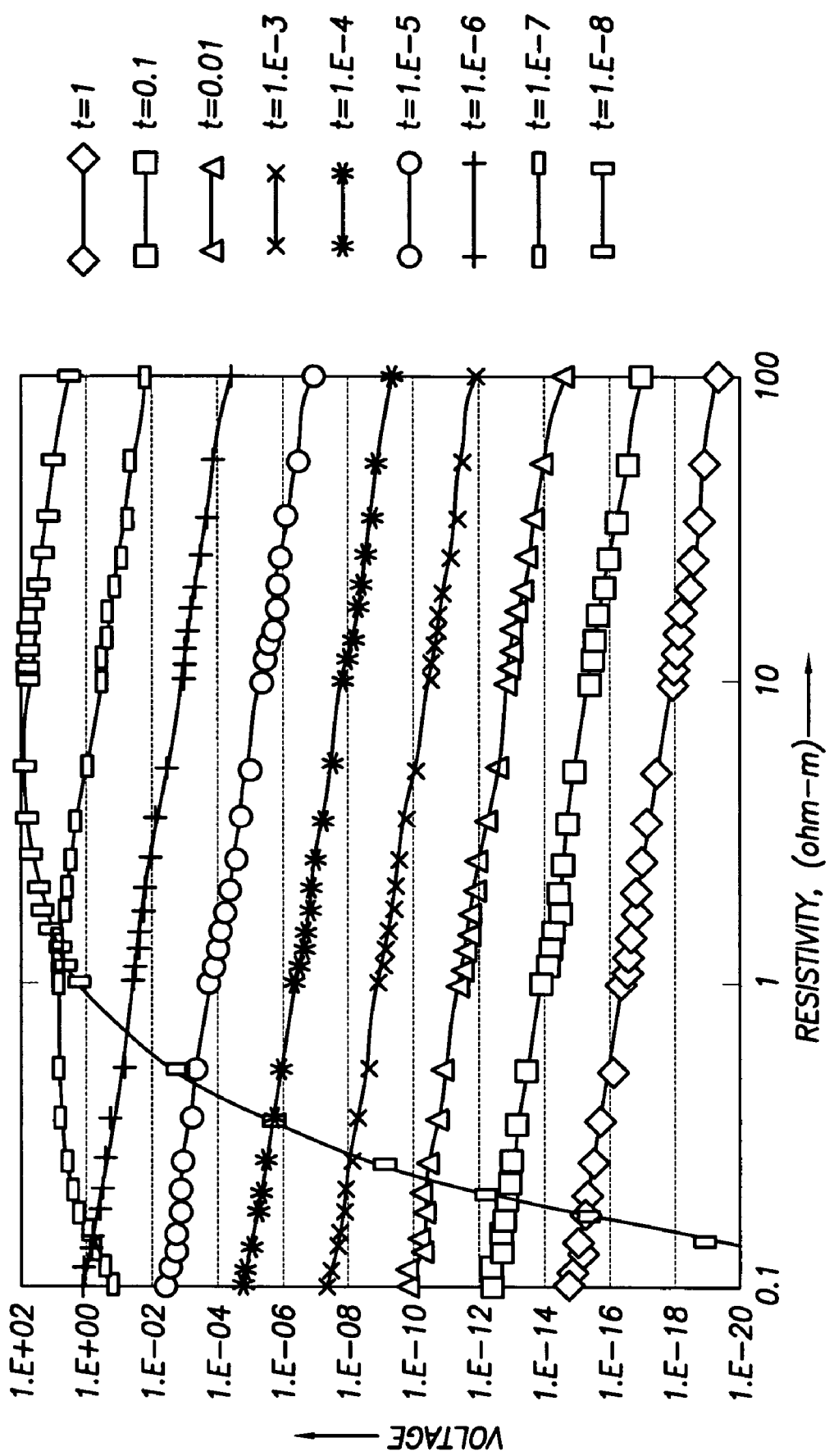
FIG. 17 is a graph showing voltage response in a homogeneous formation as a function of formation resistivity at different times (t) for the same coaxial tool.

FIG. 17 shows the voltage response as a function of formation resistivity at different times (t) for the same coaxial tool spacing (L=1 m). For the resistivity range from 0.1 ohm-m to 100 ohm-m, the voltage response is single valued as a function of formation resistivity for the measurement time (t) later than $10^{-6}$ second. At smaller times (t), for instance at $10^{-7}$ second, the voltage is no longer single valued. The same voltage response is realized at two different formation resistivity values.

Figure 18:
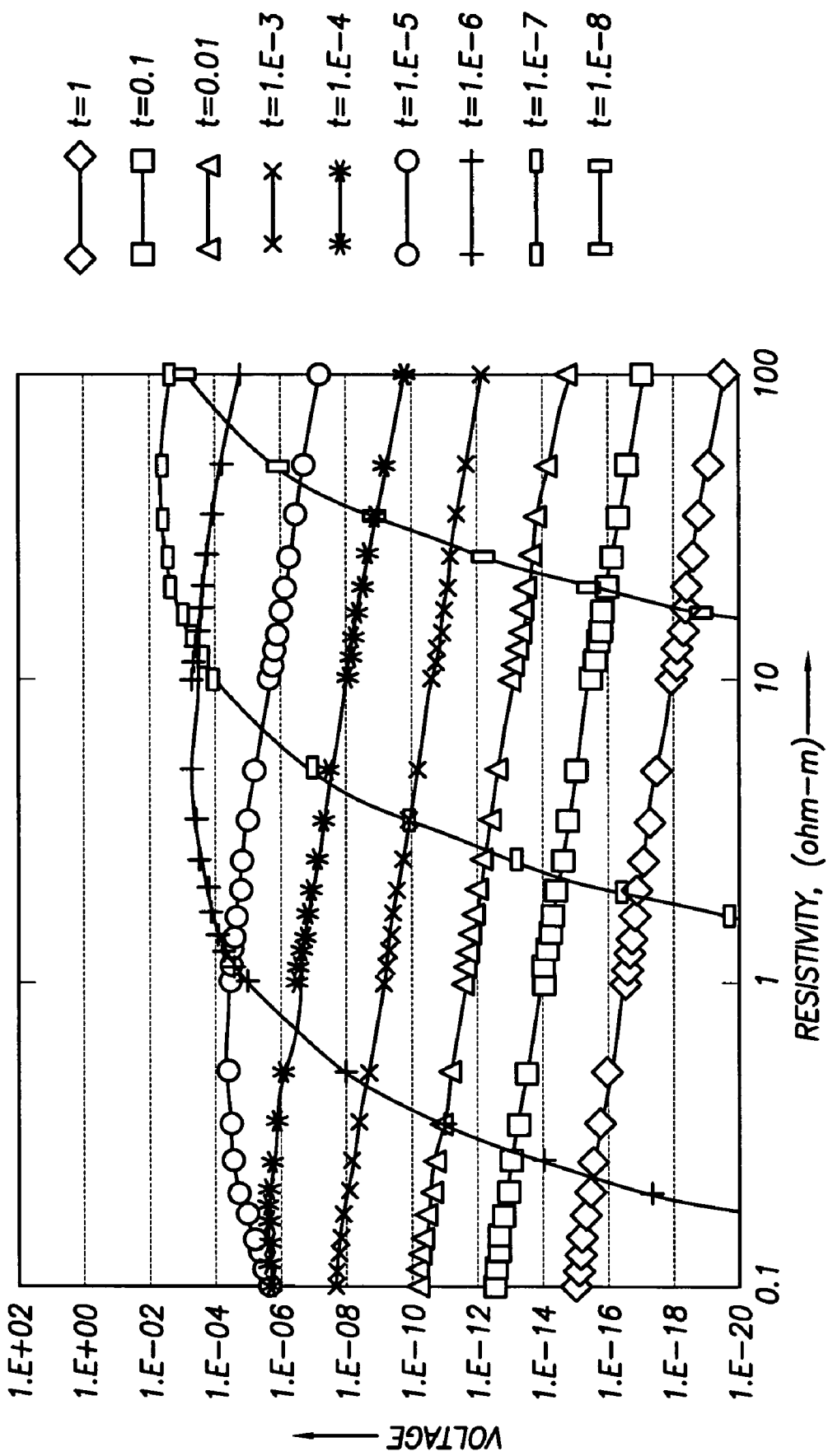
FIG. 18 is a graph showing voltage response in a homogeneous formation as a function of formation resistivity for a larger transmitter-receiver spacing than in FIG. 17.

FIG. 18 shows the voltage response as a function of formation resistivity for a larger transmitter-receiver spacing of L=10 m on a coaxial tool. The time interval when the voltage response is single valued is shifted toward larger times (t). The voltage response is single valued for resistivity from 0.1 ohm-m to 100 ohm-m, for the measurement time (t) later than $10^{-4}$ second. At smaller values of t, for instance at $t=10^{-5}$ second, the voltage is no longer single valued. The apparent conductivity from a single measurement (coaxial, single spacing) alone is not well defined.

For relatively compact transmitter-receiver spacing (L=1 m to 10 m), and for the time measurement interval where t is greater than $10^{-6}$ second, the transient EM voltage response is mostly single valued as a function of formation resistivity between 0.1-ohm-m and 100 ohm-m (and higher). This enables definition of the time-changing apparent conductivity from the voltage response ($V_{zZ}(t)$) at each time of measurement as:

$$C\frac{(\mu_0 \sigma_{app}(t))^{3/2}}{8t^{5/2}} e^{-u_{app}(t)^2} = V_{zZ}(t) \text{ where } u_{app}(t)^2 = \frac{\mu_0 \sigma_{app}(t)}{4}\frac{L^2}{t} \quad (33)$$

and $V_{zZ}(t)$ on the right hand side is the measured voltage response of the coaxial tool. From a single type of measurement (coaxial, single spacing), the greater the spacing L, the larger the measurement time (t) should be to apply the apparent conductivity concept. The $\sigma_{app}(t)$ should be constant and equal to the formation conductivity in a homogeneous formation: $\sigma_{app}(t)=\sigma$. The deviation from a constant ($\sigma$) at time (t) suggests a conductivity anomaly in the region specified by time (t).

Apparent Conductivity for a Coplanar Tool

The induced voltage of the coplanar tool with transmitter-receiver spacing L in the homogeneous formation of conductivity ($\sigma$) is given by, $$V_{xX}(t) = C\frac{(\mu_0 \sigma)^{3/2}}{8t^{5/2}}(1-u^2)e^{-u^2} \text{ where } u^2 = \frac{\mu_0 \sigma}{4t}L^2 \quad (34)$$

and C is a constant. At small values of t, the coplanar voltage changes polarity depending on the spacing L and the formation conductivity.

Figure 19:
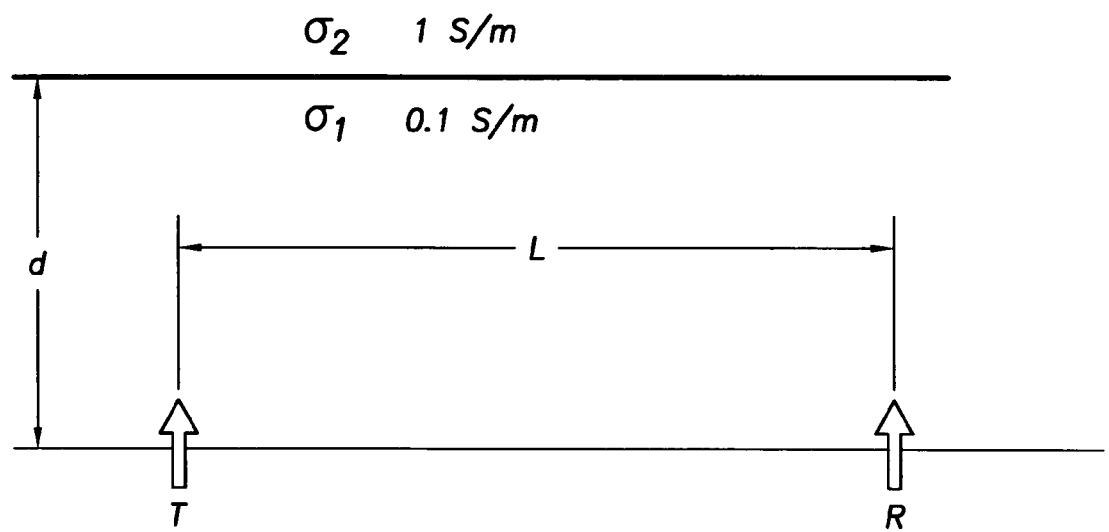
FIG. 19 is a schematic showing apparent conductivity with a coplanar tool.

FIG. 19 illustrates a coplanar tool in which the transmitter (T) and the receiver (R) are parallel to each other and oriented perpendicularly to the tool axis. The symbols $\sigma_1$ and $\sigma_2$ may represent the conductivities of two formation layers. This tool is used to illustrate the voltage response for different values of t and L in FIGS. 21-22 below, where $\sigma_1=\sigma_2$.

Figure 20:
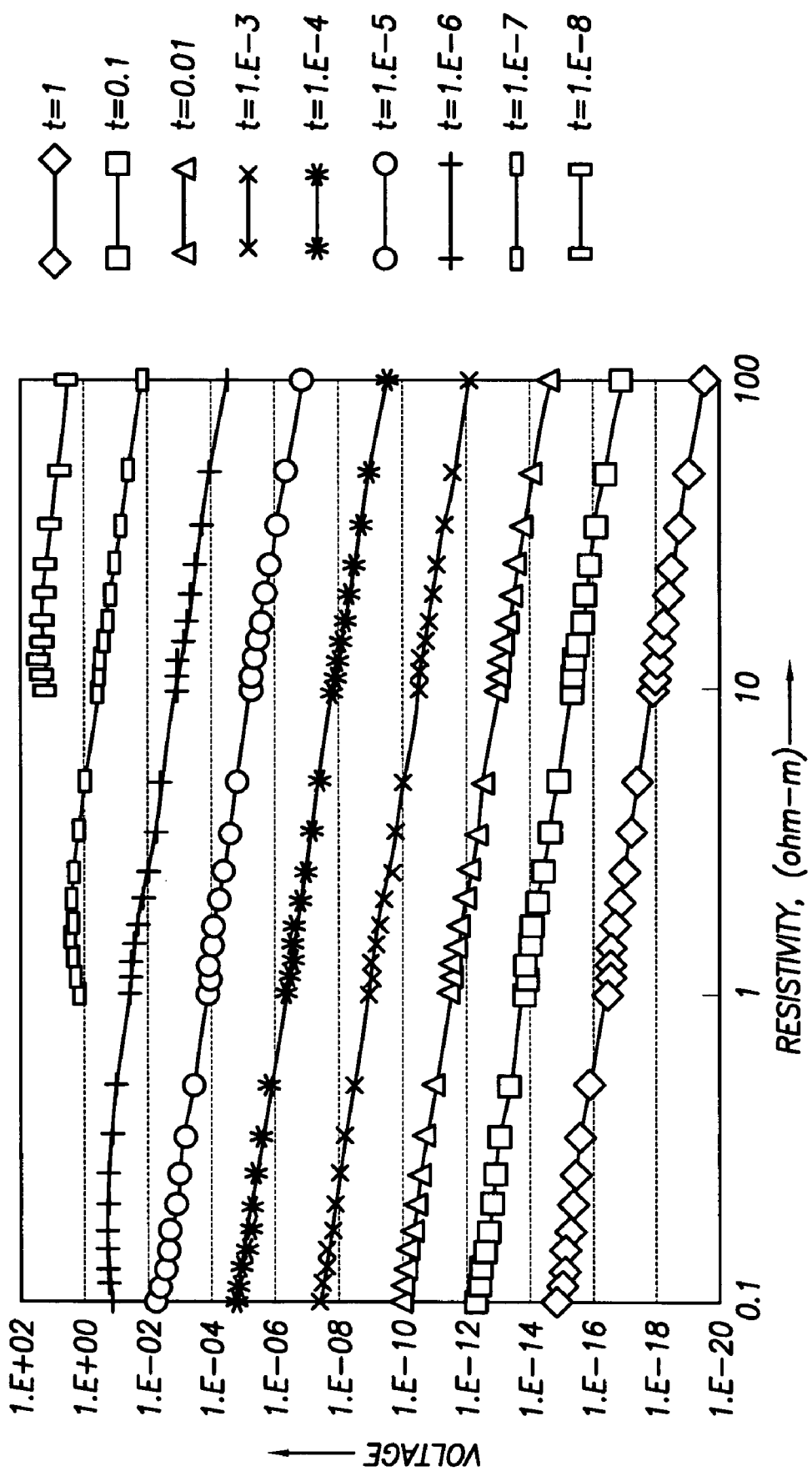
FIG. 20 graphically shows voltage response of the coplanar tool of FIG. 19 with a transmitter/receiver separation of L=1 m, in a homogeneous formation as a function of formation resistivity at different times (t)

FIG. 20 shows the voltage response of a coplanar tool with a length L=1 m as a function of formation resistivity at different times (t). For the resistivity range from 0.1 ohm-m to 100 ohm-m, the voltage response is single valued as a function of formation resistivity for values of t larger than $10^{-6}$ second. At smaller values of t, for instance at $t=10^{-7}$ second, the voltage changes polarity and is no longer single valued.

Figure 21:
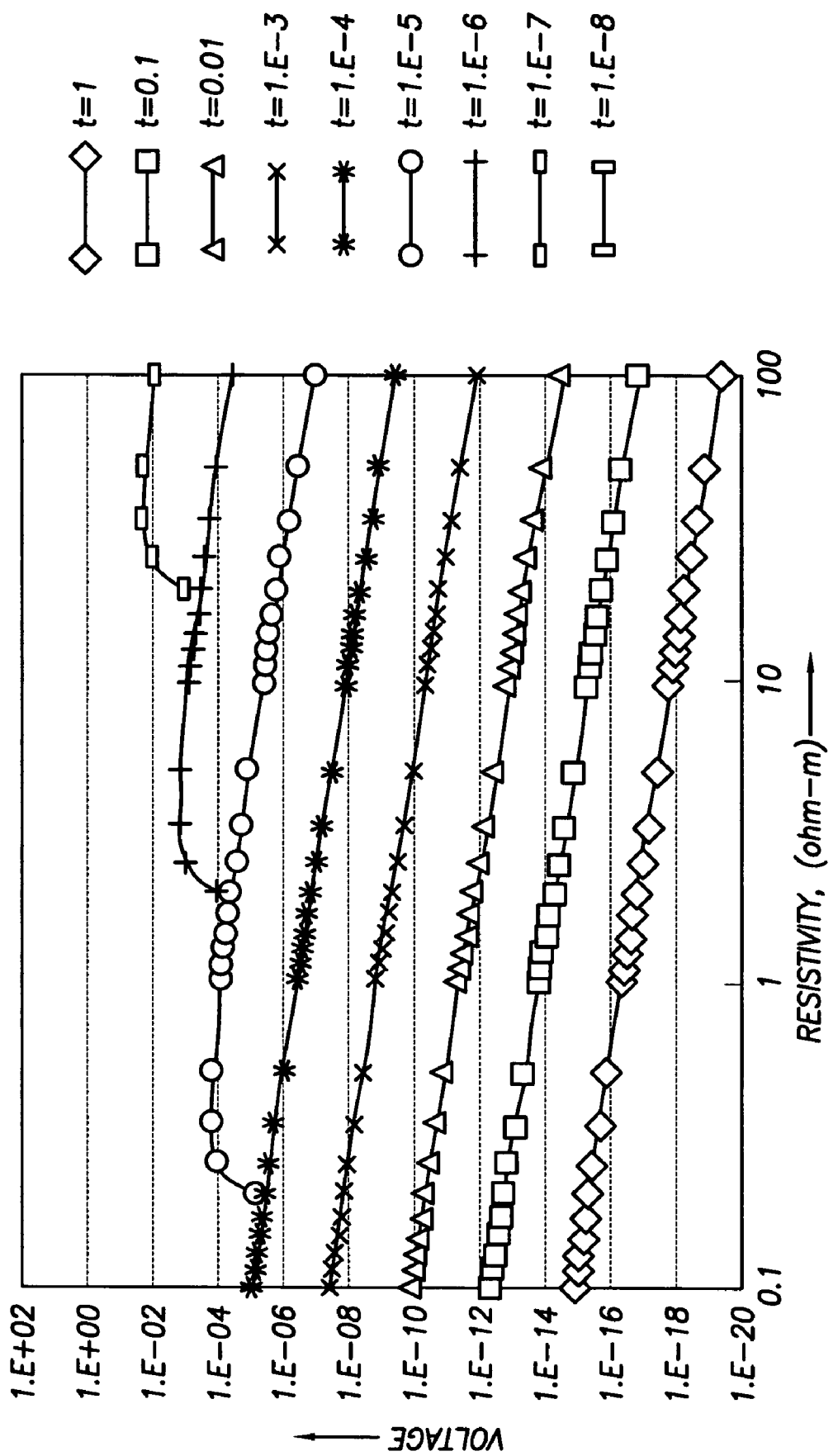
FIG. 21 graphically shows voltage response in a homogeneous formation as a function of formation resistivity for a larger transmitter-receiver spacing than in FIG. 20.

FIG. 21 shows the voltage response as a function of formation resistivity at different times (t) for a longer coplanar tool with a length L=5 m. The time interval when the voltage response is single valued is shifted towards larger values of t.

Similarly to the coaxial tool response, the time-changing apparent conductivity is defined from the coplanar tool response $V_{xX}(t)$ at each time of measurement as, $$C\frac{(\mu_0 \sigma_{app}(t))^{3/2}}{8t^{5/2}}(1-u_{app}(t)^2)e^{-u_{app}(t)^2} = \quad (35)$$
$$V_{xX}(t) \text{ where } u_{app}(t)^2 = \frac{\mu_0 \sigma_{app}(t)}{4}\frac{L^2}{t}$$

and $V_{xX}(t)$ on the right hand side is the measured voltage response of the coplanar tool. The longer the spacing, the larger the value t should be to apply the apparent conductivity concept from a single type of measurement (coplanar, single spacing). The $\sigma_{app}(t)$ should be constant and equal to the formation conductivity in a homogeneous formation: $\sigma_{app}(t)=\sigma$.

Apparent Conductivity For a Pair of Coaxial Tools

When there are two coaxial receivers, the ratio between the pair of voltage measurements is given by, $$\frac{V_{zZ}(L_1;t)}{V_{zZ}(L_2;t)} = e^{-\frac{\mu_0 \sigma}{4t}(L_1^2 - L_2^2)} \quad (36)$$

where $L_1$ and $L_2$ are transmitter-receiver spacing of two coaxial tools.

Conversely, the time-changing apparent conductivity is defined for a pair of coaxial tools by, $$\sigma_{app}(t) = \frac{-\ln\left(\frac{V_{zZ}(L_1;t)}{V_{zZ}(L_2;t)}\right)}{(L_1^2 - L_2^2)}\frac{4t}{\mu_0} \quad (37)$$

at each time of measurement. The $\sigma_{app}(t)$ should be constant and equal to the formation conductivity in a homogeneous formation: $\sigma_{app}(t)=\sigma$.

The apparent conductivity is similarly defined for a pair of coplanar tools or for a pair of coaxial and coplanar tools. The $\sigma_{app}(t)$ should be constant and equal to the formation conductivity in a homogeneous formation: $\sigma_{app}(t)=\sigma$. The deviation from a constant ($\sigma$) at time (t) suggests a conductivity anomaly in the region specified by time (t).

Analysis of Coaxial Transient Response in Two-layer Models

To illustrate usefulness of the concept of apparent conductivity, the transient response of a tool in a two-layer earth model, as in FIG. 15 for example, can be examined. A coaxial tool with a transmitter-receiver spacing L may be placed in a horizontal well. Apparent conductivity ($\sigma_{app}(t)$) reveals three parameters including:

(1) the conductivity ( in the present example $\sigma_1=0.1$ S/m) of a first layer in which the tool is placed; the conductivity (in the present example $\sigma_2=1$ S/m) of an adjacent bed; and (2) the distance of the tool (horizontal borehole) to the layer boundary, for which in the present example d=1, 5, 10, 25, and 50 m are shown.

Under a more general circumstance, the relative direction of a borehole and tool to the bed interface is not known. In the case of horizontal well logging, it's trivial to infer that the tool is parallel to the interface as the response does not change when the tool moves.

Figure 22:
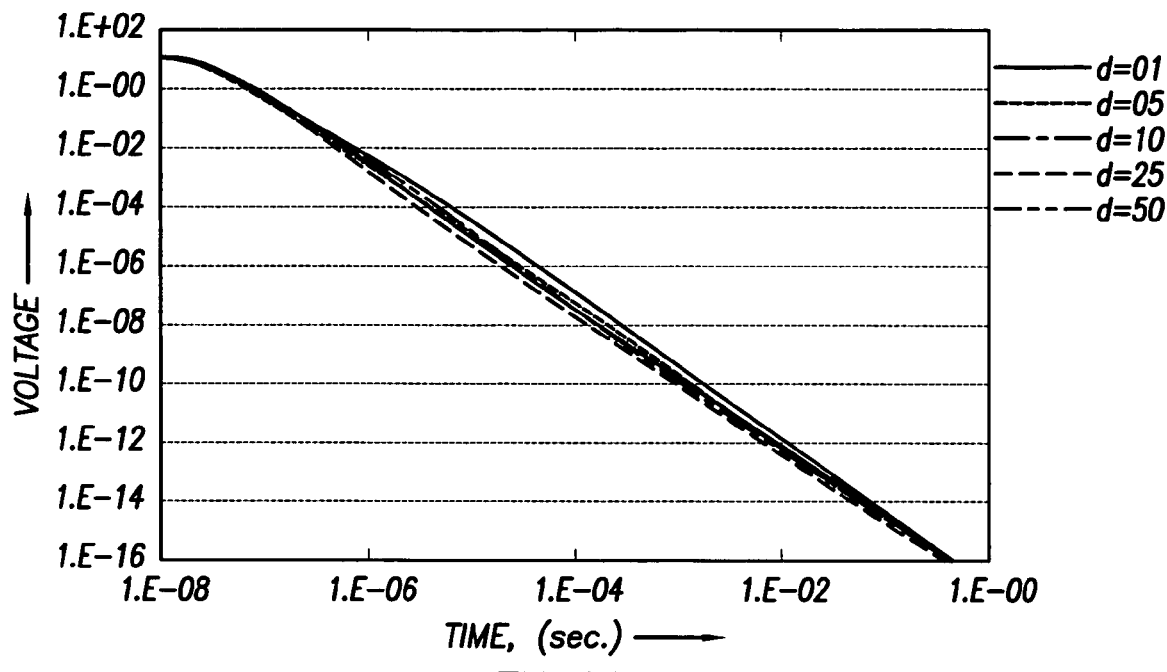
FIG. 22 is a graph showing voltage response as a function of t as given by the coaxial tool of FIG. 15 in a two-layer formation at different distances from the bed.
Figure 23:
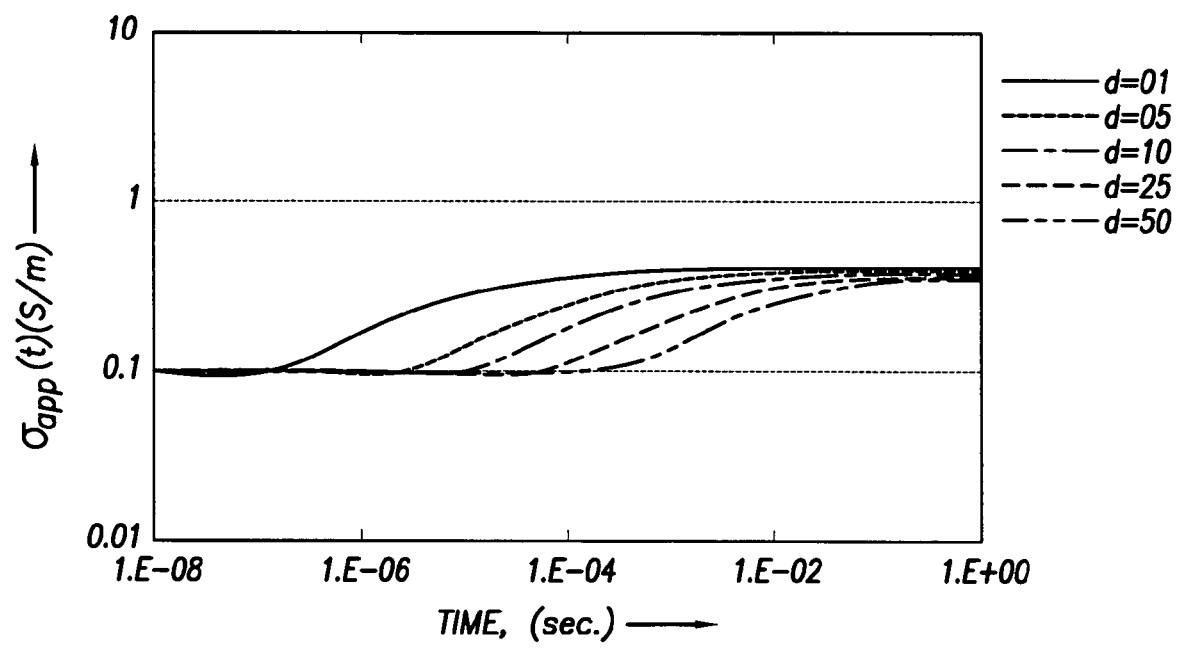
FIG. 23 is a graph showing the voltage response data of FIG. 22 in terms of the apparent conductivity ($\sigma_{app}(t)$)

The voltage response of the L=01 m transmitter-receiver offset coaxial tool at different distances is shown in FIG. 22. Information can be derived from these responses using apparent conductivity as further explained with regard to FIG. 23. FIG. 23 shows the voltage data of FIG. 22 plotted in terms of apparent conductivity. The apparent conductivity plot shows conductivity at small t, conductivity at large t, and the transition time that moves as the distance (d) changes.

Figure 24:
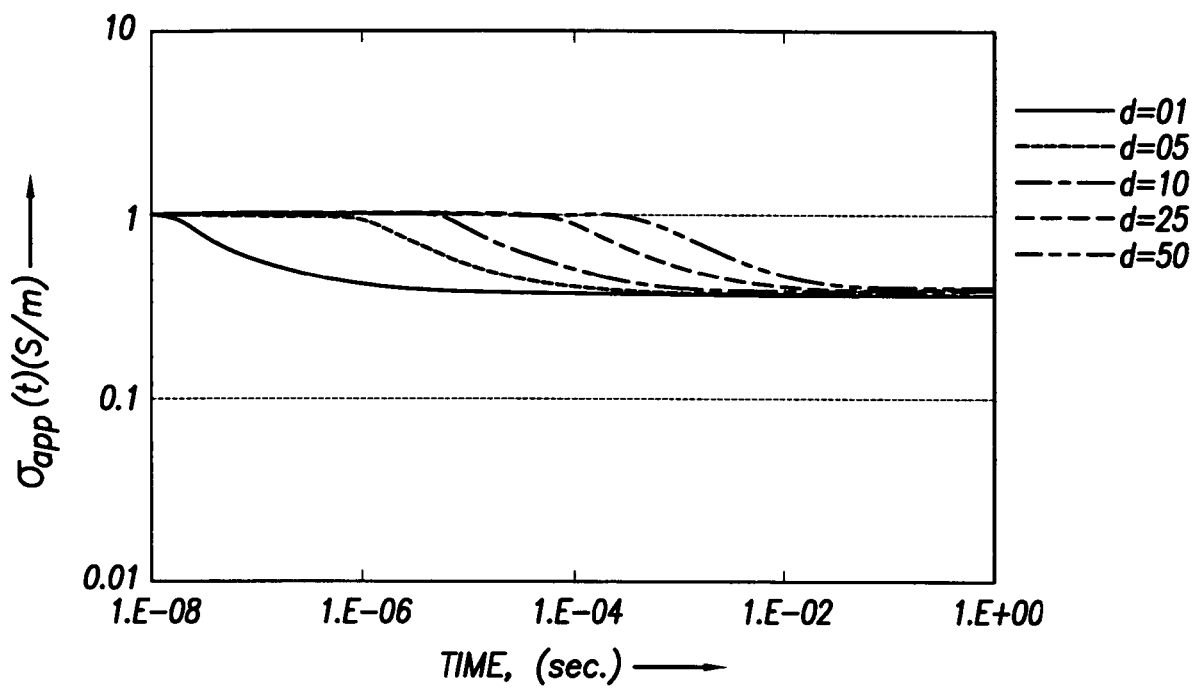
FIG. 24 is similar to FIG. 23 except that the resistivities of layers 1 and 2 have been interchanged.

As will be further explained below, in a two-layer resistivity profile, the apparent conductivity as t approaches zero can identify the layer conductivity around the tool, while the apparent conductivity as t approaches infinity can be used to determine the conductivity of the adjacent layer at a distance. The distance to a bed boundary from the tool can also be measured from the transition time observed in the apparent conductivity plot. The apparent conductivity plot for both time and tool location may be used as an image presentation of the transient data. Similarly, FIG. 24 illustrates the apparent conductivity in a two-layer model where $\sigma_1$=1 S/m ($R_1$=1 ohm-m) and $\sigma_2$=0.1 S/m ($R_2$=1 ohm-m)).

Conductivity at Small Values of t

At small values of t, the tool reads the apparent conductivity of the first layer around the tool. At large values of t, the tool reads 0.4 S/m for a two-layer model where $\sigma_1$=0.1 S/m ($R_1$=10 ohm-m) and $\sigma_2$=1 S/m ($R_2$=1 ohm-m), which is an average between the conductivities of the two layers. The change of distance (d) is reflected in the transition time.

Conductivity at small values of t is the conductivity of the local layer where the tool is located. At small values of t, the signal reaches the receiver directly from the transmitter without interfering with the bed boundary. Namely, the signal is affected only by the conductivity around the tool. Conversely, the layer conductivity can be measured easily by examining the apparent conductivity at small values of t.

Conductivity at Large Values of t

Conductivity at large values of t is some average of conductivities of both layers. At large values of t, nearly half of the signals come from the formation below the tool and the remaining signals come from above, if the time for the signal to travel the distance between the tool and the bed boundary is small.

Figure 25:
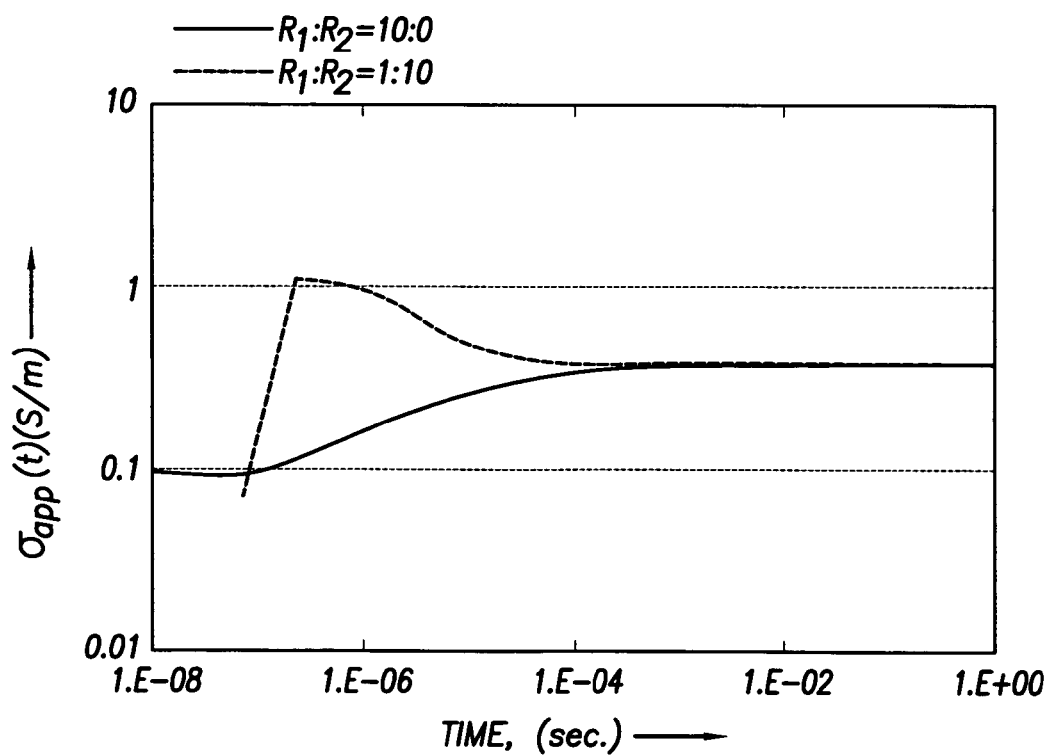
FIG. 25 presents a graph comparing $\sigma_{app}(t)$ of FIG. 23 and FIG. 24 relating to d=1 m.

FIG. 25 compares the $\sigma_{app}(t)$ plot of FIGS. 23 and 25 for L=1 m and d=1 m where the resistivity ratio $R_1/R_2$ is 10:1 in FIG. 23 and 1:10 in FIG. 24. Though not shown, the conductivity at large values of t has a slight dependence on d. When the dependence is ignored, the conductivity at large values of t is determined solely by the conductivities of the two layers and is not affected by the location of the tool in layer 1 or layer 2.

Figure 26:
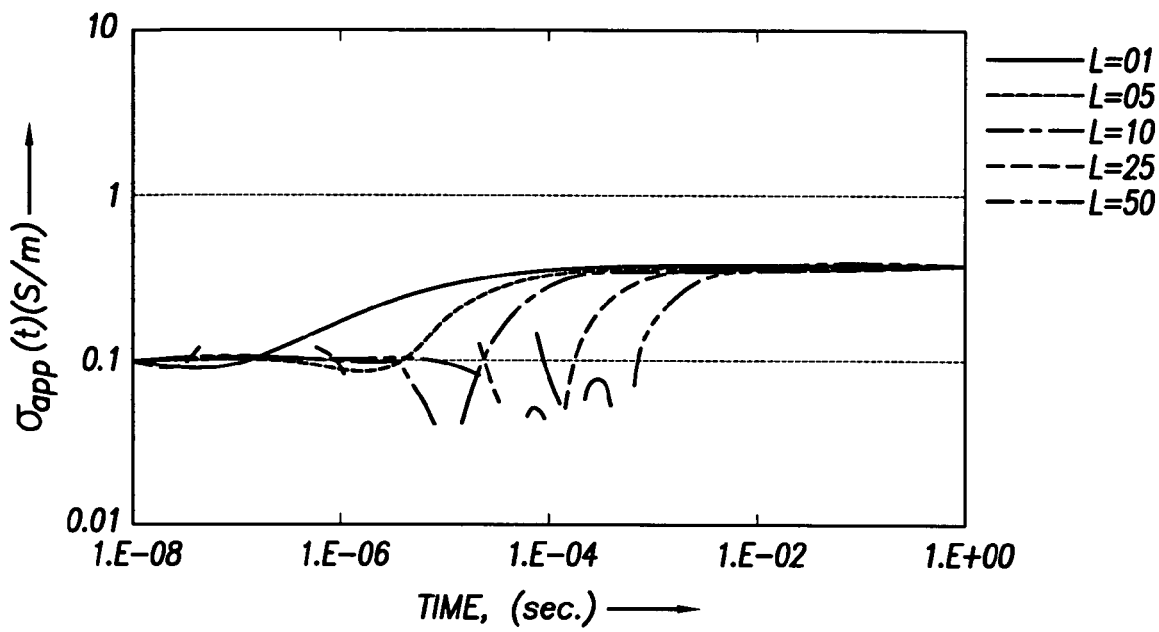
FIG. 26 shows a graph of $\sigma_{app}(t)$ for various transmitter/receiver spacings L in case d=1 m.

FIG. 26 compares the σapp(t) plots for d=1 m but with different spacings L. The σapp(t) reaches the nearly constant conductivity at large values of t as L increases. However, the conductivity at large values of t is almost independent of the spacing L for the range of d and the conductivities considered.

Figure 27:
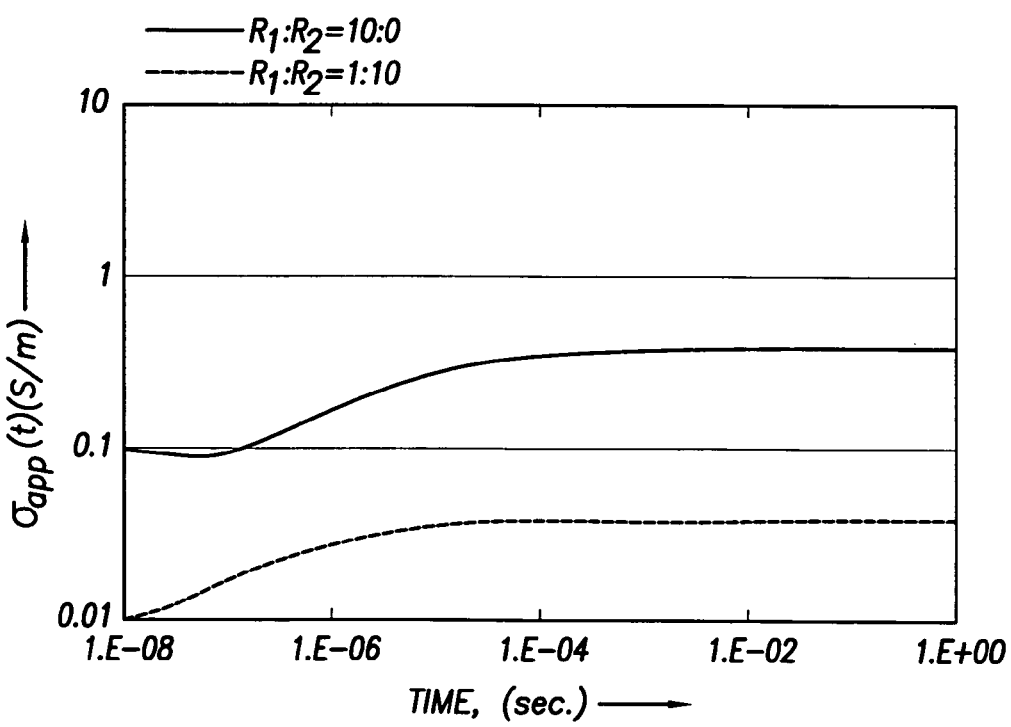
FIG. 27 shows $\sigma_{app}(t)$ plots for d=1 m and L=01 m for two resistivity ratios.

FIG. 27 compares the σapp(t) plots for d=1 m and L=1 m but for different resistivity ratios. The apparent conductivity at large t is proportional to $\sigma_1$ for the same ratio ($\sigma_1/\sigma_2$). For instance:

$$\sigma_{app}(t \to \infty; R_1/R_2 = 10, R_1 = 10 \text{ ohm-m}) = \quad (38)$$
$$10 * \sigma_{app}(t \to \infty; R_1/R_2 = 10, R_1 = 100 \text{ ohm-m})$$

Figure 28:
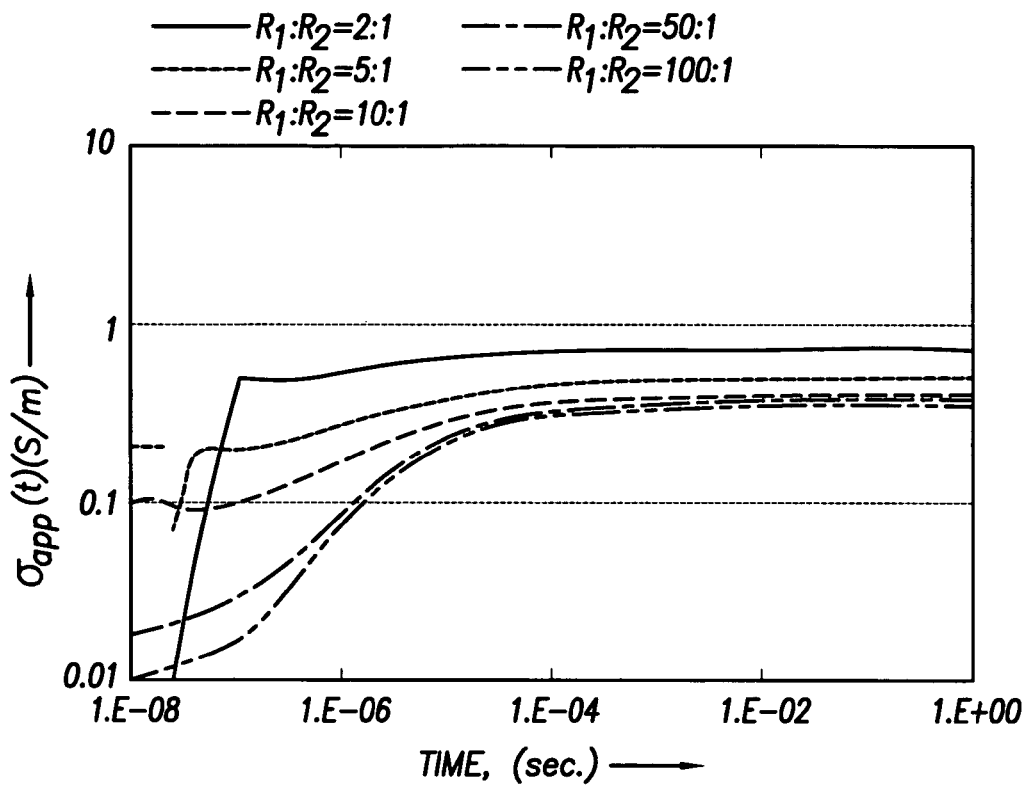
FIG. 28 shows a graph of the $\sigma_{app}(t)$ for the case d=1 m and L=01 m, for various resistivity ratios while the target resistivity is fixed at $R_2$=1 ohm-m.
Figure 29:
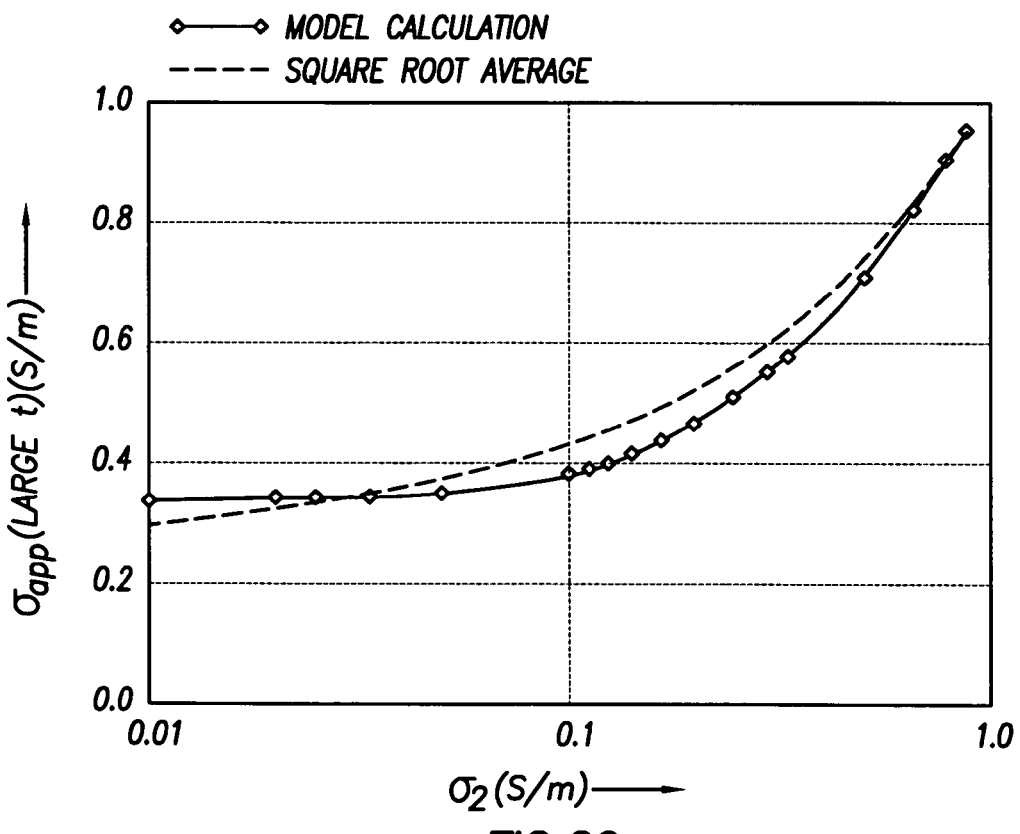
FIG. 29 shows a comparison of apparent conductivity at large values of t for coaxial responses where d=01 m and L=01 m as a function of conductivity of the target layer while the local conductivity is fixed at 1 S/m.

FIG. 28 shows examples of the app (t) plots for d=1 m and L=1 m but for different resistivity ratios of the target layer 2 while the local conductivity ($\sigma_1$) is fixed at 1 S/m ($R_1$=1 ohm-m). The apparent conductivity at large values of t is determined by the target layer 2 conductivity, as shown in FIG. 29 when $\sigma_1$ is fixed at 1 S/m.

Numerically, the late time conductivity may be approximated by the square root average of two-layer conductivities as:

$$\sqrt{\sigma_{app}(t \to \infty; \sigma_1, \sigma_2)} = \frac{\sqrt{\sigma_1} + \sqrt{\sigma_2}}{2} \quad (39)$$

Figure 30:
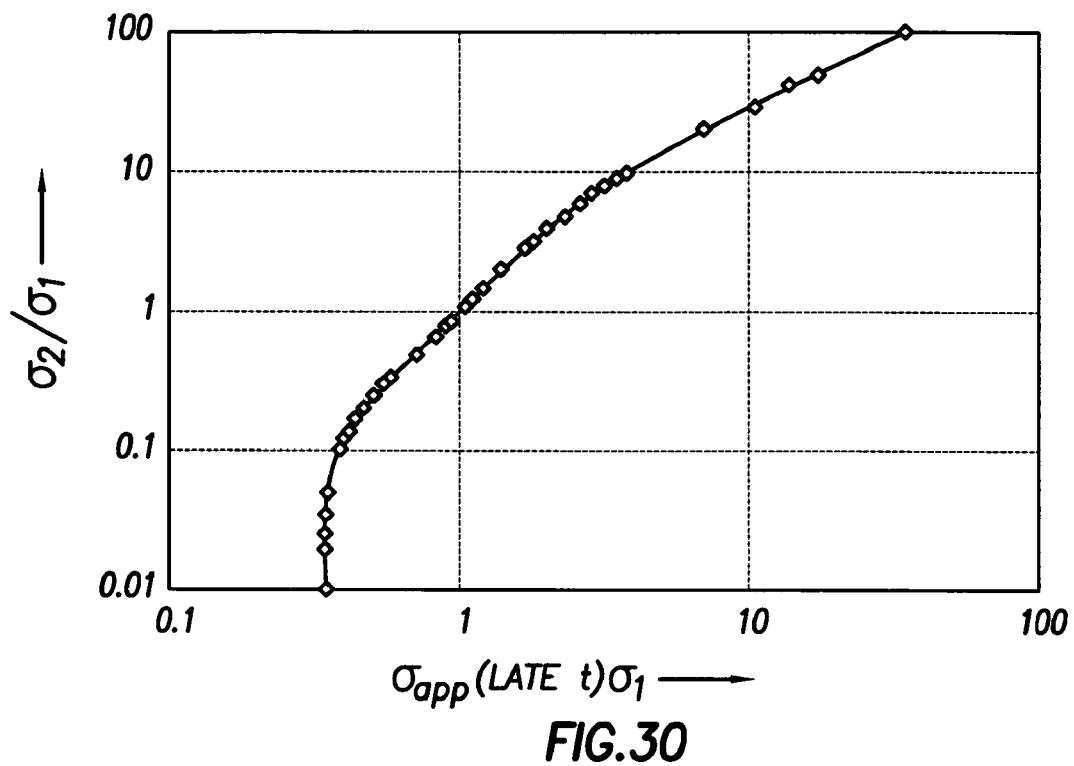
FIG. 30 graphically shows the same data as FIG. 29 plotted as the ratio of target conductivity over local layer conductivity versus ratio of the late time apparent conductivity over local layer conductivity.

To summarize, the conductivity at large values of t (as t approaches infinity) can be used to estimate the conductivity ($\sigma_2$) of the adjacent layer when the local conductivity ($\sigma_1$) near the tool is known, for instance from the conductivity as t approaches 0 as illustrated in FIG. 30.

Estimation of d, The Distance to the Adjacent Bed

Figure 31:
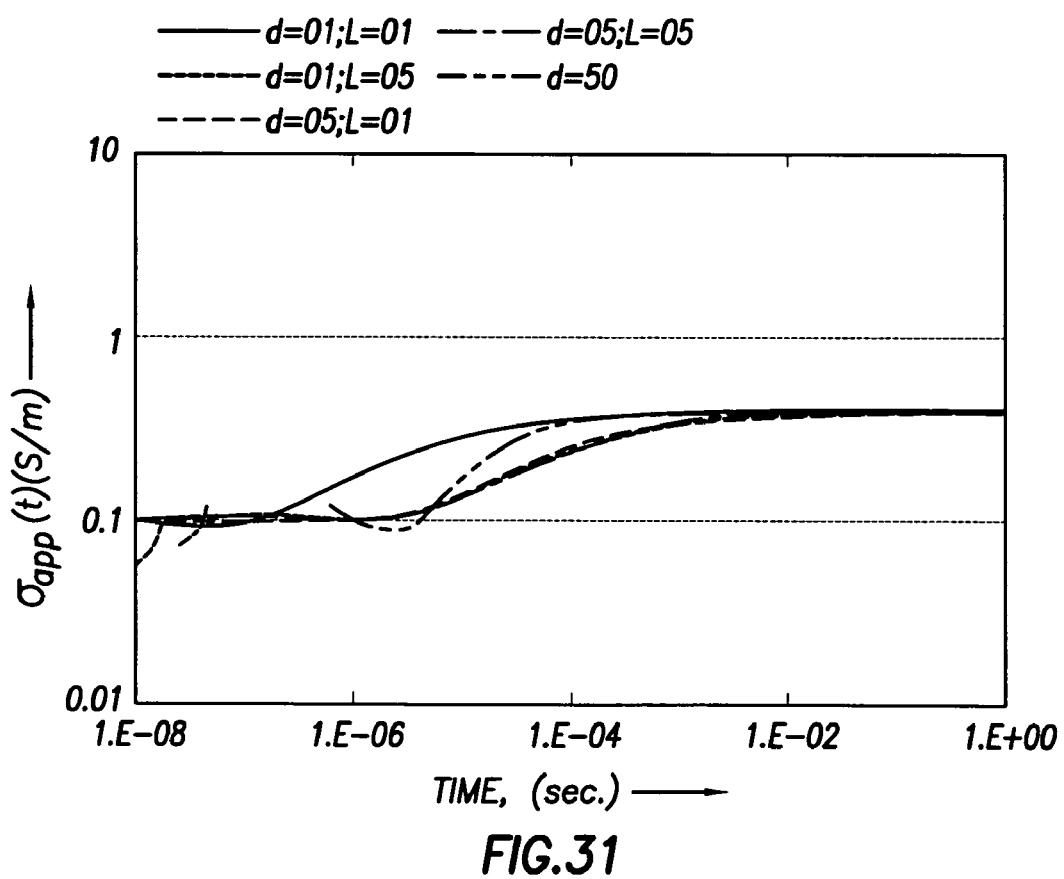
FIG. 31 shows a graph containing apparent conductivity ($\sigma_{app}(t)$) versus time for various combinations of d and L.
Figure 32:
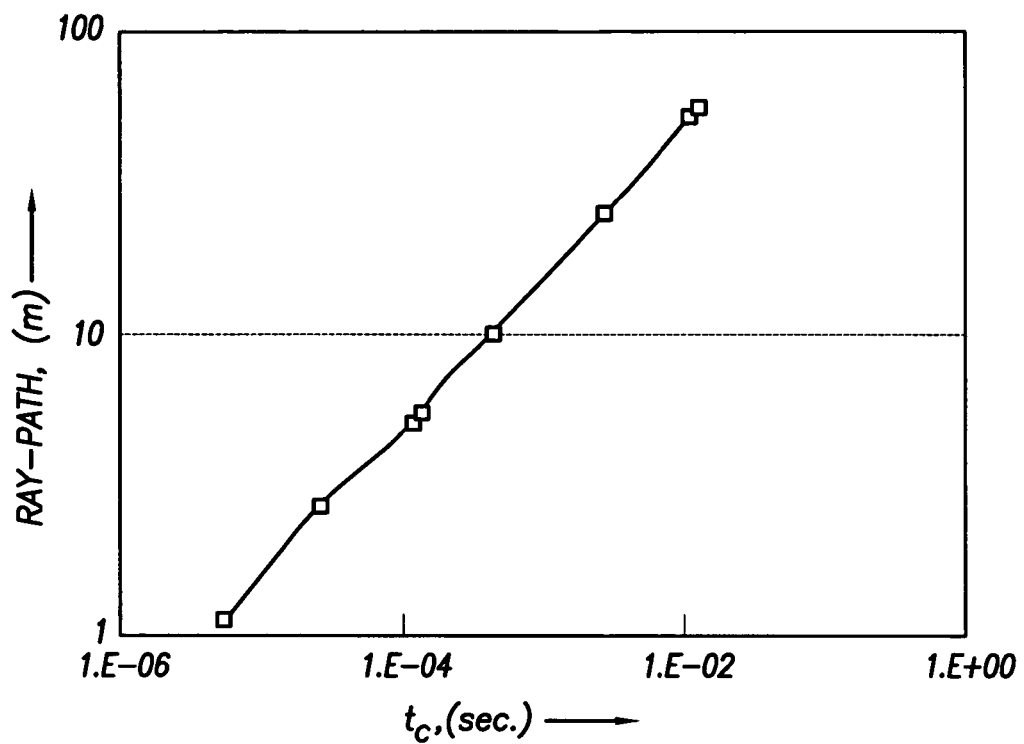
FIG. 32 graphically shows the relationship between raypath and transition time tc.

The transition time at which the apparent conductivity (σapp(t)) starts deviating from the local conductivity (σ1) towards the conductivity at large values of t depends on d and L, as shown in FIG. 31. For convenience, the transition time (tc) can be defined as the time at which the σapp(tc) takes the cutoff conductivity (σc). In this case, the cutoff conductivity is represented by the arithmetic average between the conductivity as t approaches zero and the conductivity as t approaches infinity. The transition time ($t_c$) is dictated by the ray path:

$$\sqrt{\left(\frac{L}{2}\right)^2 + d^2}, \quad (40)$$

that is the shortest distance for the EM signal traveling from the transmitter to the bed boundary, to the receiver, independently of the resistivity of the two layers. Conversely, the distance (d) can be estimated from the transition time ($t_c$), as shown in FIG. 32.

Other Uses of Apparent Conductivity

Similarly to conventional induction tools, the apparent conductivity ($\sigma_{app}(Z)$) is useful for analysis of the error in transient signal processing. The effect of the noise in transient response data may be examined as the error in the conductivity determination.

Figure 33:
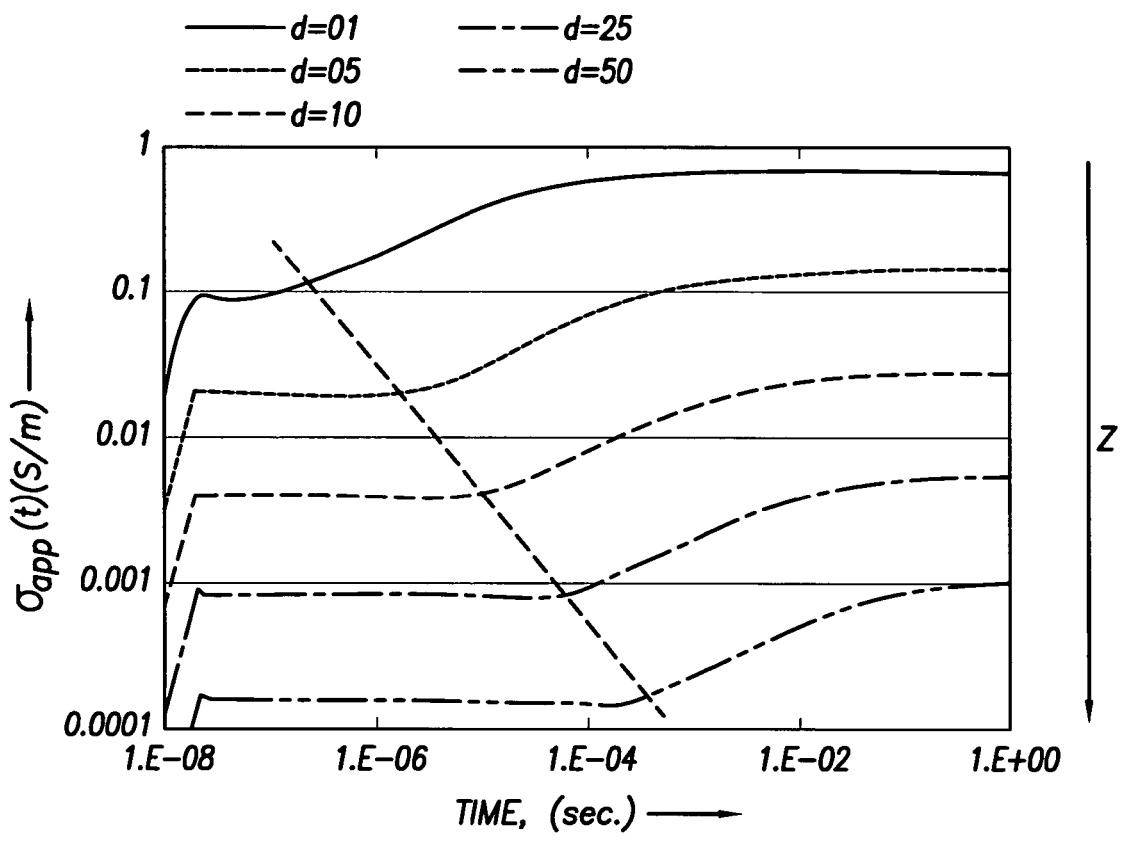
FIG. 33 shows a plot of the apparent conductivity ($\sigma app(z; t)$) in both z- and t-coordinates for various distances d.

A plot of the apparent conductivity ($\sigma_{app}(z; t)$) for different distances (d) in both the z and t coordinates may serve as an image presentation of the transient data as shown in FIG. 33 for a L=1 m tool. The z coordinate references the tool depth along the borehole. The $\sigma_{app}(z; t)$ plot shows the approaching bed boundary as the tool moves along the borehole.

The apparent conductivity should be constant and equal to the formation conductivity in a homogeneous formation. The deviation from a constant conductivity value at time (t) suggests the presence of a conductivity anomaly in the region specified by time (t).

Look-Ahead Capabilities of EM Transient Method

Figure 34:
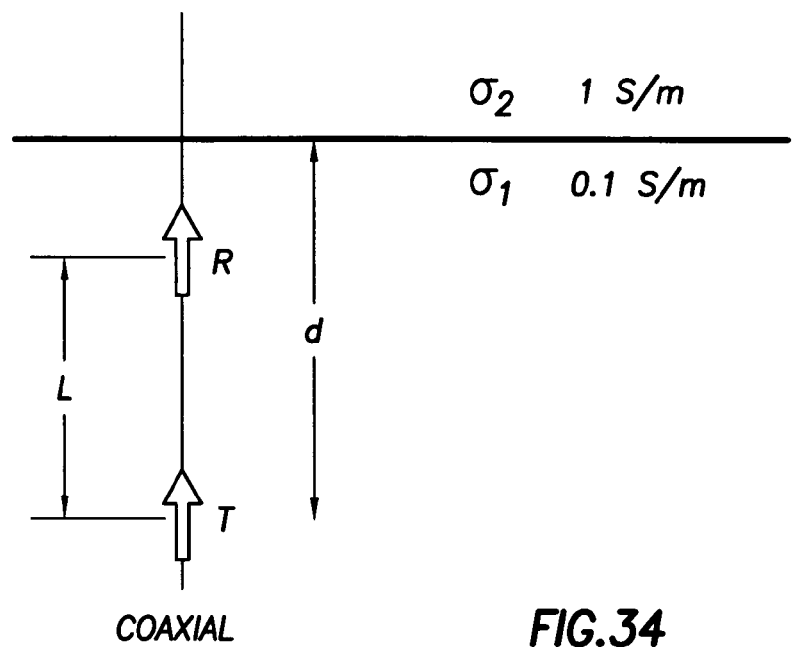
FIG. 34 is a schematic showing apparent conductivity with a coaxial tool.

By analyzing apparent conductivity or its inherent inverse equivalent (apparent resistivity), the present invention can identify the location of a resistivity anomaly (e.g., a conductive anomaly and a resistive anomaly). Further, resistivity or conductivity can be determined from the coaxial and/or coplanar transient responses. As explained above, the direction of the anomaly can be determined if the cross-component data are also available. To further illustrate the usefulness of these concepts, the foregoing analysis may also be used to detect an anomaly at a distance ahead of the drill bit. Analysis of Coaxial Transient Responses in Two-Layer Models FIG. 34 shows a coaxial tool with transmitter-receiver spacing L placed in, for example, a vertical well approaching an adjacent bed that is the resistivity anomaly. The tool includes both a transmitter coil T and a receiver coil R, which are wound around a common tool axis and are oriented in the tool axis direction. The symbols $\sigma_1$ and $\sigma_2$ may represent the conductivities of two formation layers.

To show that the transient EM method can be used as a look-ahead resistivity logging method, the transient response of the tool in a two-layer earth model may be examined. There are three parameters that may be determined in the two-layer model. These are:

(1) the conductivity or resistivity (in the present example $\sigma_1=0.1$ S/m or $R_1=10$ ohm-m) of the local layer where the tool is placed;

(2) the conductivity or resistivity (in the present example $\sigma_2=1$ S/m or $R_2=1$ ohm-m) of an adjacent bed; and (3) the distance of the tool to the layer boundary, for which in the present example d=1, 5, 10, 25, and 50 m are taken.

Under a more general circumstance, the relative direction of a borehole and tool to the bed interface is not known.

Figure 35:
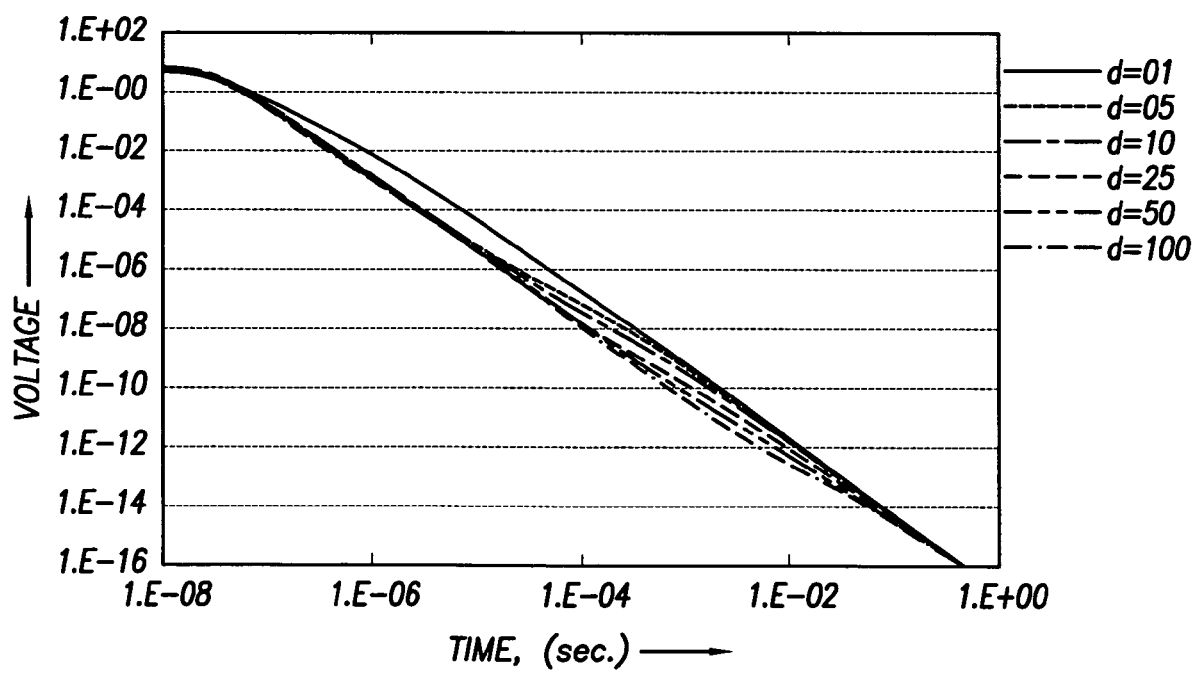
FIG. 35 is a graph showing voltage response as a function of t as given by the coaxial tool of FIG. 34 at different distances from the bed.

The voltage response of the L=1 m (transmitter-receiver offset) coaxial tool at different distances (d) as a function of t is shown in FIG. 35. Though the difference is observed among responses at different distances, it is not straightforward to identify the resistivity anomaly from these responses.

Figure 36:
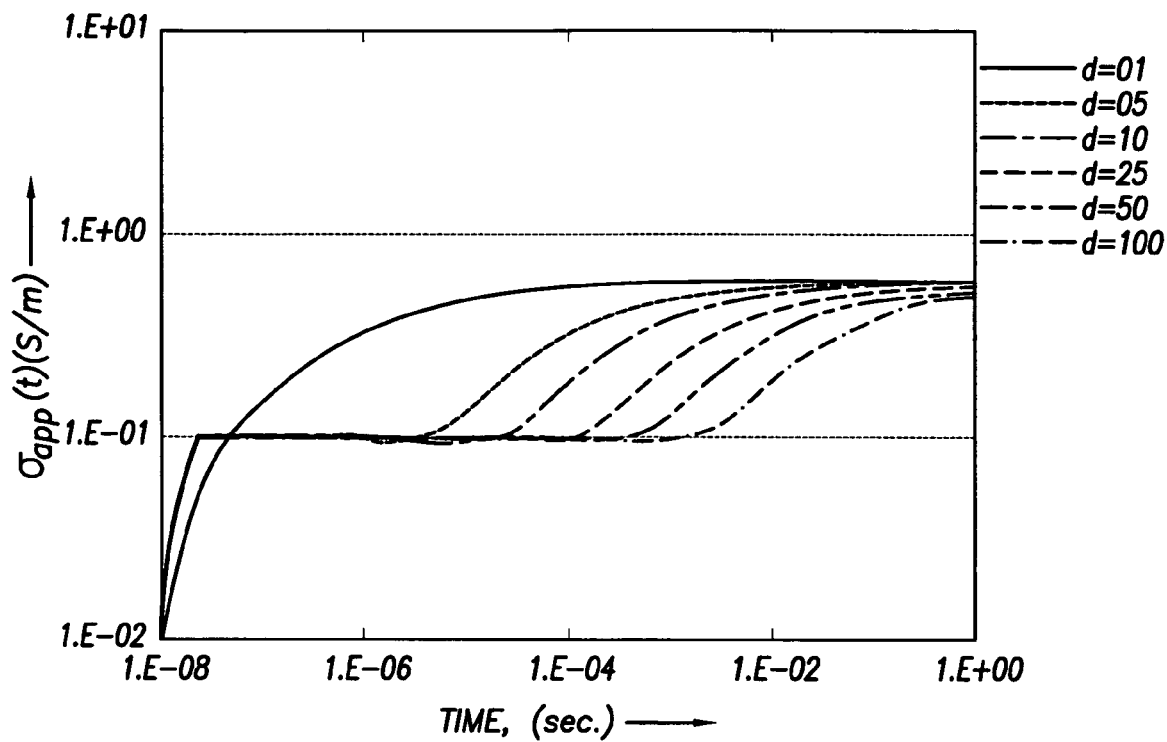
FIG. 36 is a graph showing the voltage response data of FIG. 35 in terms of the apparent conductivity ($\sigma_{app}(t)$)

The same voltage data of FIG. 35 is plotted in terms of the apparent conductivity ($\sigma_{app}(t)$) in FIG. 36. From this Figure, it is clear that the coaxial response can identify an adjacent bed of higher conductivity at a distance. Even a L=1 m tool can detect the bed at 10, 25-and 50-m away if low voltage response can be measured for 0.1-1 second long.

The $\sigma_{app}(t)$ plot exhibits at least three parameters very distinctly in the figure: the early time conductivity; the later time conductivity; and the transition time that moves as the distance (d) changes. In FIG. 36, it should be noted that, at early time, the tool reads the apparent conductivity of 0.1 S/m that is of the layer just around the tool. At later time, the tool reads close to 0.55 S/m, an arithmetic average between the conductivities of the two layers. The change of distance (d) is reflected in the transition time.

Figure 37:
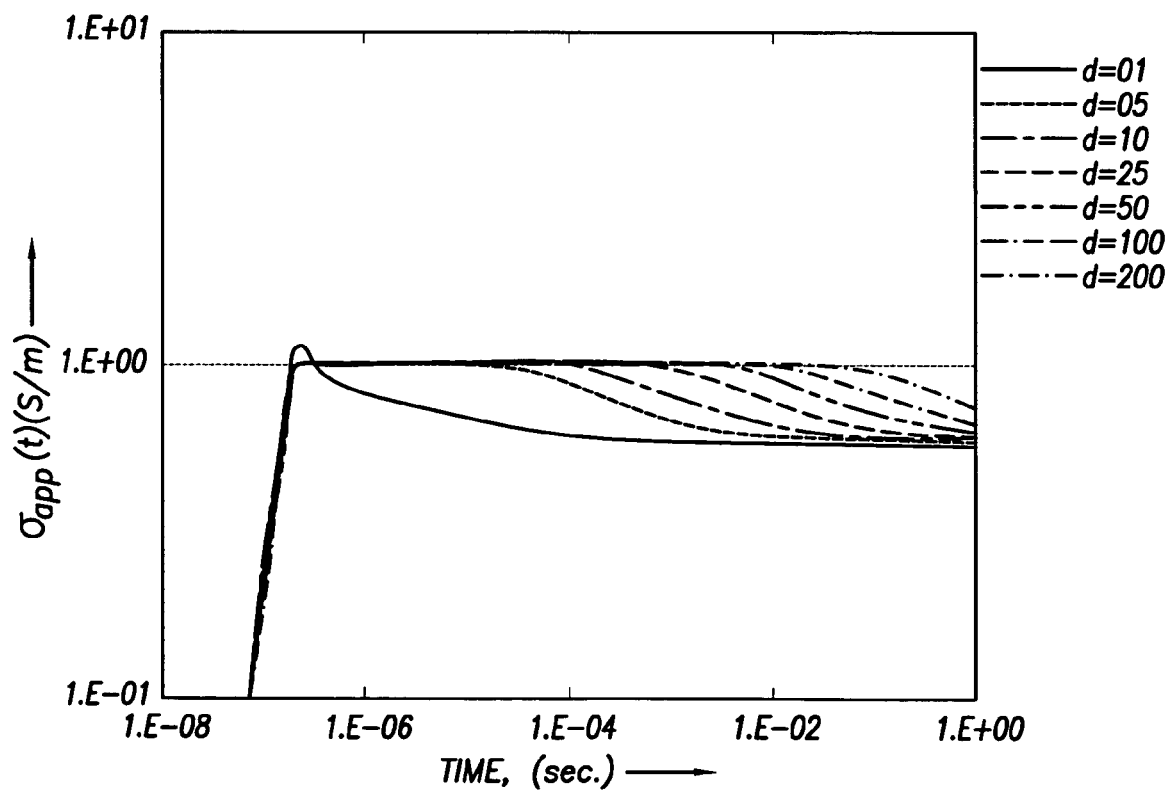
FIG. 37 is similar to FIG. 36 except that the resistivities of layers 1 and 2 have been interchanged.

FIG. 37 illustrates the σapp(t) plot of the coaxial transient response in the two-layer model of FIG. 34 for an L=1 m tool at different distances (d), except that the conductivity of the local layer ($\sigma 1$) is 1 S/m (R1=1 ohm-m) and the conductivity of the target layer ($\sigma 2$) is 0.1 S/m (R2=10 ohm-m). Again, the tool reads at early time the apparent conductivity of 1.0 S/m that is of the layer just around the tool. At a later time, the tool reads about 0.55 S/m, the same average conductivity value as in FIG. 36. The change of distance (d) is reflected in the transition time.

Early Time Conductivity ($\sigma_{app}(t\to 0)$)

It is obvious that the early time conductivity is the conductivity of the local layer where the tool is located. At such an early time, the signal reaches the receiver directly from the transmitter without interfering with the bed boundary. Hence, it is affected only by the conductivity around the tool. Conversely, the layer conductivity can be measured easily by the apparent conductivity at an earlier time.

Late Time Conductivity ($\sigma_{app}(t\to\infty)$)

On the other hand, the late time conductivity must be some average of conductivities of both layers. At later time, nearly half of the signals come from the formation below the tool and the other half from above the tool, if the time to travel the distance (d) of the tool to the bed boundary is small.

Figure 38:
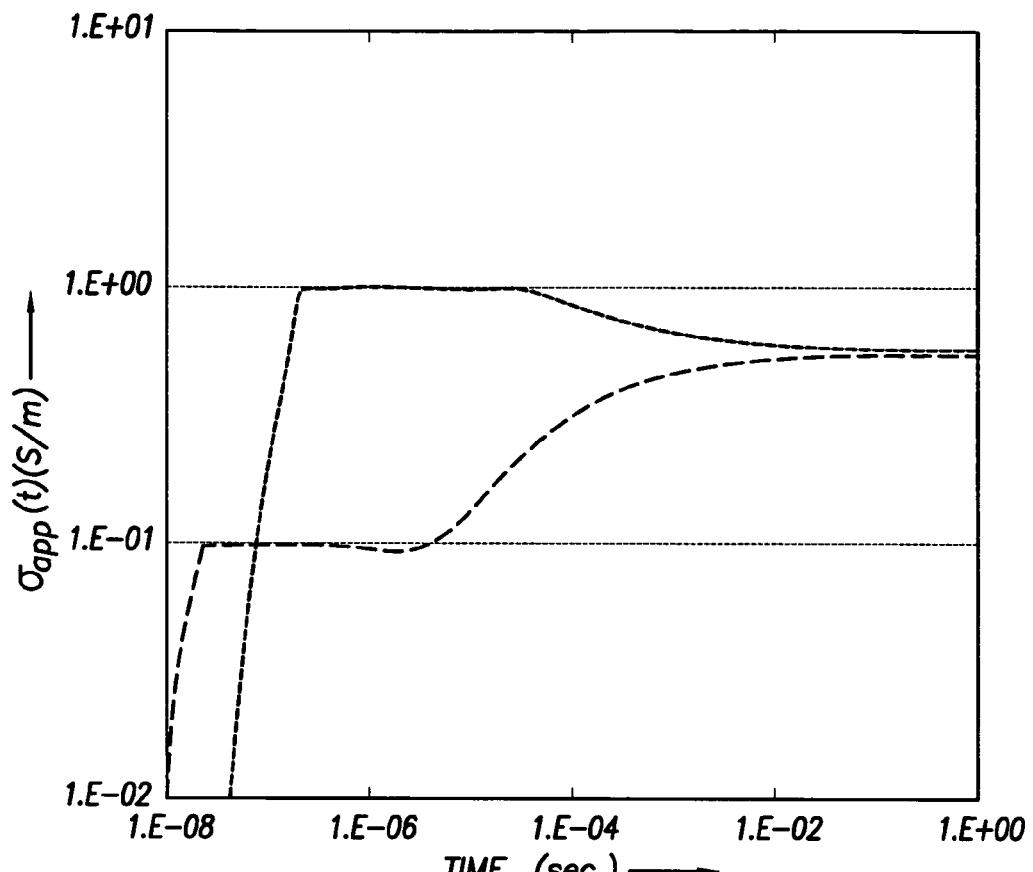
FIG. 38 presents a graph comparing $\sigma_{app}(t)$ of FIG. 36 and FIG. 37 relating to d=1 m.
Figure 39:
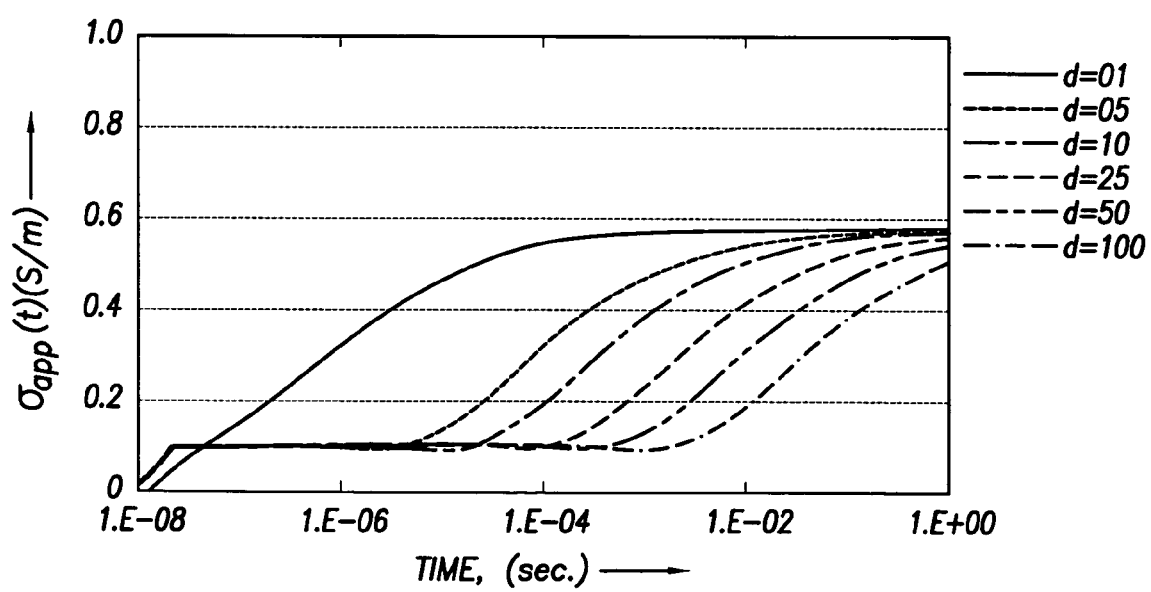
FIG. 39 presents a graph of the same data as displayed in FIG. 36 but now on a linear scale of apparent conductivity.

FIG. 38 compares the σapp(t) plot of FIG. 36 and FIG. 37 for L=01 m and d=01 m. The late time conductivity is determined solely by the conductivities of the two layers ($\sigma 1$ and $\sigma 2$) alone. It is not affected by where the tool is located in the two layers. However, because of the deep depth of investigation, the late time conductivity is not readily reached even at t=1 second, as shown in Table 31 for the same tool. In practice, the late time conductivity may have to be approximated by σapp(t=1 second) which slightly depends on d as illustrated in FIG. 39.

Figure 40:
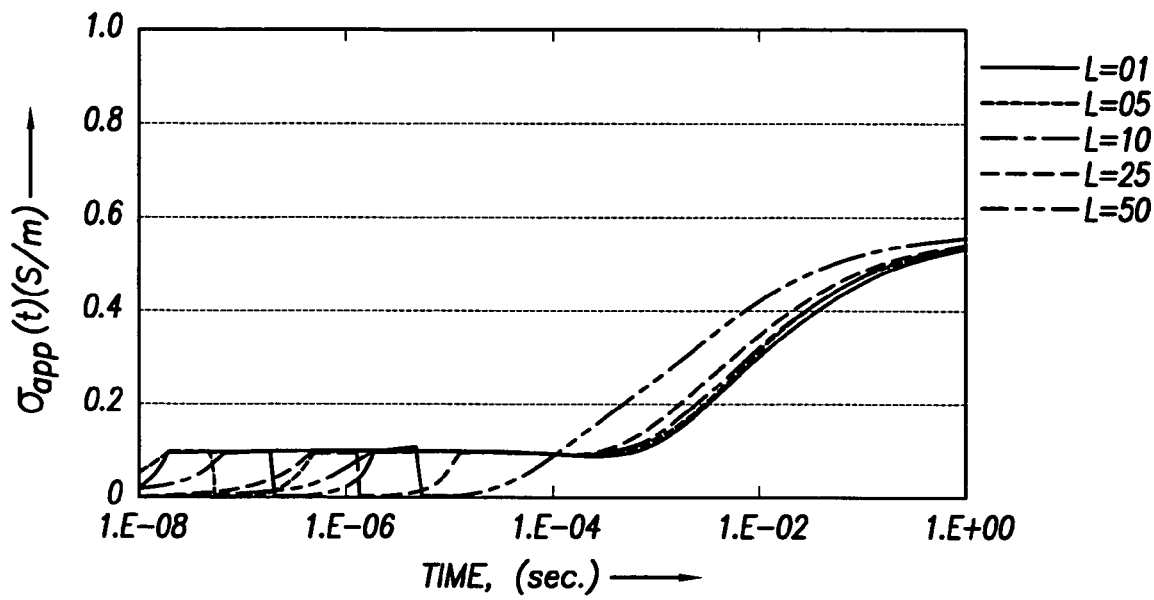
FIG. 40 shows a graph of $\sigma_{app}(t)$ on a linear scale for various transmitter/receiver spacings L in case d=1 m.
Figure 41:
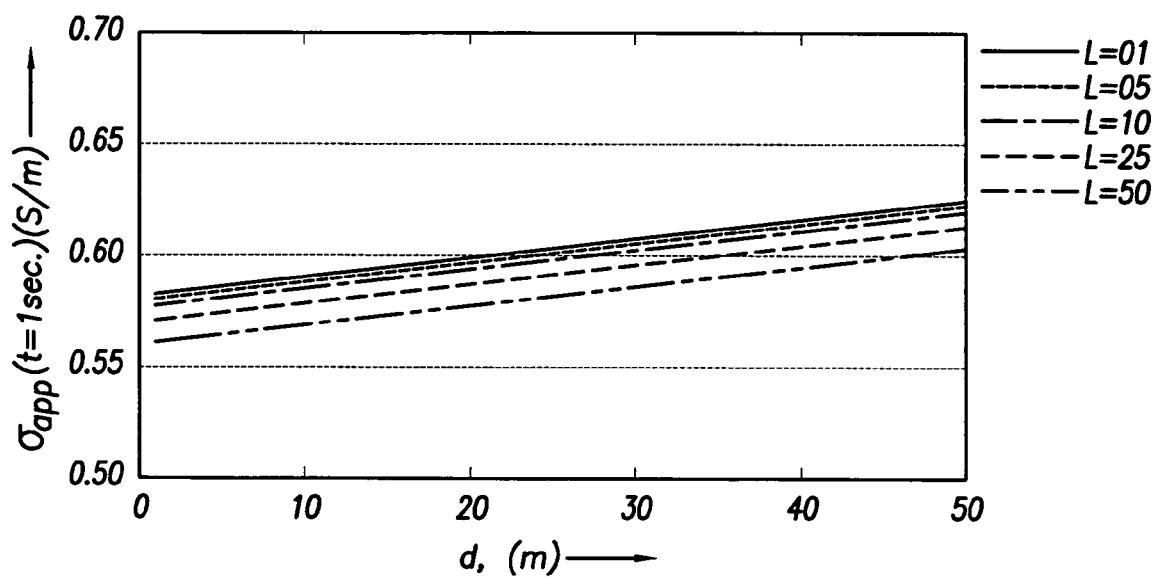
FIG. 41 shows a graph of late time conductivity as a function of d for various transmitter/receiver spacings L.

FIG. 40 compares the $\sigma_{app}(t)$ plots for d=1 m but with different spacing L. The $\sigma_{app}(t)$ reaches a nearly constant late time conductivity at later times as L increases. The late time conductivity ($\sigma_{app}(t\to\infty)$) is nearly independent of L. However, the late time conductivity defined at t=1 second, depends on the distance (d) as shown in FIG. 41

Figure 42:
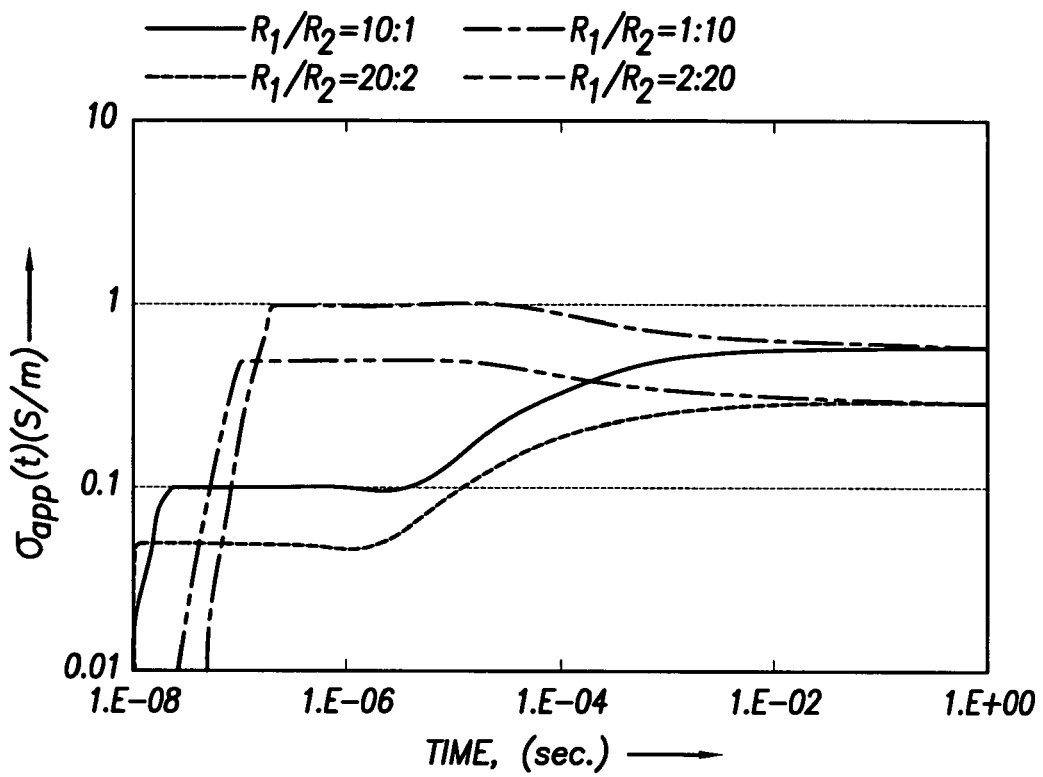
FIG. 42 shows the $\sigma_{app}(t)$ plots for d=5 m and L=01 m for various resistivity ratios.

FIG. 42 compares the $\sigma_{app}(t)$ plots for d=5 m and L=01 m but for different resistivity ratios. This Figure shows that the late time apparent conductivity is proportional to $\sigma_1$ for the same ratio ($\sigma_1/\sigma_2$). For instance:

$$\sigma_{app}(t \to \infty)(R_1/R_2 = 10; \quad (41)$$
$$R_1 = 10 \text{ ohm-}m = 2^*\sigma_{app}(t \to \infty)(R_1/R_2 = 10; R_1 = 20 \text{ ohm-}m)$$

Figure 43:
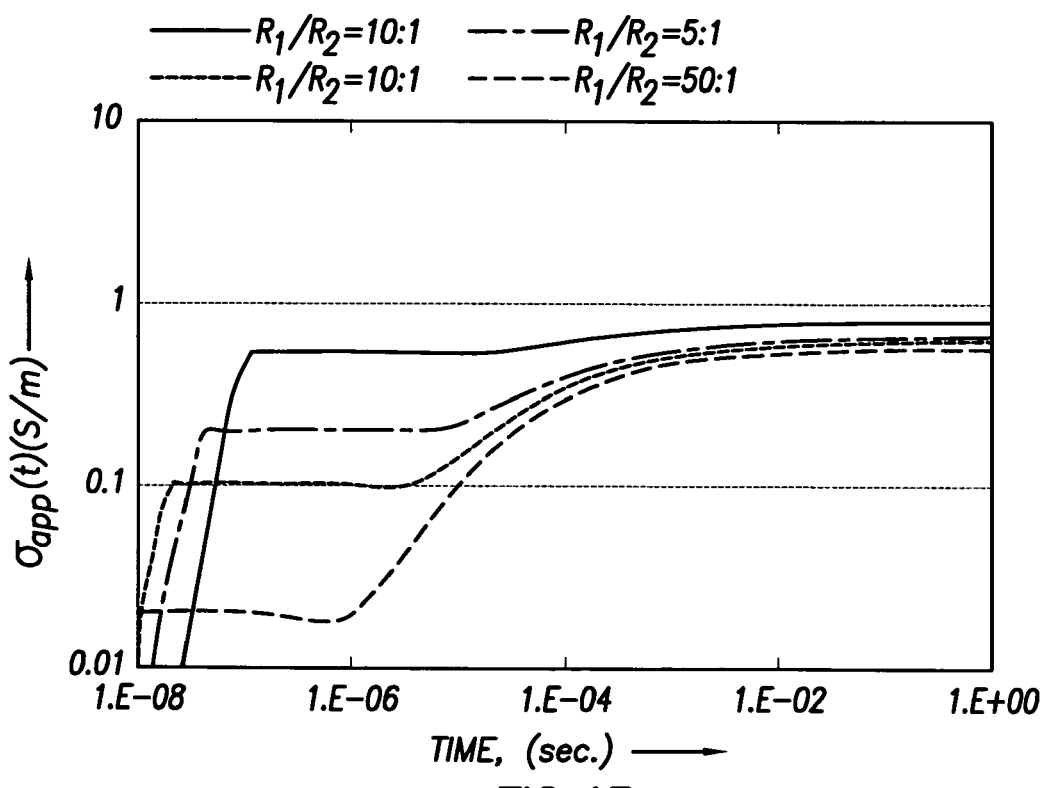
FIG. 43 shows a graph of the $\sigma_{app}(t)$ for the case d=5 m and L=01 m, but for different resistivity ratios while the target resistivity is fixed at $R_2$=1 ohm-m.
Figure 44:
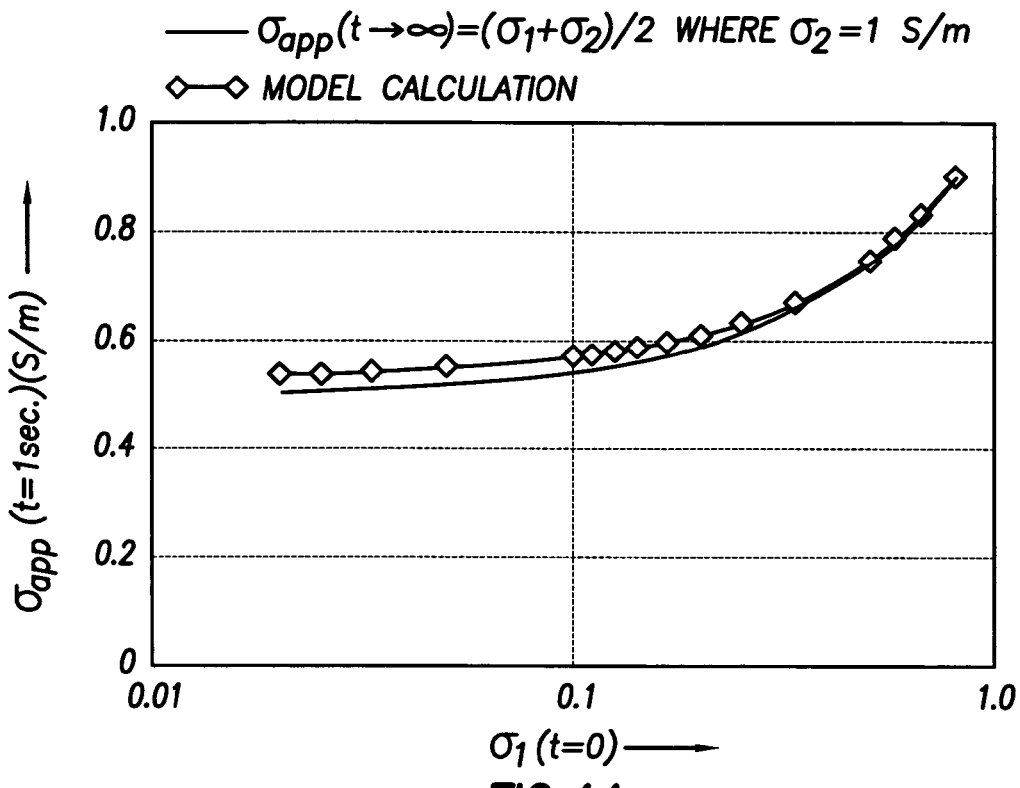
FIG. 44 graphically shows a comparison of the late time apparent conductivity at t=1 second with a model calculation, for the case target resistivity $R_2$=1 ohm-m.

FIG. 43 shows examples of the app(t) plots for d=5 m and L=01 m but for different resistivity ratios while the target resistivity is fixed at $R_2=1$ ohm-m. The late time apparent conductivity at t=1 second is determined by the local layer conductivity as shown in FIG. 44. Numerically, the late time conductivity may be approximated by the arithmetic average of two-layer conductivities as: $\sigma_{app}(t\to\infty;\sigma_1,\sigma_2)=\sigma_1+\sigma_2/2$. This is reasonable considering that, with the coaxial tool, the axial transmitter induces the eddy current parallel to the bed boundary. At later time, the axial receiver receives horizontal current nearly equally from both layers. As a result, the late time conductivity must see conductivity of both formations with nearly equal weight.

Figure 45:
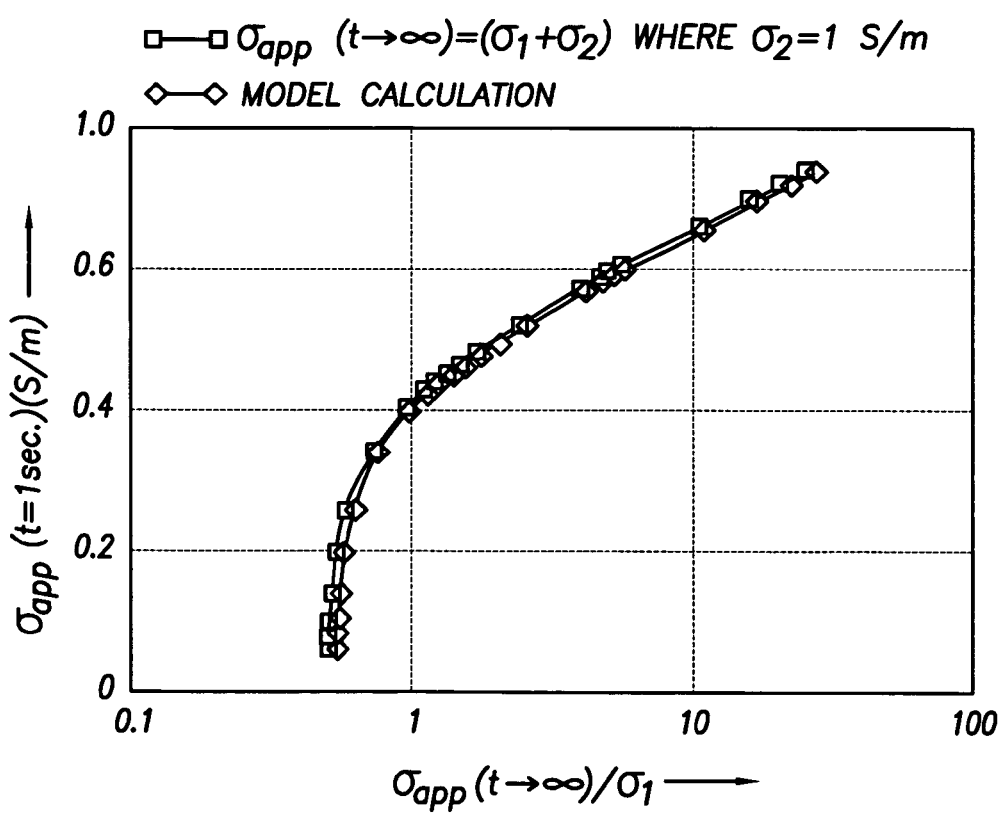
FIG. 45 graphically shows the same data as FIG. 44 plotted as the late time apparent conductivity at t=1 second versus ratio of the late time apparent conductivity at t=1 second over local environment conductivity.

To summarize, the late time conductivity ($\sigma_{app}(t\to\infty)$) at t=1 second can be used to estimate the conductivity of the adjacent layer ($\sigma_2$) when the local conductivity near the tool ($\sigma_1$) is known, for instance, from the early time conductivity ($\sigma_{app}(t\to 0)=\sigma_1$). This is illustrated in FIG. 45.

Estimation of the Distance (d) to the Adjacent Bed

The transition time ($t_c$) at which the apparent conductivity starts deviating from the local conductivity ($\sigma_1$) toward the late time conductivity clearly depends on d, the distance of the tool to the bed boundary, as shown in FIG. 36 for a L=01 m tool.

Figure 46:
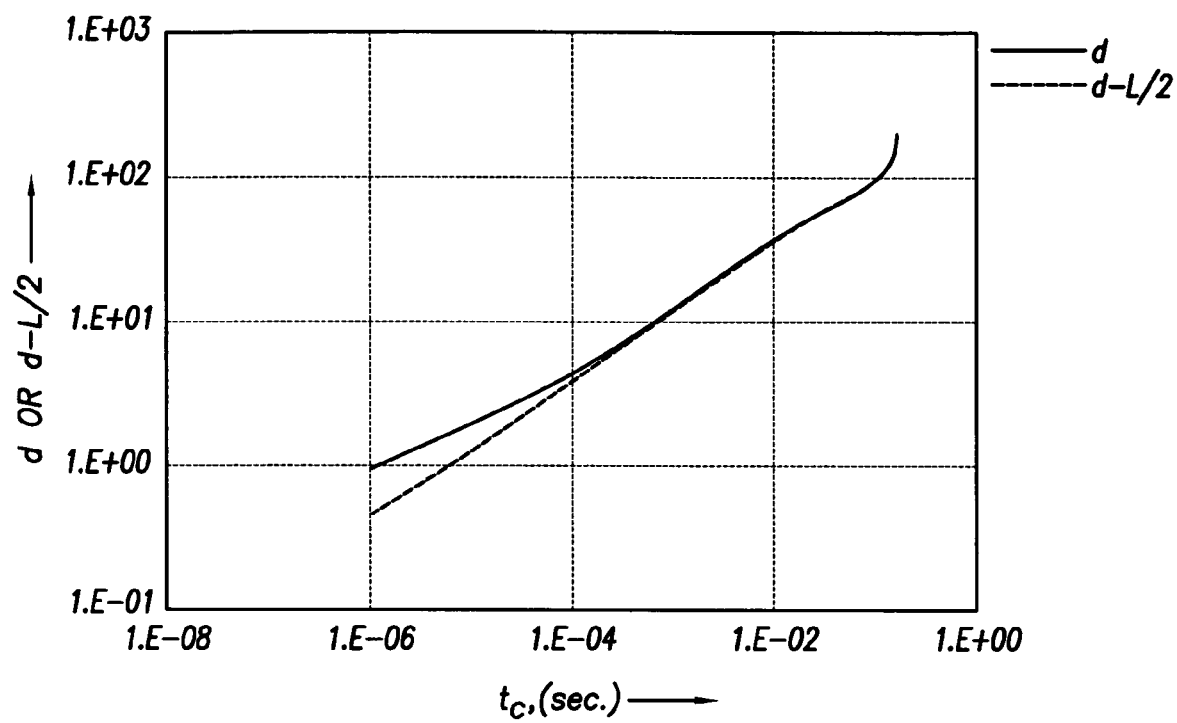
FIG. 46 graphically shows distance to anomaly ahead of the tool verses transition time ($t_c$) as determined from the data of FIG. 36.

For convenience, the transition time ($t_c$) is defined by the time at which the $\sigma_{app}(t_c)$ takes the cutoff conductivity ($\sigma_c$), that is, in this example, the arithmetic average between the early time and the late time conductivities: $\sigma_c=\{\sigma_{app}(t\to 0)+$ $\sigma_{app}(t\to\infty)\}/2$. The transition time ($t_c$) is dictated by the raypath (d) minus L/2 that is, half the distance for the EM signal to travel from the transmitter to the bed boundary to the receiver, independently on the resistivity of the two layers. Conversely, the distance (d) can be estimated from the transition time ($t_c$), as shown in FIG. 46 when L=01 m.

Image Presentation with the Apparent Conductivity

Figure 47:
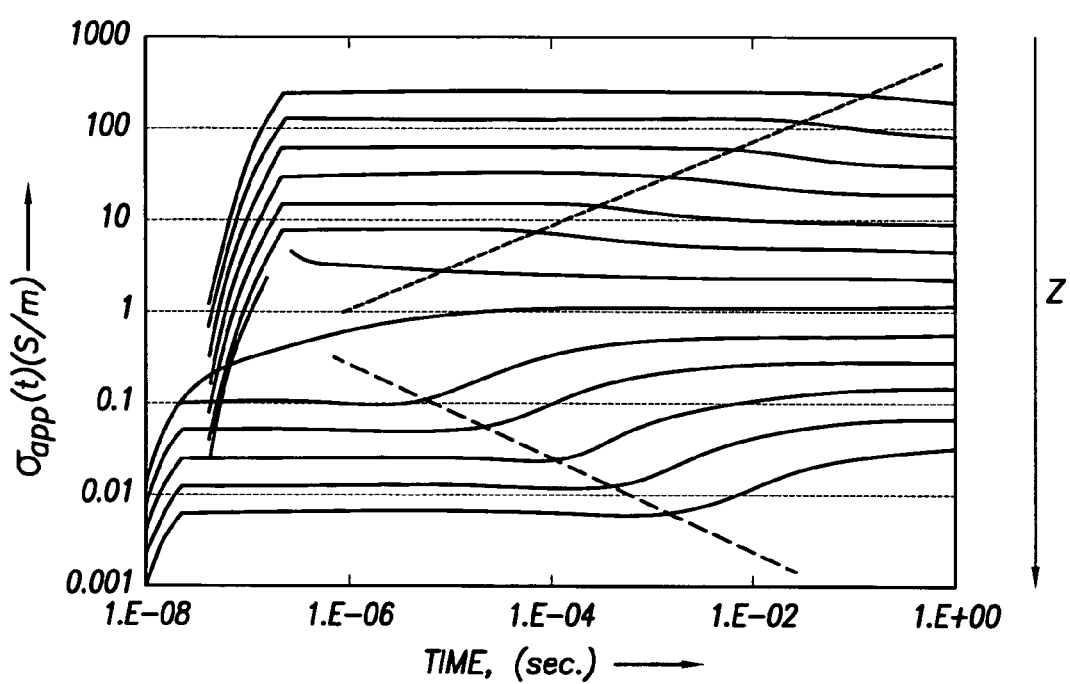
FIG. 47 shows a plot of the apparent conductivity ($\sigma app(z; t)$) in both z- and t-coordinates.

A plot of the apparent conductivity ($\sigma_{app}(z; t)$) in both z- and t-coordinates may serve as an image presentation of the transient data, which represents apparent conductivity plots for the same tool at different depths, as shown in FIG. 47. The z-coordinate represents the tool depth along the borehole. The $\sigma_{app}(z; t)$ plot clearly helps to visualize the approaching bed boundary as the tool moves along the borehole.

Analysis of Coplanar Transient Responses in Two-Layer Models

Figure 48:
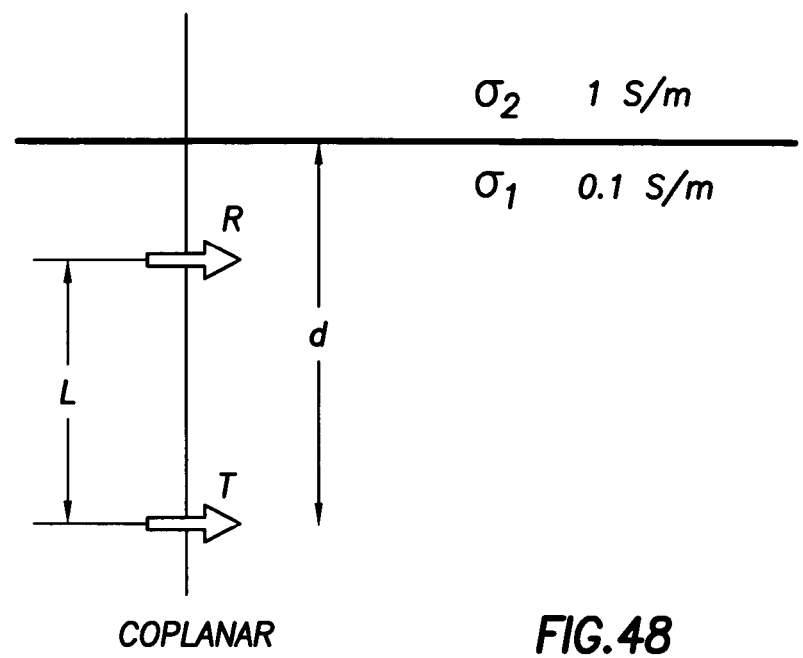
FIG. 48 is a schematic showing apparent conductivity with a coplanar tool.

While the coaxial transient data were examined above, the coplanar transient data are equally useful as a look-ahead resistivity logging method. FIG. 48 shows a coplanar tool with transmitter-receiver spacing L placed in a well approaching an adjacent bed that is the resistivity anomaly. On the coplanar tool, both a transmitter T and a receiver R are oriented perpendicularly to the tool axis and parallel to each other. The symbols $\sigma_1$ and $\sigma_2$ may represent the conductivities of two formation layers.

Figure 49:
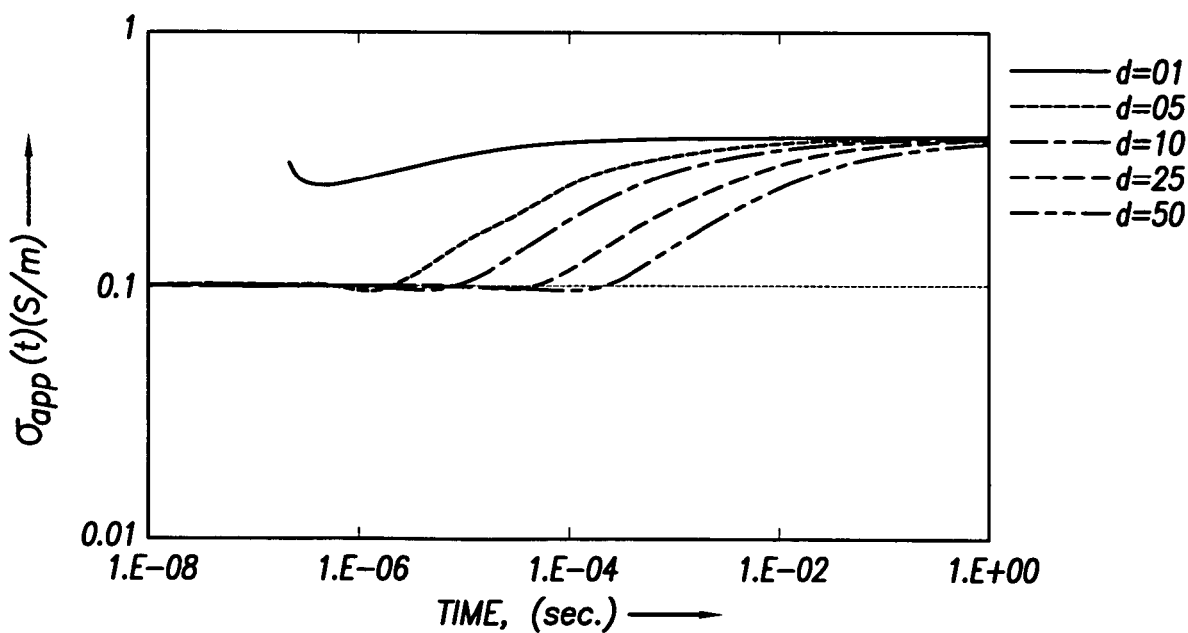
FIG. 49 is a graph showing voltage response data in terms of the apparent conductivity ($\sigma_{app}(t)$) as a function of t as provided by the coplanar tool of FIG. 48 at different distances from the bed.
Figure 50:
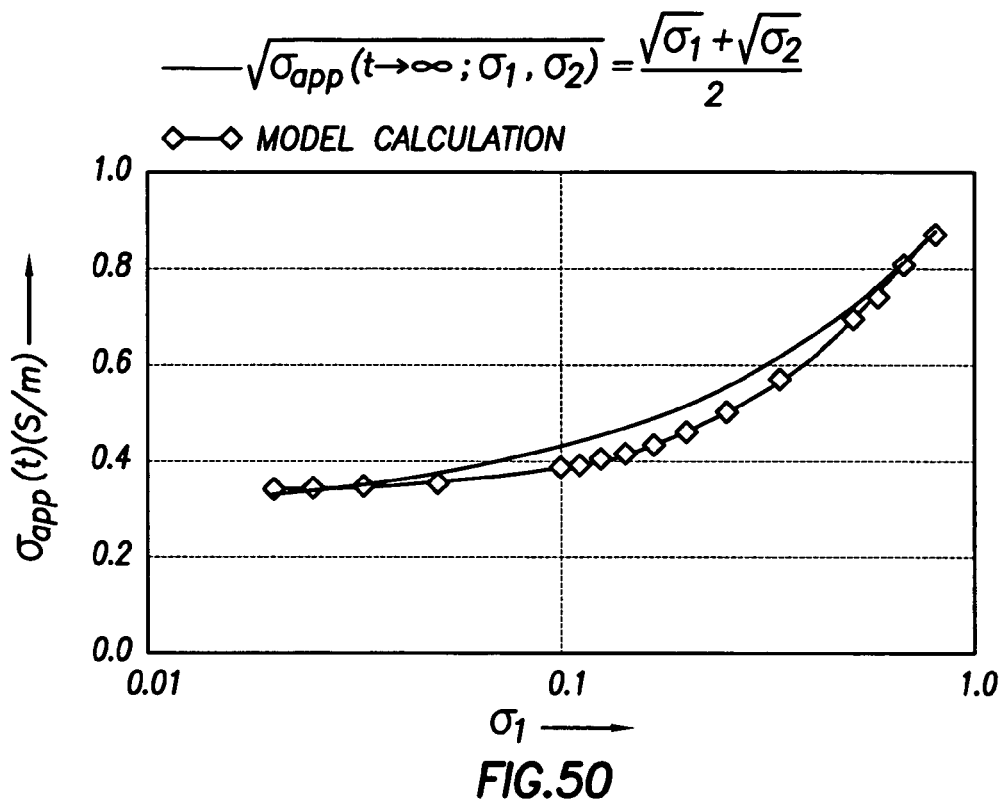
FIG. 50 shows a comparison of the late time apparent conductivity ($\sigma_{app}(t\to\infty)$) for coplanar responses where d=05 m and L=01 m as a function of conductivity of the local layer while the target conductivity is fixed at 1 S/m.

Corresponding to FIG. 36 for coaxial tool responses where L=01 m, the apparent conductivity ($\sigma_{app}(t)$) for the coplanar responses is plotted in FIG. 49 for different tool distances from the bed boundary. It is clear that the coplanar response can also identify an adjacent bed of higher conductivity at a distance. Even a L=1 m tool can detect the bed at 10-, 25- and 50-m away if low voltage responses can be measured for 0.1-1 second long. The $\sigma_{app}(t)$ plot for the coplanar responses exhibits three parameters equally as well as for the coaxial responses. Early time conductivity ($\sigma_{app}(t\to 0)$)

It is also true for the coplanar responses that the early time conductivity ($\sigma_{app}(t\to 0)$) is the conductivity of the local layer ($\sigma_1$) where the tool is located. Conversely, the layer conductivity can be measured easily by the apparent conductivity at earlier times.

Late Time Conductivity ($\sigma_{app}(t\to\infty)$)

The late time conductivity ($\sigma_{app}(t\to\infty)$) is some average of conductivities of both layers. The conclusions derived for the coaxial responses apply equally well to the coplanar responses. However, the value of the late time conductivity for the coplanar responses is not the same as for the coaxial responses. For coaxial responses, the late time conductivity is close to the arithmetic average of two-layer conductivities in two-layer models. FIG. 49 shows the late time conductivity ($\sigma_{app}(t\to\infty)$) for coplanar responses where d=05 m and L=01 m but for different conductivities of the local layer while the target conductivity is fixed at 1 S/m. Late time conductivity is determined by the local layer conductivity, and is numerically close to the square root average as, $$\sqrt{\sigma_{app}(t\to\infty; \sigma_1, \sigma_2)} = \frac{\sqrt{\sigma_1} + \sqrt{\sigma_2}}{2}.$$

Figure 51:
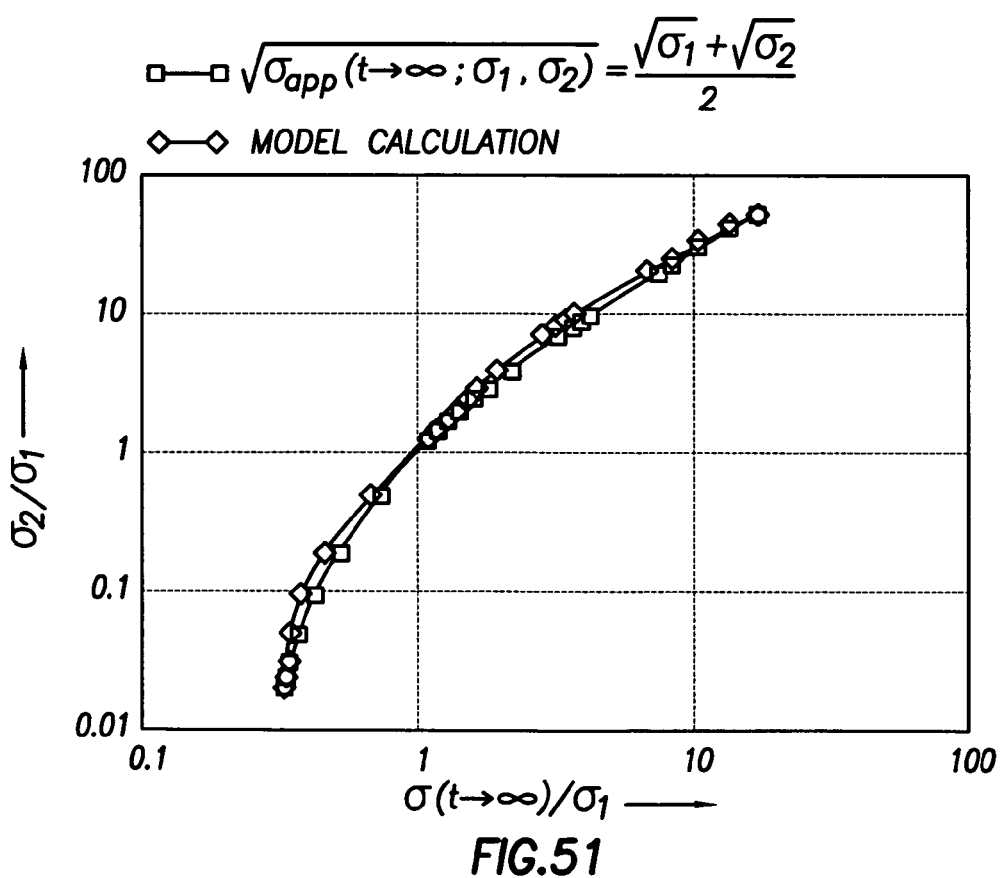
FIG. 51 graphically shows the same data as FIG. 50 plotted as the ratio of target resistivity over local layer resistivity versus ratio of the late time apparent conductivity over local layer resistivity.

To summarize, the late time conductivity ($\sigma_{app}(t\to\infty)$) can be used to estimate the conductivity of the adjacent layer ($\sigma_2$) when the local conductivity near the tool ($\sigma 1$) is known, for instance, from the early time conductivity ($\sigma_{app}(t\to 0)=\sigma 1$). This is illustrated in FIG. 51.

Estimation of the Distance (d) to the Adjacent Bed

The transition time at which the apparent conductivity starts deviating from the local conductivity ($\sigma_1$) toward the late time conductivity clearly depends on the distance (d) of the tool to the bed boundary, as shown in FIG. 48.

The transition time ($t_c$) may be defined by the time at which the $\sigma_{app}(t_c)$ takes the cutoff conductivity ($\sigma_c$) that is, in this example, the arithmetic average between the early time and the late time conductivities: $\sigma_c = \{\sigma_{app}(t\to 0)+\sigma_{app}(t\to\infty)\}/2$. The transition time ($t_c$) is dictated by the ray-path (d) minus L/2 that is, half the distance for the EM signal to travel from the transmitter to the bed boundary to the receiver, independently of the resistivity of the two layers.

Figure 52:
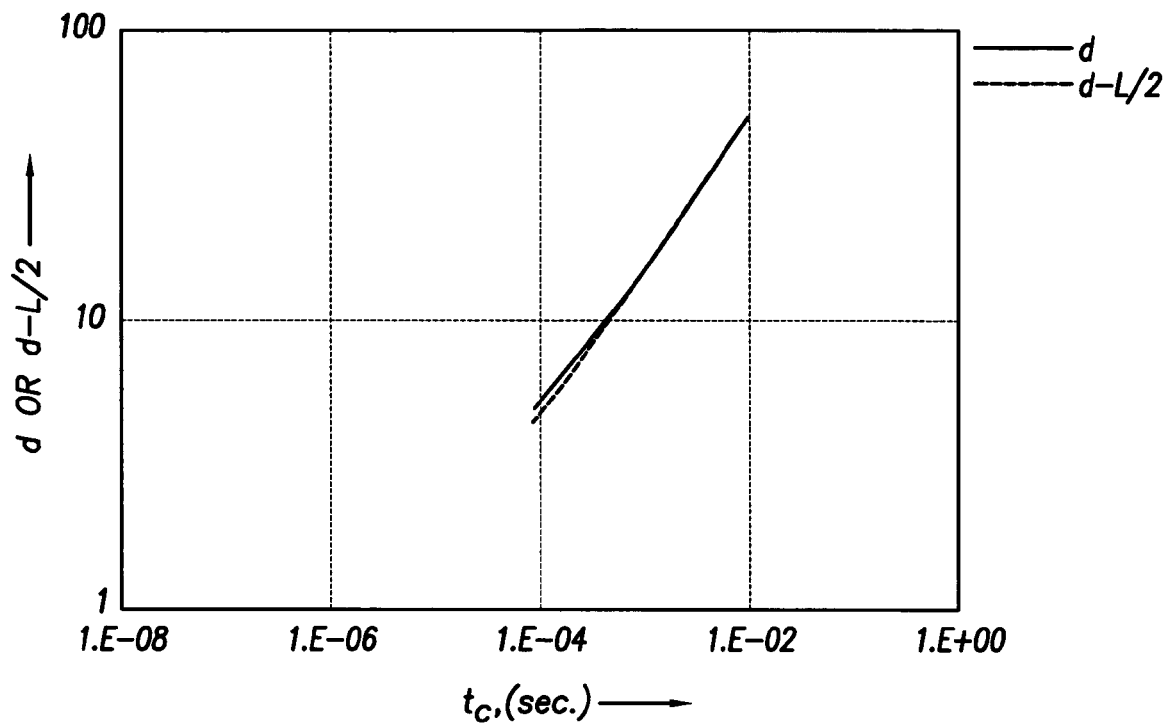
FIG. 52 graphically shows distance to anomaly ahead of the tool verses transition time ($t_c$) as determined from the data of FIG. 49.

Conversely, the distance (d) can be estimated from the transition time ($t_c$), as shown in FIG. 52 where L=1 m.

Fast Imaging Utilizing Apparent Conductivity

The use of the apparent conductivity and apparent dip may be used to create an "image" or representation of the formation features. This is accomplished-by collecting transient apparent conductivity data at different positions within the borehole. Utilizing distance and directional information as derived above, the collected data may be used to create an image of the formation relative to the tool.

Figure 53:
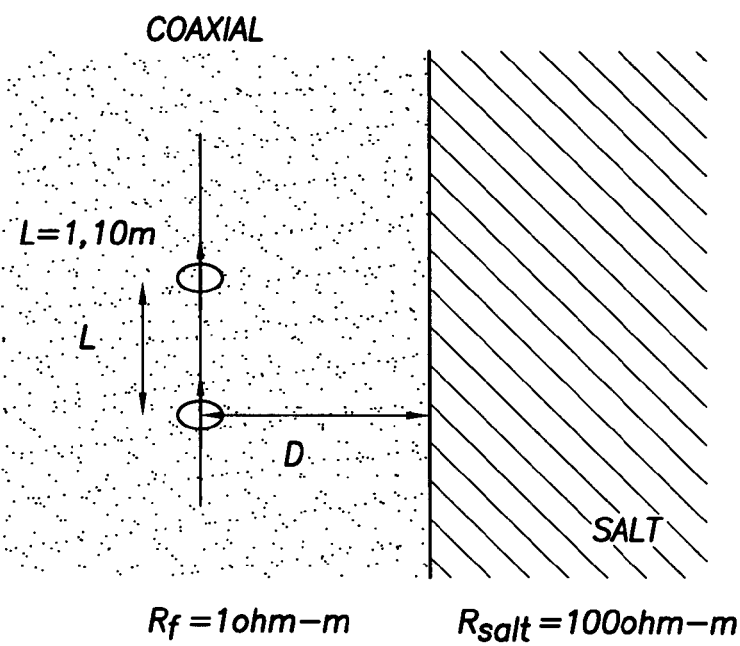
FIG. 53 is a depiction of a two-layer salt dome profiling model utilizing a coaxial tool.
Figure 54:
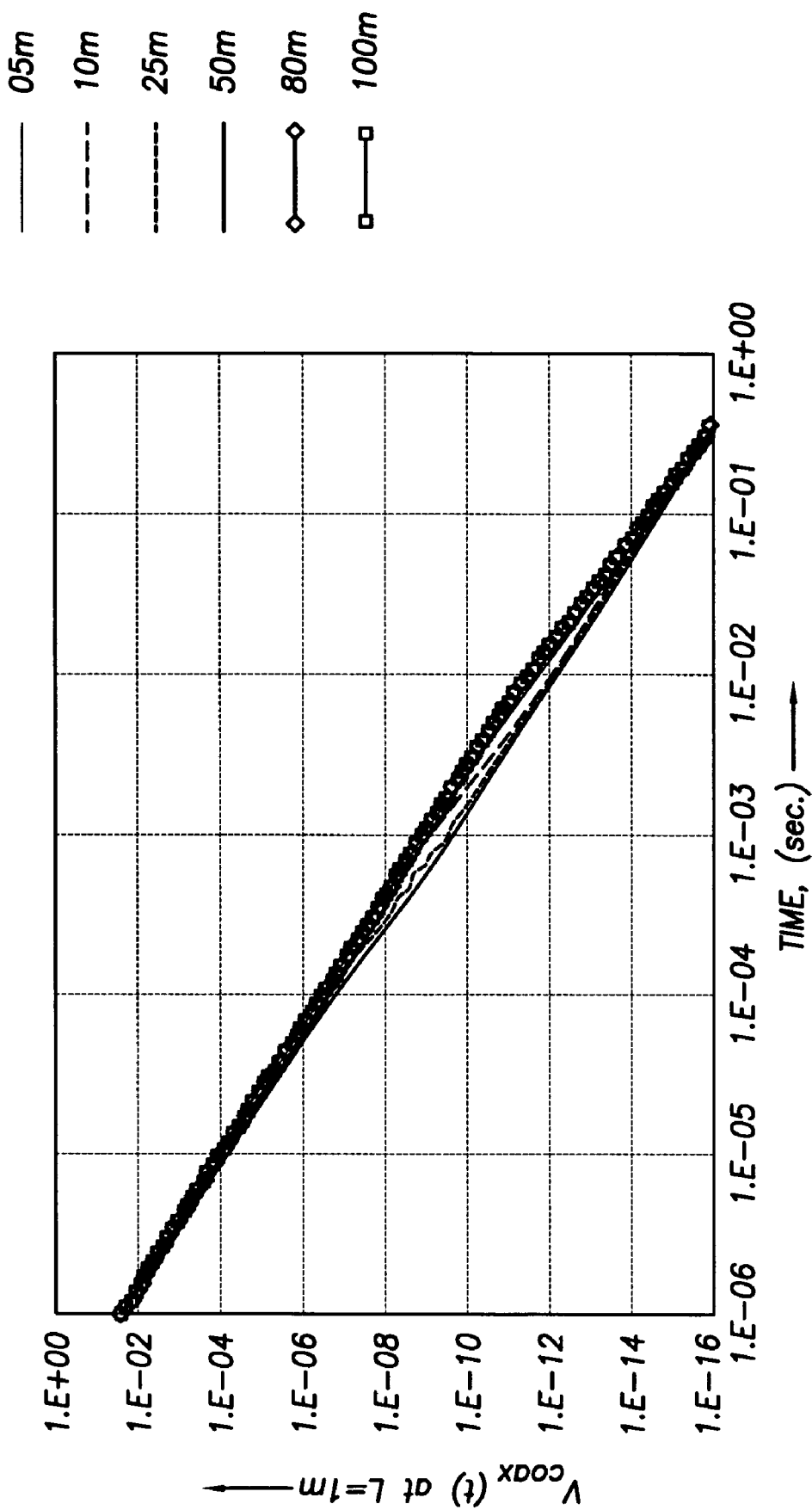
FIG. 54 is a graph similar to FIG. 22, showing voltage response as a function of t as given by the coaxial tool of FIG. 53 in a two-layer formation at different distances from a salt bed.

The first instance was to confirm the change in voltage response based on the distance to the target formation using a coaxial tool investigating a two layer model in which the formation was parallel to the axis of the tool. FIG. 53 depicts a coaxial tool in a two layer formation wherein the tool axis is parallel to the layer interface. This can be a case of a horizontal well placement above the oil-water contact when the layers are horizontal and the tool is in the horizontal position. The near layer is modeled as a brine saturated layer, resulting in a low resistivity (1 ohm-m). Alternatively, the model may be used to represent the tool in a vertical well bore where the tool is being used for purposes of salt dome profiling and the salt dome is represented by a high resistivity layer located radially or sideways from the borehole. In this model, borehole effects are ignored due to the large scale measurements being made. The tool of FIG. 53 is modeled as having two spacings, a 1 m and a 10 m spacing between transmitter and receiver coils. Three basic parameters are used to characterize the model: the conductivity of the near formation in which the tool is located, $\sigma_1$, the resistivity of the target or distant formation, $\sigma_2$, and the distance D to the interface with the formation of high resistivity. FIG. 54 is the voltage response in the two-layer model with an antenna spacing of 1 m, approximating the tool where, $\sigma_1=1$ S/m ($R_1=1$ ohm-m), $\sigma_2=0.01$ S/m ($R_1=100$ ohm-m). The change in the voltage response as a function of distance can be clearly seen in FIG. 54.

Based on the voltage responses it is clear that the transient response would vary with the distance of the more resistive layer.

Figure 55:
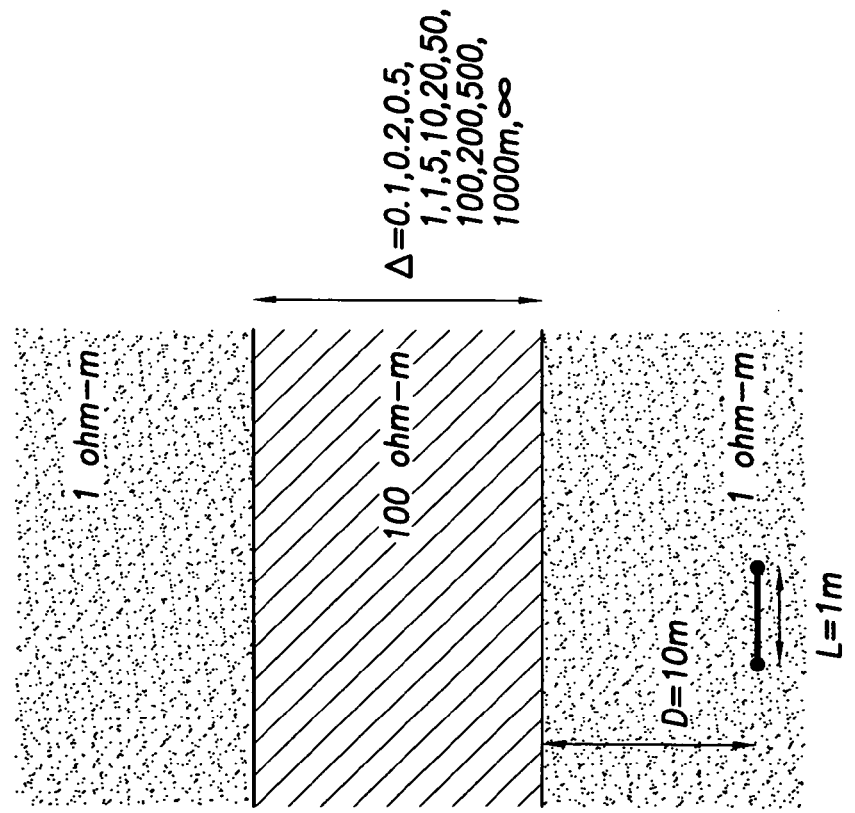
FIG. 55 schematically shows a model of a coaxial tool in a conductive local layer, a very resistive layer, and a further conductive layer.
Figure 56:
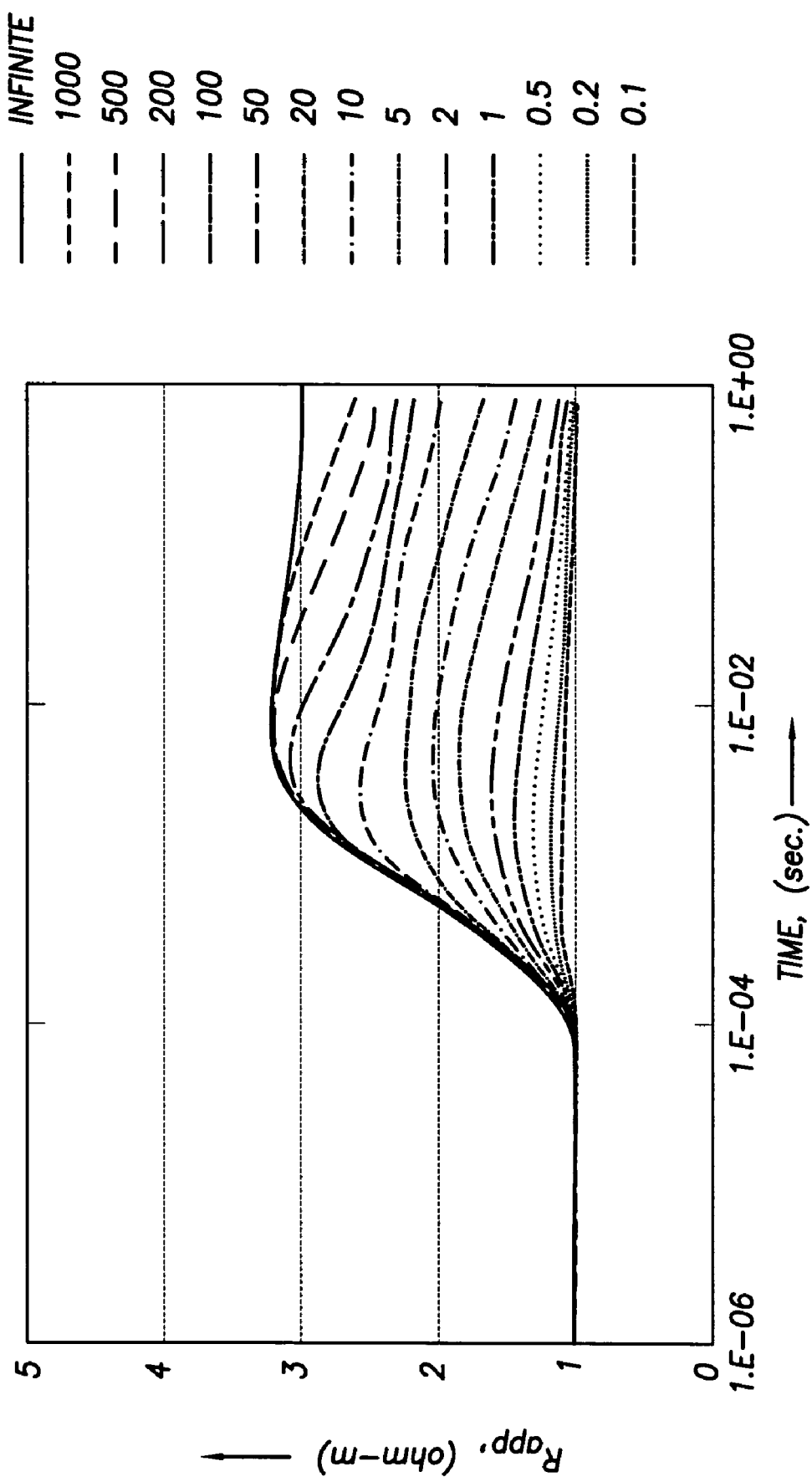
FIG. 56 is a graph showing resistivity response versus time for a geometry as given in FIG. 55 for various thicknesses of the very resistive layer.

The next model utilized conductive near layer, a very resistive layer, and a further conductive layer. The configuration utilized is depicted in FIG. 55. Apparent resistivity (an inverse of apparent conductivity) from a coaxial tool at 10 m away from the resistive bed (salt) is shown in FIG. 55 for different salt bed thickness. The tool is modeled as being parallel to the interface with the resistive layer at a distance of 10 m. The resistive bed thickness is varied from a fraction of a meter to 100 meters in thickness. The modeled apparent resistivity response is depicted in FIG. 56.

The first climb of $R_{app}(t)$ is the response to the salt and takes place at $10^{-4}$ s with L=1 m tool when the salt is at D=10 m away. If the salt is fully resolved (by infinitely thick salt beyond D=10 m), the apparent resistivity should read 3 ohm-m asymptotically. The subsequent decline of Rapp(t) is the response to a conductive formation behind the salt (resistive bed). $R_{app}$(late t) is a function of conductive bed resistivity and salt thickness. If the time measurement is limited to $10^{-2}$ S, the decline of $R_{app}$(t) may not be detected for the salt thicker than 500 m.

With respect to the resistive bed resolution, the coaxial responds to a thin (1-2m thick) bed. The time at which $R_{app}$(t) peaks or begins declining depends on the distance to the conductive bed behind the salt. As noted previously, when plotted in terms of apparent conductivity $\sigma_{app}$(t), the transition time may be used to determine the distance to the boundary beds.

Figure 57:
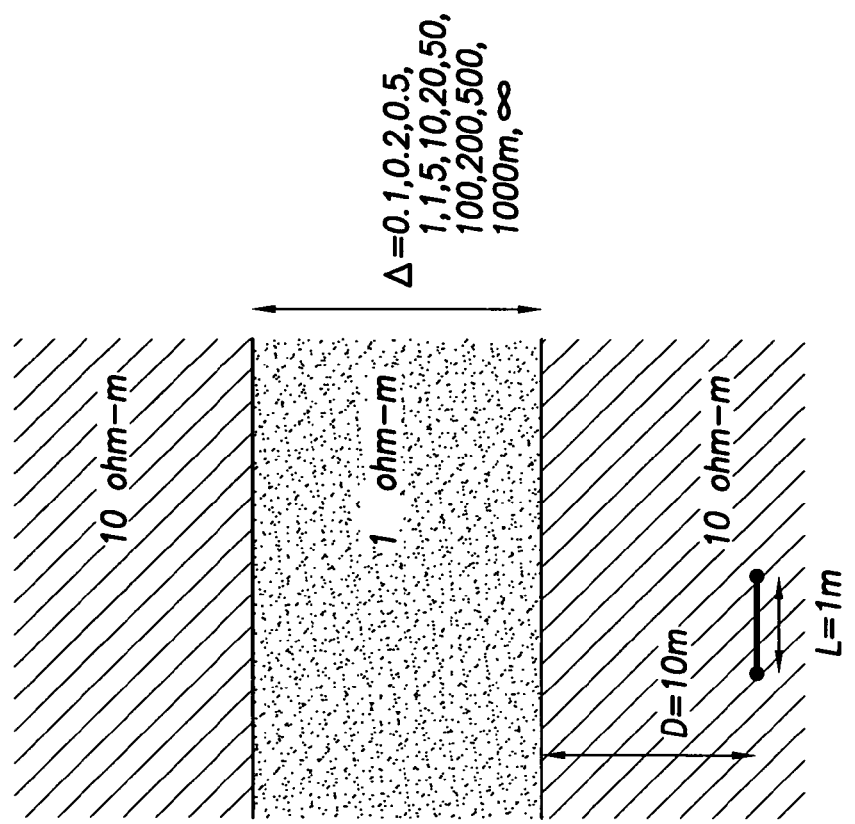
FIG. 57 schematically shows a model of a coaxial tool in a resistive local layer, a conductive layer, and a further resistive layer.
Figure 58:
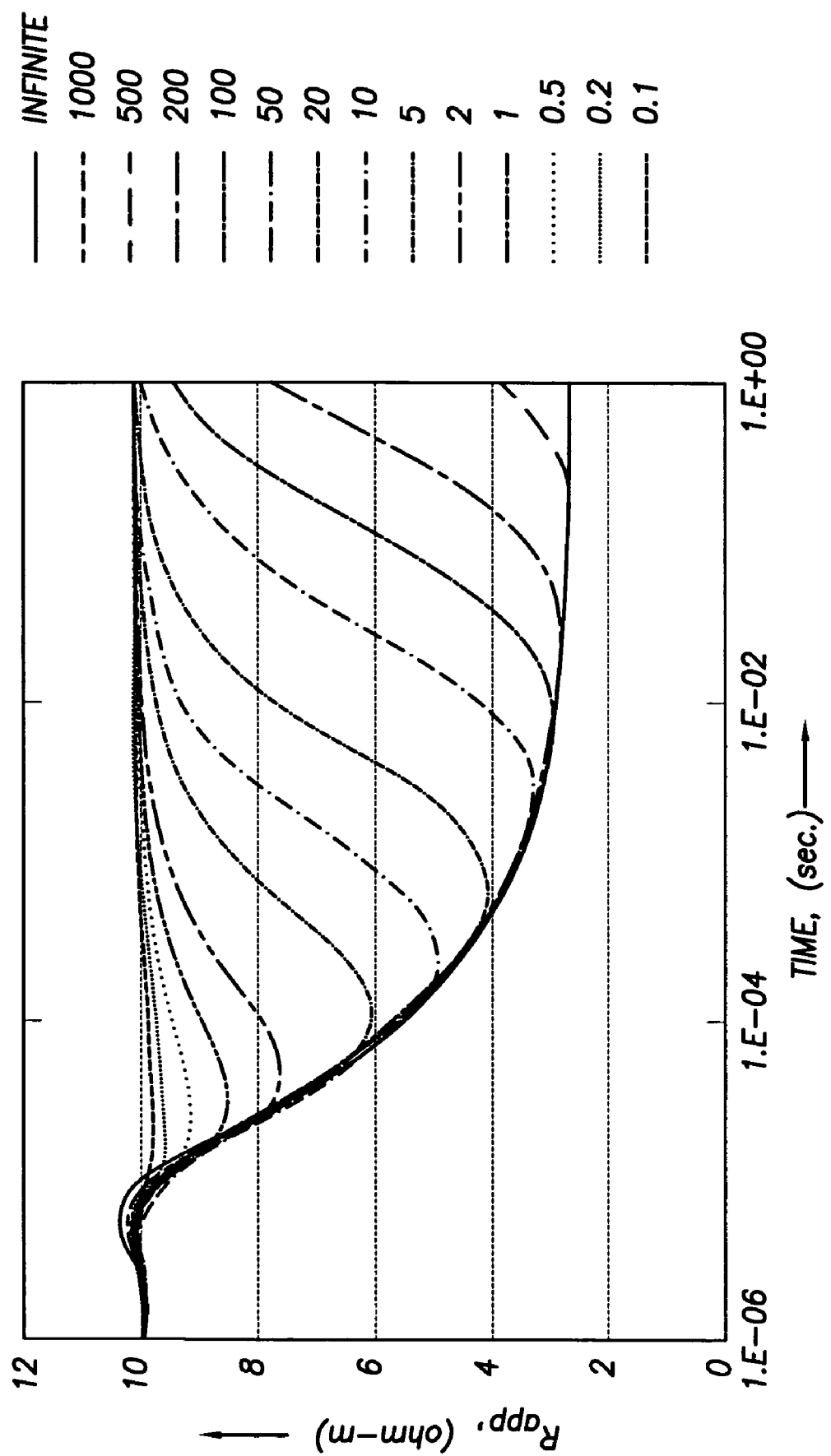
FIG. 58 is a graph similar to FIG. 56, showing resistivity response versus time for a geometry as given in FIG. 57 for various thicknesses of the conductive layer.

A three-layer formation was also modeled. In this instance, the intermediate layer was a more conductive layer. The depiction of the model is shown in FIG. 57. Therein the coaxial tool, having a 1 m spacing is located in a borehole in a formation having a resistivity of 10 ohm-m and is located 10 m from a less resistive (more conductive) layer, having a resistivity of 1 ohm-m. A third layer is beyond the conductive bed and likewise has a resistivity of 10 ohm-m. The conductive bed was modeled for varying thickness from fractions of a meter up to an infinite thickness. The conductive bed could considered representative of a shale layer. The apparent resistivity is set forth in FIG. 58.

The decrease in $R_{app}$(t) is due to the introduction of the shale (conductive) layer and appears as t→$10^{-5}$ s. The shale response is fully resolved by an infinitely thick conductive layer that approaches 3 ohm-m. The subsequent rise in $R_{app}$(t) is in response to the resistive formation beyond the shale layer. The transition time is utilized to determine the distance to the interface between the second and third layers. $R_{app}$(late t) is a function of conductive bed resistivity. As the conductive bed thickness increases, the time measurement must likewise be increased (>$10^{-2}$ s) in order to measure the rise of $R_{app}$(t) for conductive layers thicker than 100 m.

Figure 59:
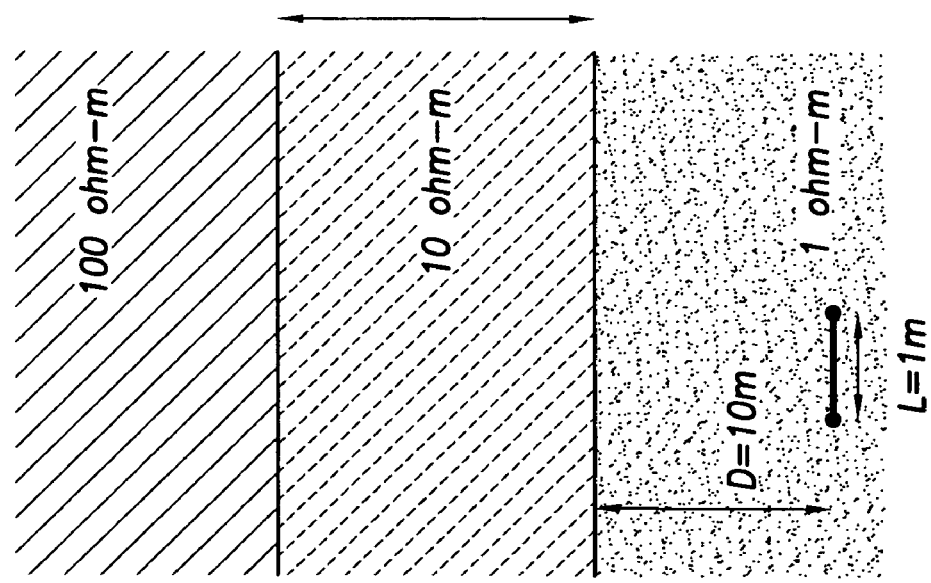
Figure 60:
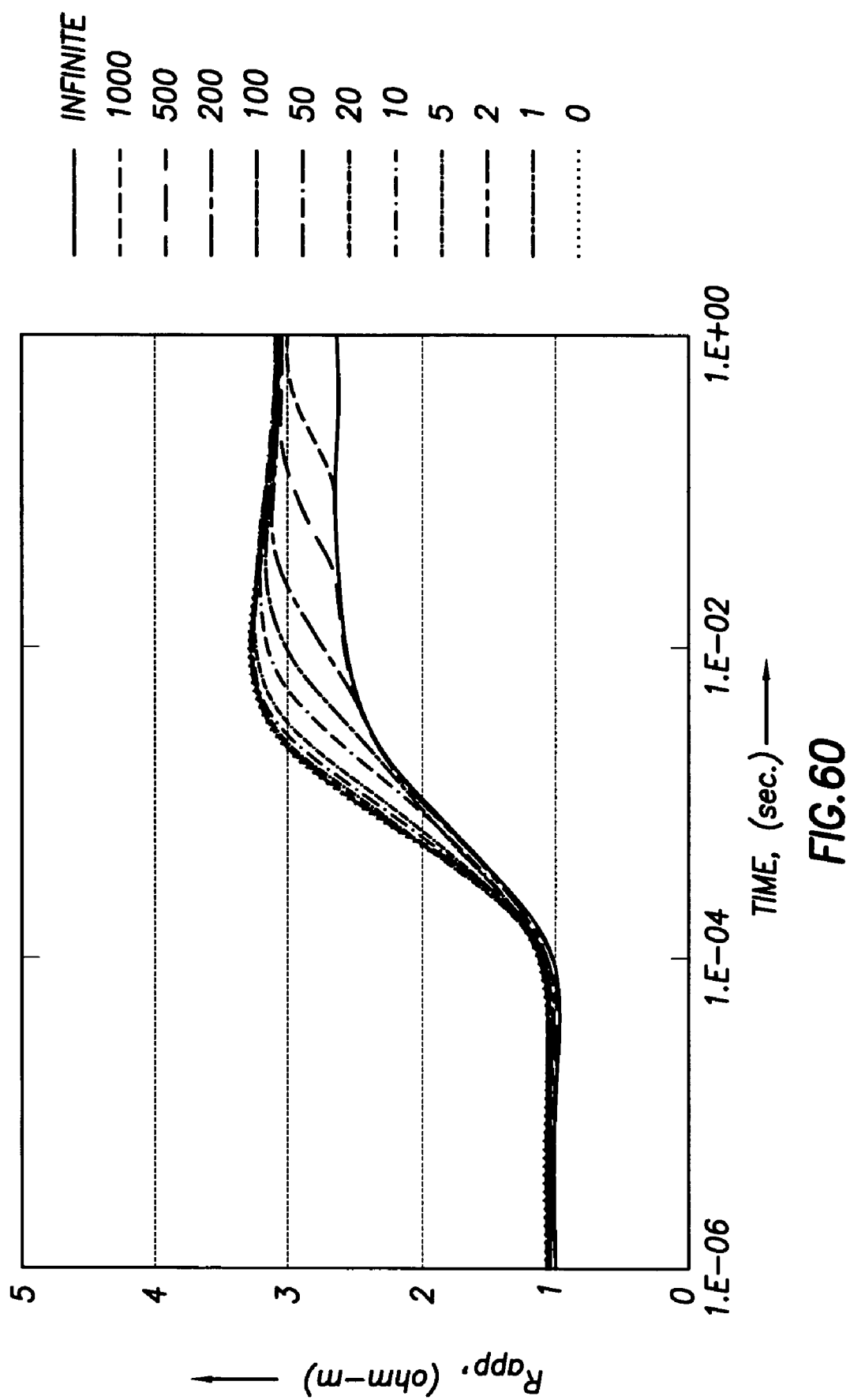
FIG. 60 is a graph similar to FIG. 56, showing resistivity response versus time for a geometry as given in FIG. 59 for various thicknesses of the separating layer.

Another three layer model is set forth in FIG. 59, wherein the coaxial tool is in a conductive layer (1 ohm-m), and a highly resistive layer (100 ohm-m) as might be found in a salt dome. The two layers are separated by a layer having an intermediate resistance (10 ohm-m) of varying thickness. The apparent resistivity response is depicted in FIG. 60.

The response to the intermediate resistive layer is seen at $10^{-4}$ S, where $R_{app}$(t) increases. If the intermediate layer is fully resolved by an infinitely thick bed, the apparent resistivity approaches a 2.6 ohm-m asymptote. As noted in FIG. 60, the $R_{app}$(t) undergoes a second stage increase in response to the 100 ohm-m highly resistive layer. Based on the transition time, the distance to the interface is determined to be 110 m.

Figure 61:
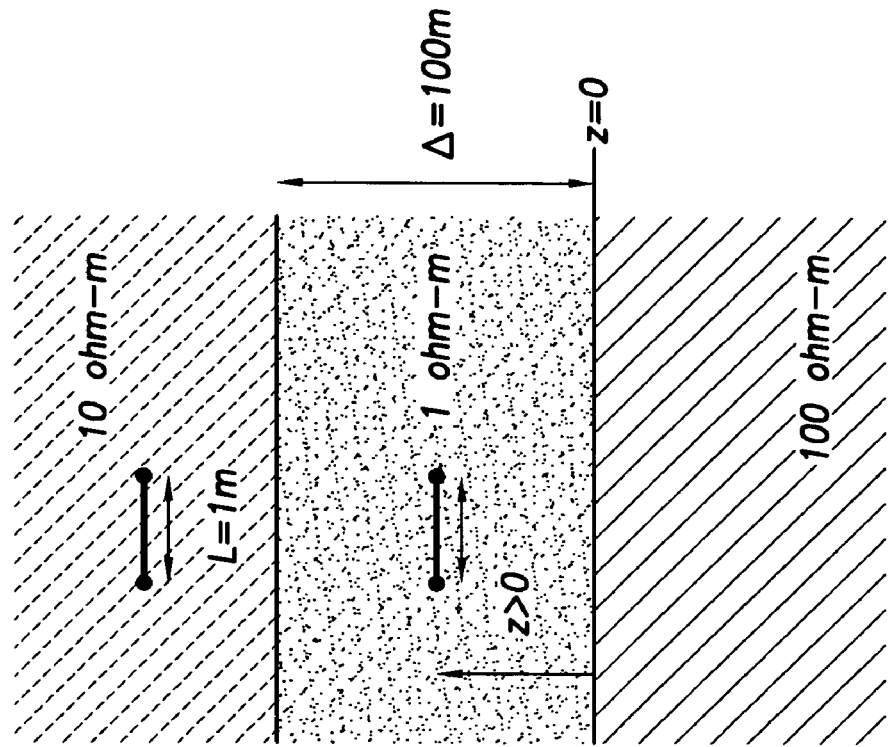
FIG. 61 schematically shows a model of a structure involving a highly resistive layer (100 ohm-m) covered by a conductive local layer (1 ohm-m) which is covered by a resistive layer (10 ohm-m), whereby a coaxial tool is depicted in the resistive layer and the conductive layer.
Figure 62:
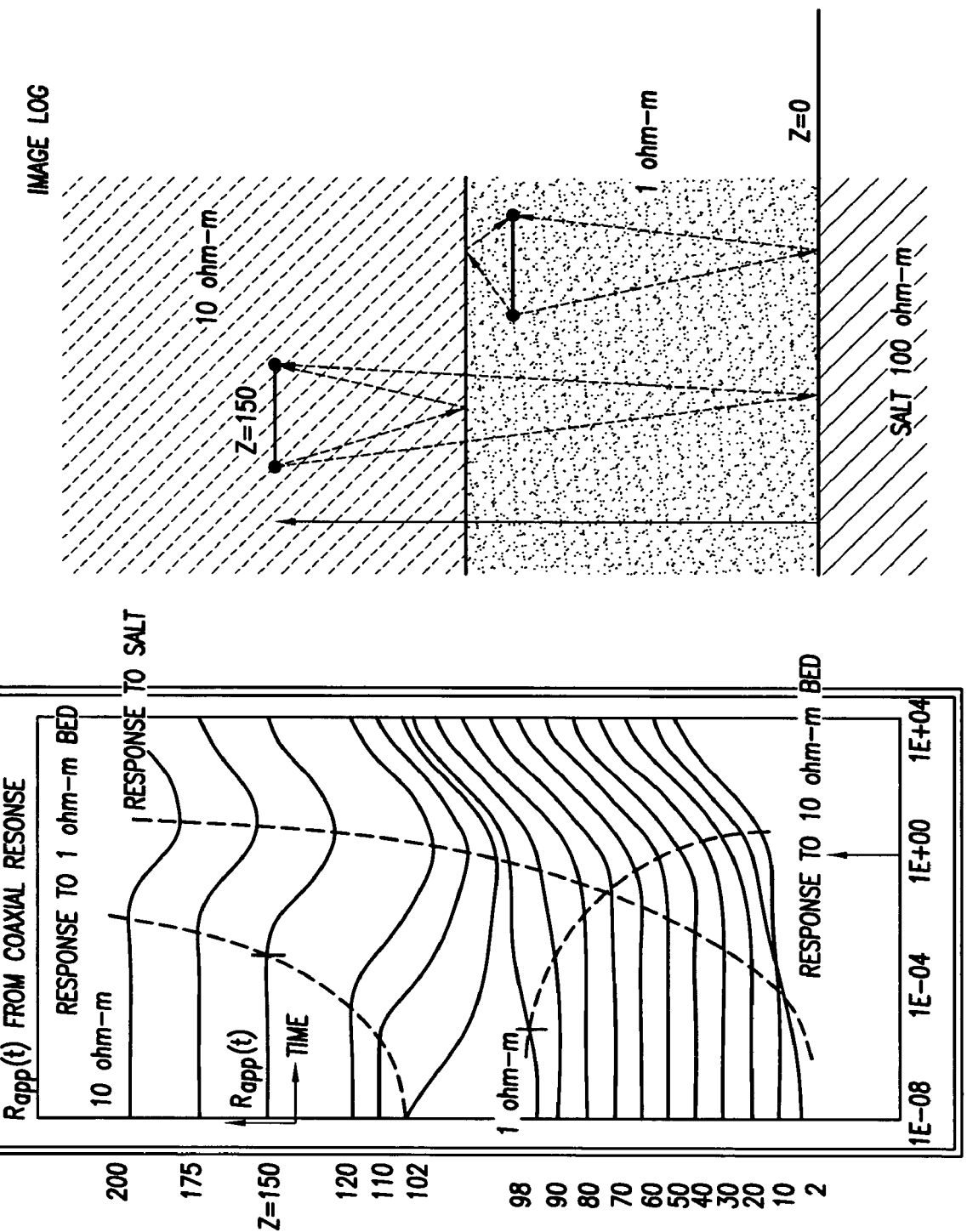
FIG. 62 on the left side shows apparent resistivity in both z and t coordinates whereby inflection points are joined using curve fitted lines.

Though complex, the apparent resistivity or apparent conductivity in the above examples delineates the presence of multiple layers. When the apparent resistivity plots (t, $R_{app}$(t))at different tool positions are arranged together, the whole plot may be used as an image log to view the formation geometry, even if the layer resistivity may not be immediately accurately determined. An example is shown in FIG. 61 wherein a 3 layer model is used in conjunction with a coaxial tool having a 1 m spacing is in two differing positions in the formation. The results are plotted on FIG. 62.

The apparent resistivity $R_{app}$(t) is plotted at various points as the coaxial tool approaches the resistive layer. In starting in the 10 ohm-m layer, the drop in $R_{app}$(t) is attributable to the 1 ohm-m layer and the subsequent increase in $R_{app}$(t) is attributable to the 100 ohm-m layer. Curves may readily be fitted to the inflection points to identify the responses to the various beds, effectively imaging the formation. Moreover, the 1 ohm-m curve may be readily attributable to direct signal pick up between the transmitter and receiver when the tool is located in the 1 ohm-m bed.

Figure 63:
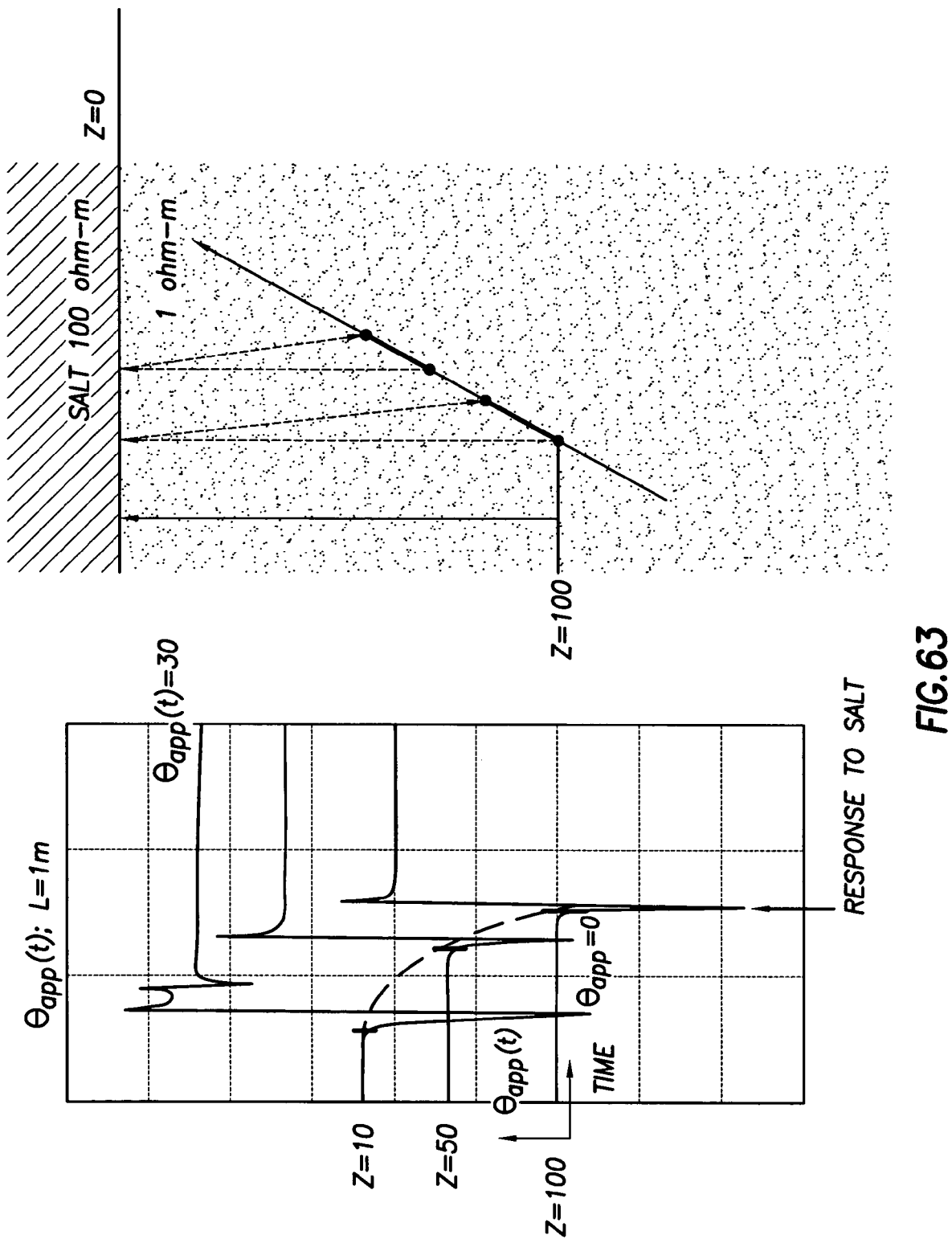
FIG. 63 on the right hand side schematically shows a coaxial tool seen as approaching a highly resistive formation at a dip angle of approximately 30 degrees.

In yet another example, the apparent. dip $\theta_{app}$(t) may be used to generate an image log. In the right hand side of FIG. 63 a coaxial tool is seen as approaching a highly resistive formation at a dip angle of approximately 30 degrees. The apparent dip response is shown at the left hand side of FIG. 63. As noted previously, the time at which the apparent dip response occurs is indicative of the distance to the formation. When the responses for different distances are plotted together, a curve may be drawn indicative of the response as the tool approaches the bed, as shown in the left hand side of FIG. 63.

Thus an image of the formation may be created using apparent conductivity/resistivity and dip without the additional processing required for inversion and extraction of information. This information is capable of providing geosteering queues as well as the ability to profile subterranean formations.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the claims.

We claim:

1. A method for imaging a subterranean formation traversed by a wellbore using a tool comprising a transmitter for transmitting electromagnetic signals through the formation and a receiver for detecting response signals, the methods comprising steps:
    (a) bringing the tool to a first position inside the wellbore;
    (b) energizing the transmitter to propagate a transient electromagnetic signal into the formation;
    (c) detecting a response signal that has propagated through the formation as a result of the transient signal in step (b);
    (d) calculating a derived quantity for the formation as a function of time based on the detected response signal for the formation;
    (e) plotting the derived quantity for the formation against time;
    (f) moving the tool to at least one other position within the wellbore and repeating steps (b) to (e);
    (g) creating an image of the formation within the subterranean formation based on plots from at least two tool positions by plotting the derived quantity for the formation calculated in respect of the tool at the at least two positions in the same plot and fitting at least one curve to at least one series of inflection points in the plots of the derived quantity for said at least two positions.

2. The method of claim 1, wherein step (g) further includes identifying one or more inflection points on each plotted derived quantity and fitting a curve to the one or more inflection points.

3. The method of claim 1, wherein step (g) is followed by step (h) moving the tool to at least one more other position within the wellbore and repeating steps (b) to (e) followed by step (g).

4. The method of claim 1, wherein after energizing a transient change is induced in the transmitted electromagnetic signal, and wherein plotting the derived quantity for the formation against time comprises plotting the derived quantity for the formation against time lapsed after the transient change.

5. The method of claim 4, wherein the transient change induced in the transmitted electromagnetic signal comprises terminating the signal.

6. The method of claim 1, wherein the derived quantity is one of apparent conductivity and apparent resistivity and apparent dip angle and apparent azimuth angle.

7. The method of claim 1, wherein the image of the formation represents one or more formation layers each displaying a mutually different formation feature.

8. The method of claim 7, wherein for each position of the tool in the wellbore a distance is determined from the tool to at least one formation layer.

9. The method of claim 7, wherein determining the distance comprises determining a time in which the one of apparent conductivity and apparent resistivity begins to deviate from the corresponding one of apparent conductivity and apparent resistivity of formation in which the device is located.

10. The method of claim 1, wherein detecting a response signal comprises detecting an induced voltage response signal.

11. The method of claim 10, wherein calculating the derived quantity includes converting the induced voltage signal to the derived quantity.

* * * * *